(12) United States Patent
Enatsu et al.

(10) Patent No.: US 12,165,122 B2
(45) Date of Patent: Dec. 10, 2024

(54) WEIGHING AND PRICING DEVICE, SALES SYSTEM, PRODUCT REGISTRATION PROCESSING METHOD, PROGRAM, AND NON-TRANSITORY COMPUTER-READABLE MEDIUM

(71) Applicant: Teraoka Seiko Co., Ltd., Tokyo (JP)

(72) Inventors: Eriko Enatsu, Tokyo (JP); Tomoki Kaneko, Tokyo (JP); Naoto Kurosaki, Tokyo (JP); Kazuya Sasaki, Tokyo (JP); Shingo Higuchi, Tokyo (JP); Kunio Mori, Tokyo (JP); Kazuki Watanabe, Tokyo (JP)

(73) Assignee: Teraoka Seiko Co., LTD, Tokyo (JP)

( * ) Notice: Subject to any disclaimer, the term of this patent is extended or adjusted under 35 U.S.C. 154(b) by 277 days.

(21) Appl. No.: 17/364,076

(22) Filed: Jun. 30, 2021

(65) Prior Publication Data

US 2021/0326828 A1 Oct. 21, 2021

Related U.S. Application Data

(63) Continuation of application No. PCT/JP2020/000958, filed on Jan. 15, 2020.

(30) Foreign Application Priority Data

Jan. 17, 2019 (JP) .................................. 2019-006248
Apr. 4, 2019 (JP) .................................. 2019-072282

(51) Int. Cl.
*G06Q 20/20* (2012.01)
*G06Q 20/32* (2012.01)

(52) U.S. Cl.
CPC ......... *G06Q 20/208* (2013.01); *G06Q 20/201* (2013.01); *G06Q 20/209* (2013.01); *G06Q 20/322* (2013.01); *G06Q 20/3276* (2013.01)

(58) Field of Classification Search
CPC .............. G06Q 20/208; G06Q 20/201; G06Q 20/209; G06Q 20/322; G06Q 20/3276;
(Continued)

(56) References Cited

U.S. PATENT DOCUMENTS 9,891,094 B2 * 2/2018 Cartwright ............. G01G 21/22
10,247,598 B2 * 4/2019 Moser ................. G01G 23/3735
(Continued)

FOREIGN PATENT DOCUMENTS

JP 5056161 B2 10/2012
JP 2015087779 A 5/2015
(Continued)

OTHER PUBLICATIONS

Extended European Search Report issued in corresponding European Patent Application No. 20741638.9 dated Sep. 6, 2022 (10 pages).
(Continued)

*Primary Examiner* — Peter Ludwig
(74) *Attorney, Agent, or Firm* — Osha Bergman Watanabe & Burton LLP

(57) ABSTRACT

A weighing and pricing device includes: a processor that executes a registration process for a product to be purchased by a customer; a transceiver that: establishes a connection between a mobile device possessed by the customer and the weighing and pricing device; and upon establishing the connection, receives, from the mobile device, identification information that identifies the mobile device; and a storage that stores information relating to the product and the identification information in association with each other. After the registration process is interrupted, the transceiver receives, from the mobile device, identification information. The processor specifies the product associated with the stored identification information that corresponds to the
(Continued)

identification information received after the registration process. The processor recommences the registration process for the specified product.

2 Claims, 41 Drawing Sheets

(58) Field of Classification Search
CPC ............... G06Q 20/18; G06Q 30/0283; G06Q 30/0633; G01G 19/4144; G07G 1/0072
See application file for complete search history.

(56) References Cited

U.S. PATENT DOCUMENTS

| | | | |
|---|---|---|---|
| 11,138,901 B1* | 10/2021 | Angel | G06V 20/00 |
| 11,501,278 B2* | 11/2022 | Lee | G06Q 20/3278 |
| 2009/0228325 A1* | 9/2009 | Simmons | G06Q 30/0201 |
| | | | 705/7.23 |
| 2010/0012715 A1* | 1/2010 | Williams | G06Q 20/3274 |
| | | | 235/375 |
| 2014/0063180 A1* | 3/2014 | Sharma | G08C 19/00 |
| | | | 348/36 |
| 2014/0175164 A1 | 6/2014 | Allard | |
| 2014/0249916 A1* | 9/2014 | Verhaeghe | G06Q 30/0633 |
| | | | 705/14.51 |
| 2015/0025969 A1* | 1/2015 | Schroll | G06Q 20/208 |
| | | | 705/14.64 |
| 2015/0324937 A1* | 11/2015 | Callahan | E04C 3/02 |
| | | | 705/15 |
| 2016/0138962 A1* | 5/2016 | Cartwright | G01G 21/22 |
| | | | 177/1 |
| 2017/0091748 A1* | 3/2017 | Clark | G06Q 20/208 |
| 2017/0300980 A1* | 10/2017 | Soldate | H04W 88/02 |
| 2018/0302792 A1* | 10/2018 | Zhang | H04L 63/083 |
| 2019/0215882 A1* | 7/2019 | Kim | G06K 7/1417 |
| 2019/0333039 A1* | 10/2019 | Glaser | G06Q 20/209 |

FOREIGN PATENT DOCUMENTS

| | | |
|---|---|---|
| JP | 2015127917 A | 7/2015 |
| JP | 2018195191 A | 12/2018 |

OTHER PUBLICATIONS

International Search Report issued in corresponding International Application No. PCT/JP2020/000958, mailed Mar. 3, 2020, with translation (5 pages).
Written Opinion issued in corresponding International Application No. PCT/JP2020/000958, mailed Mar. 3, 2020 (3 pages).

* cited by examiner

FIG. 9A
Customer Information

| Customer Identification Information | Customer Name | Customer Registration Date | Cancellation Information (Past Total) | Customer Rank | Number of Points | ... |
|---|---|---|---|---|---|---|
| C000001 | Taro Teraoka | YYYYMMDD | 1 Store Visit Previous: 2x<br>2 Store Visits Previous: 1x<br>3 Store Visits Previous: 5x | A | 305 | ... |
| C000002 | Hanako Teraoka | YYYYMMDD | ... | ... | ... | ... |
| ... | ... | ... | ... | ... | ... | ... |

FIG. 9B
Store Information

| Store Identification Information ("Store, Co. Code" + "Branch Code") | Store Name | Store Specification Info. 1 (Two-Dimensional Code Info.) | Store Specification Info. 2 (Position Info. (GPS Info.)) | ... |
|---|---|---|---|---|
| 0001-00001 | AAA Co. OO Shop | AAAXXXBBBCCC | Latitude: 35.XXXXXX<br>Longitude: 139.XXXXXX | ... |
| 0002-00001 | BBB Store □□ Shop | ... | ... | ... |
| ... | ... | ... | ... | ... |

FIG. 9C
Basket Information

| Basket Identification Information ("Store Identification Info." + "Date" + "Serial No.") | Transaction Starting Time and Date (Generation Time and Date); Transaction Ending Time and Date | Customer Identification Info. |
|---|---|---|
| 0001-00001-YYYYMMDD-00175 | Transaction Starting Time and Date: YYYYMMDD-HHMMSS<br>Transaction Ending Time and Date: - | C000001 |
| ... | ... | ... |

| Registered Product Info. (Total) | Registered Product Info. (Registered Product 1) | Registered Product Info. (Registered Product 2) | ... |
|---|---|---|---|
| Article Count: 5; Estimated Subtotal Monetary Amount: 1280; Subtotal Monetary Amount (Calculated Subtotal Monetary Amount): - | Product Code, Product Name, Price, ... | Product Code, Product Name, Price, ... | ... |
| ... | ... | ... | ... |

| Deferred-Product Info. (Total) | Deferred-Product Info. (Deferred Product 1) | Deferred-Product Info. (Deferred Product 2) | Deferred-Product Info. (Deferred Product 3) |
|---|---|---|---|
| Article Count: 3; NON_FILE: 2; Reading NG; (Requiring Confirmation of Unauthorized Operation): 1 | Deferred-Product Type: 1 (NON-FILE), Product Code | Deferred-Product Type: 1 (NON-FILE), Product Code | Deferred-Product Type: 2 (Reading NG), Image Data |
| ... | ... | ... | ... |

| Cancellation Information (Present Total) | Cancellation Info. (Cancellation 1) | Cancellation Info. (Cancellation 2) |
|---|---|---|
| Cancellation Times: 2 | Product Code, Quantity | Product Code, Quantity |
| ... | ... | ... |

FIG. 11D
Please perform settlement at settlement machine
Please scan the code below at the settlement machine
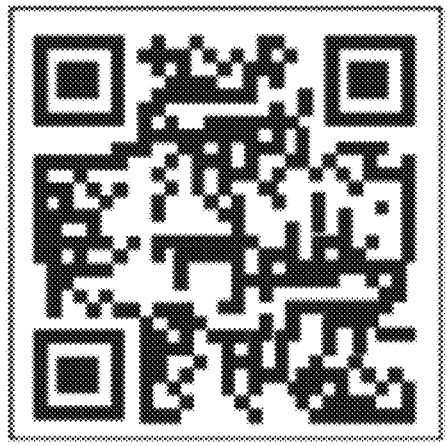
Return to shopping
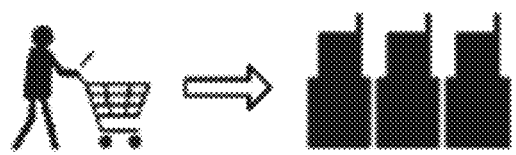

FIG. 26

Connecting
to weighing and pricing device

Please remain in front of
the showcase while
shopping.

Leave Temporarily

FIG. 28B

Cherry $10.00 /kg

Select quantity

∨ 500 g — AR11

Submit — BT11

WEIGHING AND PRICING DEVICE, SALES SYSTEM, PRODUCT REGISTRATION PROCESSING METHOD, PROGRAM, AND NON-TRANSITORY COMPUTER-READABLE MEDIUM

BACKGROUND

Technical Field

The present invention relates to a weighing and pricing device, a sales system, a product registration processing method, and a non-transitory computer-readable medium.

Related Art

Introduced in stores are sales systems whereby a customer can operate a mobile terminal device they possess to perform product registration on their own (for example, see patent literature 1).

PATENT LITERATURE

Patent literature 1: JP 5056161 B2

In sales of products sold by weight, a weighing and pricing device is used that is for a sales format wherein an employee waits on a customer in person. In a shopping area that uses the weighing and pricing device in a sales system such as above, the procedure is for the employee to price a product designated by the customer and then register the product on the customer's mobile terminal device. This is different from a procedure wherein the customer removes a product from a product shelf or the like and causes the mobile terminal device to read a code to perform product registration.

SUMMARY

One or more embodiments provide a weighing and pricing device for in-person sales that performs product registration efficiently in a sales system where products are registered using a mobile terminal device possessed by a customer.

One or more embodiments provide a weighing and pricing device that includes a registration means of executing a registration process of registering a product to be purchased, a connection means for another device to communicably connect to the weighing and pricing device, an input means of inputting identification information of the other device connected to the weighing and pricing device, and a storage means of storing information relating to the product registered by the registration means and the identification information input by the input means in association with each other.

According to one or more embodiments, a sales system includes a weighing and pricing device and a mobile terminal. The weighing and pricing device includes a registration means of executing a registration process of registering a product to be purchased, a connection means for the mobile terminal to communicably connect to the weighing and pricing device, an input means of inputting identification information of the mobile terminal connected to the weighing and pricing device, and a storage means of storing information relating to the product registered by the registration means and the identification information input by the input means in association with each other, and the mobile terminal includes an identification information output means of outputting the identification information to the weighing and pricing device connected by the connection means.

According to one or more embodiments, a product registration processing method in a weighing and pricing device includes a registration step of executing a registration process of registering a product to be purchased, a connection step for another device to communicably connect to the weighing and pricing device, an input step of inputting identification information of the other device connected to the weighing and pricing device, and a storage step of storing information relating to the product registered by the registration step and the identification information input by the input step in association with each other.

One or more embodiments provide a product registration processing method in a sales system that includes a weighing and pricing device and a mobile terminal. The weighing and pricing device includes a registration step of executing a registration process of registering a product to be purchased, a connection step for the mobile terminal to communicably connect to the weighing and pricing device, an input step of inputting identification information of the mobile terminal connected to the weighing and pricing device, and a storage step of storing information relating to the product registered by the registration step and the identification information input by the input step in association with each other, and the mobile terminal includes an identification information output step of outputting the identification information to the weighing and pricing device connected by the connection step.

One or more embodiments provide a program for causing a computer serving as a weighing and pricing device to function as a registration means of executing a registration process of registering a product to be purchased, a connection means for another device to communicably connect to the weighing and pricing device, an input means of inputting identification information of the other device connected to the weighing and pricing device, and a storage means of storing information relating to the product registered by the registration means and the identification information input by the input means in association with each other.

One or more embodiments provide a storage medium that stores a program for causing a computer to function as a weighing and pricing device, the storage medium storing a program for causing functioning as a registration means of executing a registration process of registering a product to be purchased, a connection means for another device to communicably connect to the weighing and pricing device, an input means of inputting identification information of the other device connected to the weighing and pricing device, and a storage means of storing information relating to the product registered by the registration means and the identification information input by the input means in association with each other.

One or more embodiments can provide various practical improvements in sales processing technologies that executes product registration for in-person sales efficiently using a sales system including a weighing and pricing device and a mobile device possessed by a customer, as described in detail below.

BRIEF DESCRIPTION OF THE DRAWINGS

FIG. 9A is a diagram illustrating a configuration example of customer information according to the first embodiment.

FIG. 9B is a diagram illustrating a configuration example of store information according to the first embodiment.

FIG. 9C is a diagram illustrating a configuration example of basket information according to the first embodiment.

FIG. 11D is a diagram illustrating an example of one aspect of the settlement guide screen according to the first embodiment.

FIG. 26 is a diagram illustrating an example of a display aspect of a connection maintenance guide message screen in a fourth variation of one or more embodiments.

FIG. 28B is a diagram illustrating one example of the quantity designation screen used to describe an example of the procedure of product registration in the shopping area wherein pricing is performed according to the sixth variation of one or more embodiments.

DETAILED DESCRIPTION

First Embodiment

Figure 1:
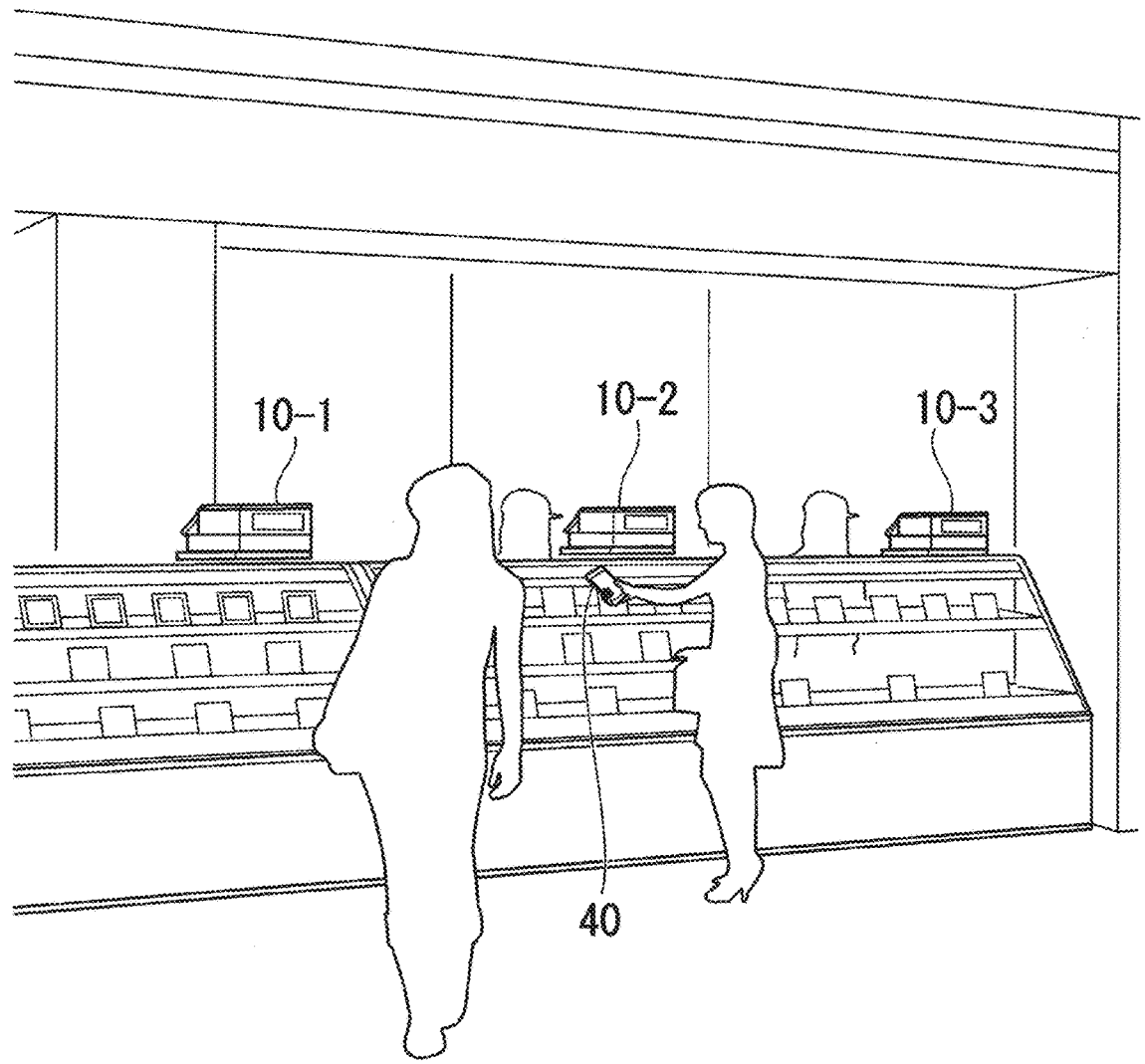
FIG. 1 is a diagram illustrating an example of an overview of a store where a weighing and pricing device in a sales system of a first embodiment is used.

FIG. 1 illustrates an overview of a store wherein a weighing and pricing device in a sales system of the first embodiment is used. An example is given wherein the store of the first embodiment sells food.

Various foods are displayed as products in the display case illustrated in this diagram.

Three weighing and pricing devices—10-1, 10-2, and 10-3—are disposed on the display case. Note that in the following description, the weighing and pricing devices 10-1, 10-2, and 10-3 are referred to as a weighing and pricing device 10 when they are not being distinguished between in particular. The weighing and pricing device 10 includes a scale whereon a product whose weight (or mass) is to be measured is placed. The weighing and pricing device 10 is one example of a label issuing device. The weighing and pricing device 10 includes a scale whereon a product whose weight (or mass) is to be measured is placed.

Furthermore, although illustration is omitted, a settlement device is disposed in a predetermined location away from the shopping area illustrated in this diagram.

Note that a number of weighing and pricing devices 10 disposed in the store and a number of settlement devices disposed in the store are not particularly limited.

Note that in the first embodiment, although not illustrated in this diagram, in addition to the shopping area where the weighing and pricing device 10 is disposed, also disposed in the store is a shopping area where a customer can place any products from a product shelf into a shopping basket.

Figure 2:
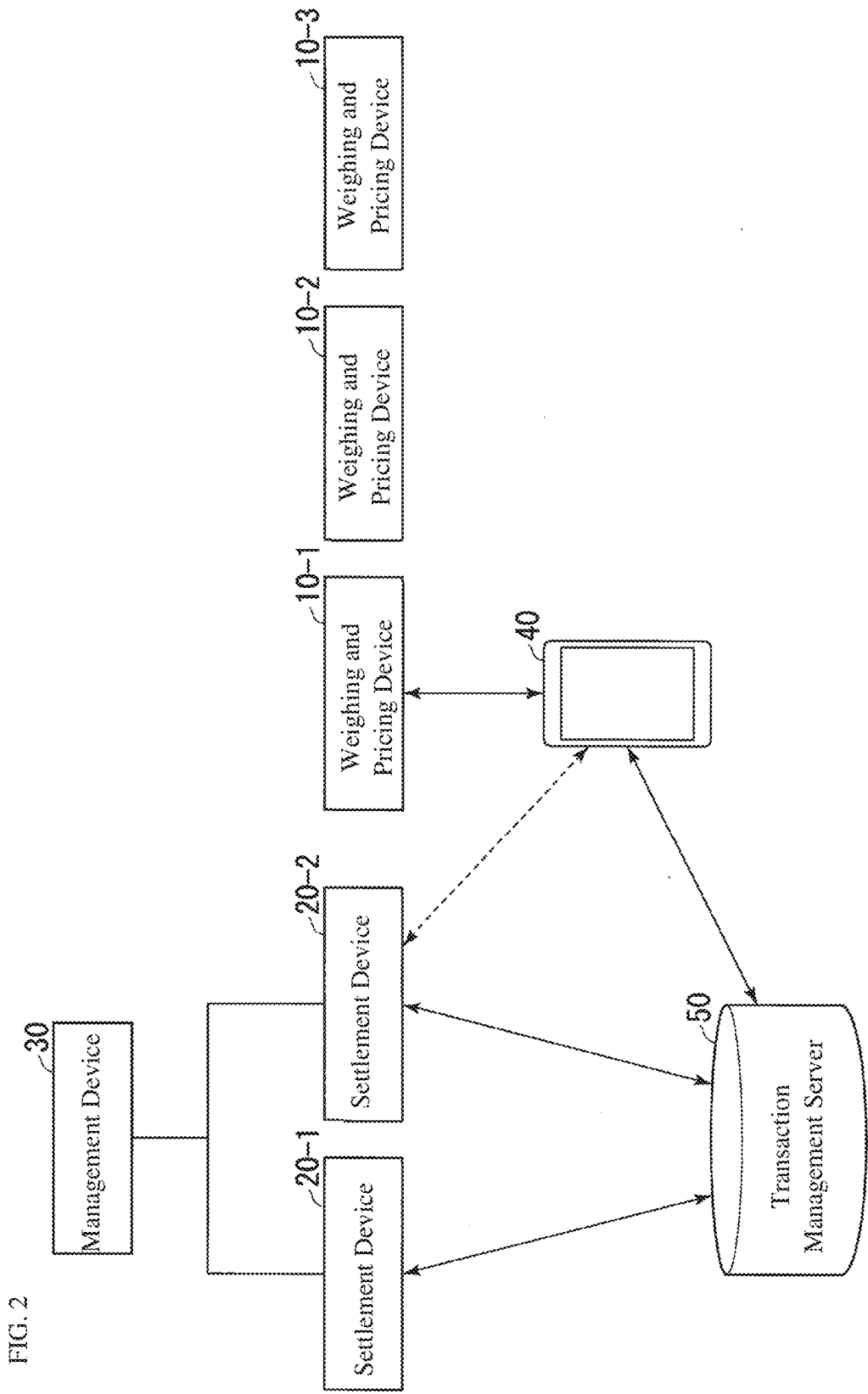
FIG. 2 is a diagram illustrating a configuration example of the sales system according to the first embodiment.

FIG. 2 illustrates a configuration example of the sales system in the first embodiment. The sales system in this diagram includes the weighing and pricing device 10 (10-1, 10-2, 10-3), a settlement device 20 (20-1, 20-2), a management device 30, a mobile terminal device 40, and a transaction management server 50.

The weighing and pricing device 10 calculates a monetary amount of each product placed on the scale from its measured weight and its weight unit price and generates product pricing information of the product that includes the calculated monetary amount. The product pricing information is transmitted to the mobile terminal device 40, which is communicably connected to the weighing and pricing device 10. In other words, the weighing and pricing device 10 establishes a connection with the mobile terminal device 40 to communicate with each other.

The customer instructs an employee which product they would like to purchase and a weight (or monetary amount) they would like to purchase. The employee performs an operation on the weighing and pricing device 10 of designating the product instructed by the customer as a product to be registered. Upon doing so, the employee uses the weighing and pricing device 10 to measure the weight of the product to be registered (or a weight corresponding to the monetary amount instructed by the customer). At this time, the employee performs the weighing by placing the product on the scale.

The weighing and pricing device 10 calculates the monetary amount of the product from the measured weight and the weight unit price per unit weight set for the product (for example, 100 g) and prices the product designated to be registered together with the monetary amount of the product. As above, the customer instructs the employee of the weight for each product they would like to purchase, and the employee measures the weights of the instructed products and prices the products. Each time pricing is established for a product, the weighing and pricing device 10 transmits the product pricing information reflecting the established monetary amount of the product to the communicably connected mobile terminal device 40.

The settlement device 20 uses basket information (settlement information) acquired from the transaction management server 50 to execute a settlement process according to a customer operation.

The management device 30 is a host device of the settlement device 20 in the store. The management device 30 in this diagram is communicably connected to the settlement device 20. The management device 30 can manage a transaction history in the store by, for example, acquiring history information of settlement processes in the store from the settlement device 20. Moreover, it can, for example, monitor a status of the settlement device 20 and issue a notification when an abnormality arises in the settlement device 20.

Note that the management device 30 may also be communicably connected to the weighing and pricing device 10. In this situation, for example, information of a product master may be stored in the management device 30. The weighing and pricing device 10 can use the product master stored in the management device 30 to execute a process corresponding to product registration.

The mobile terminal device 40 is a terminal device possessed by the customer. In the first embodiment, the mobile terminal device 40 may be a smartphone, a tablet terminal, or the like possessed by the customer. Application software (a shopping application) that the customer uses for a service relating to shopping or the like in correspondence with the sales system of the first embodiment is installed on the mobile terminal device 40.

The transaction management server 50 manages transactions in the sales system. Specifically, the transaction management server 50 receives product registration information transmitted from the mobile terminal device 40 via a network and generates basket information in transaction units according to the received product registration information. The basket information indicates a product registration result in the corresponding transaction.

In response to a basket information request transmitted from the settlement device 20, the transaction management server 50 transmits basket information associated with a transaction identifier, designated according to the basket information request, to the settlement device 20.

Figure 3:
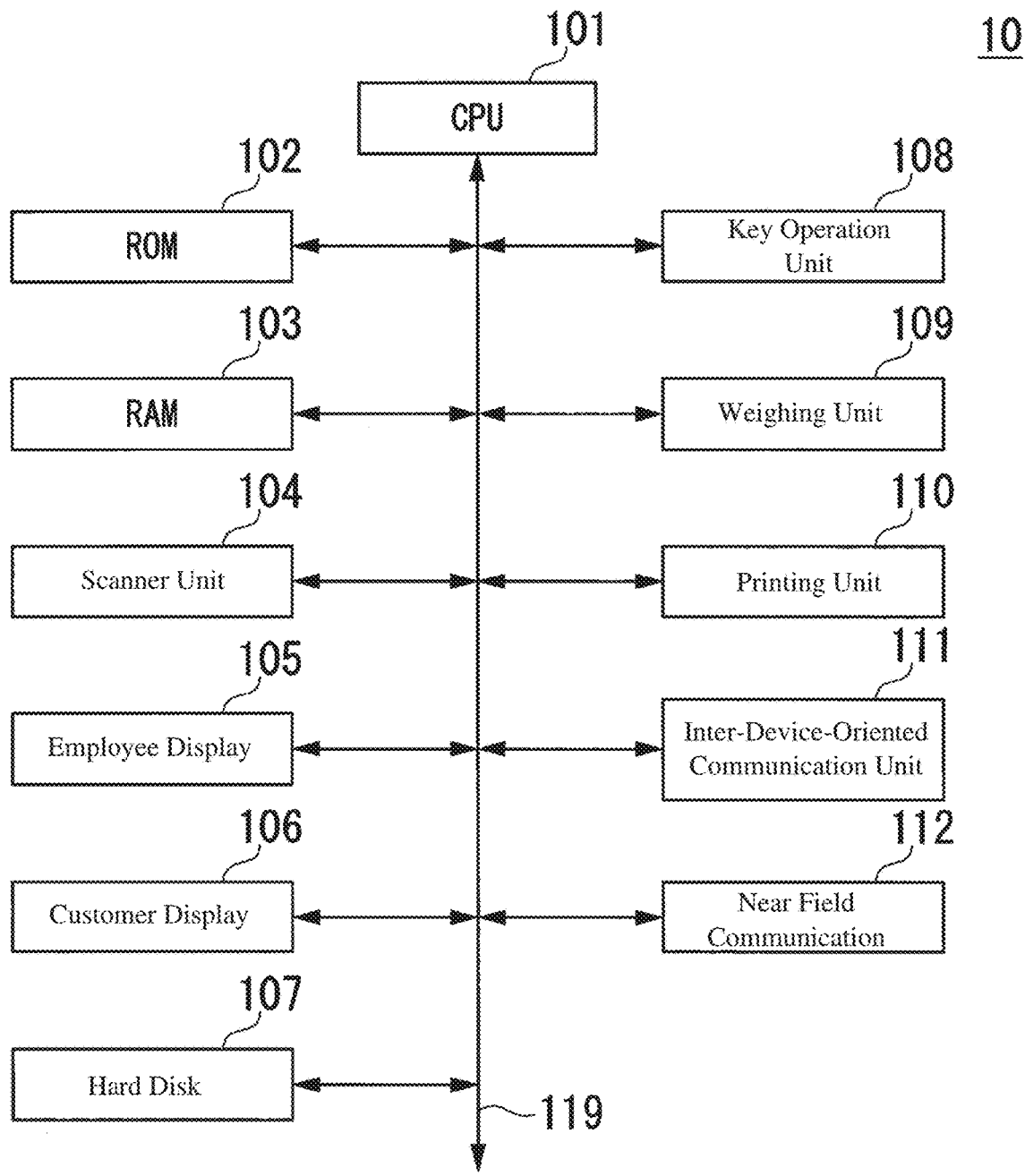
FIG. 3 is a diagram illustrating a configuration example of the weighing and pricing device according to the first embodiment.
Figure 4A:
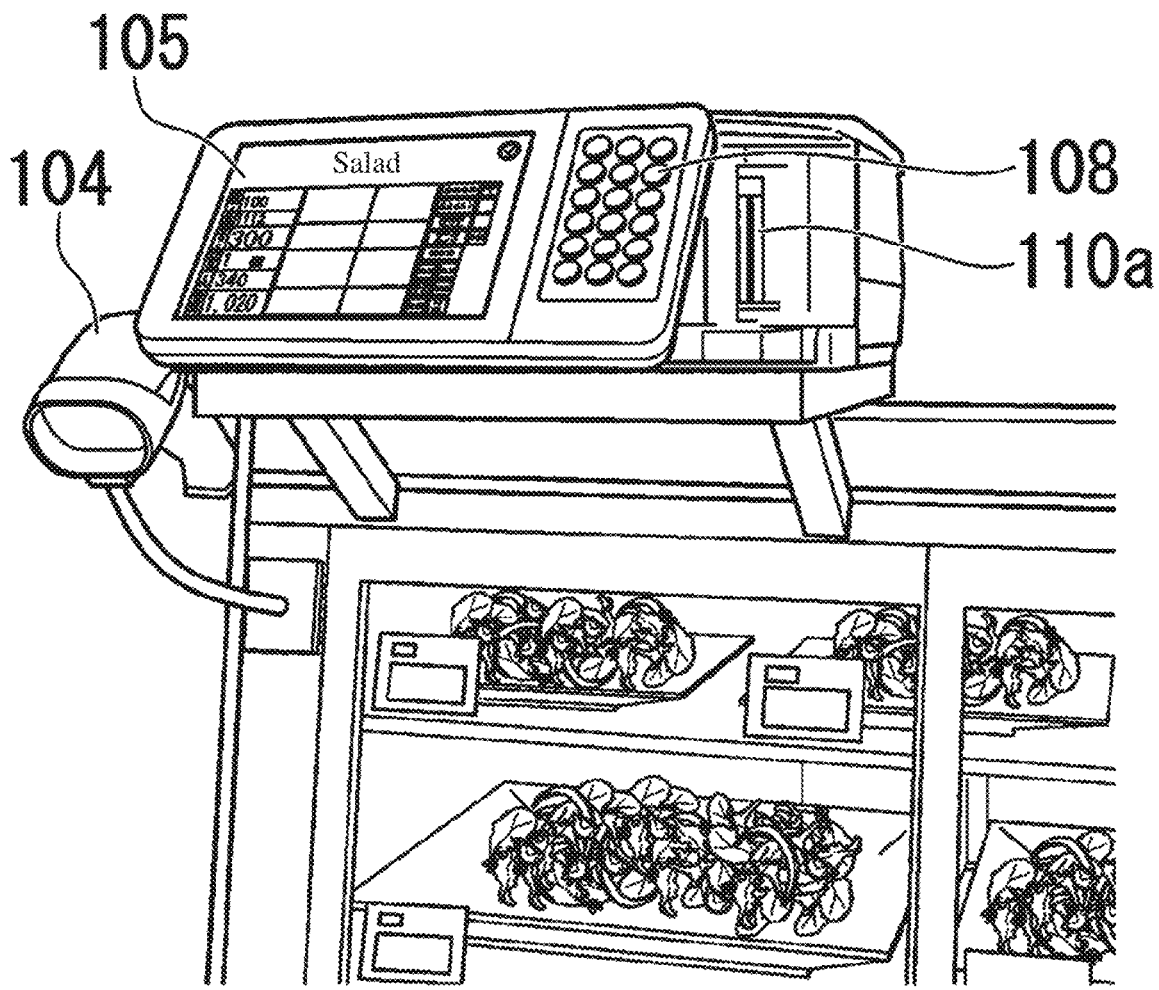
FIG. 4A is a perspective view illustrating an example of an appearance of the weighing and pricing device according to the first embodiment.
Figure 4B:
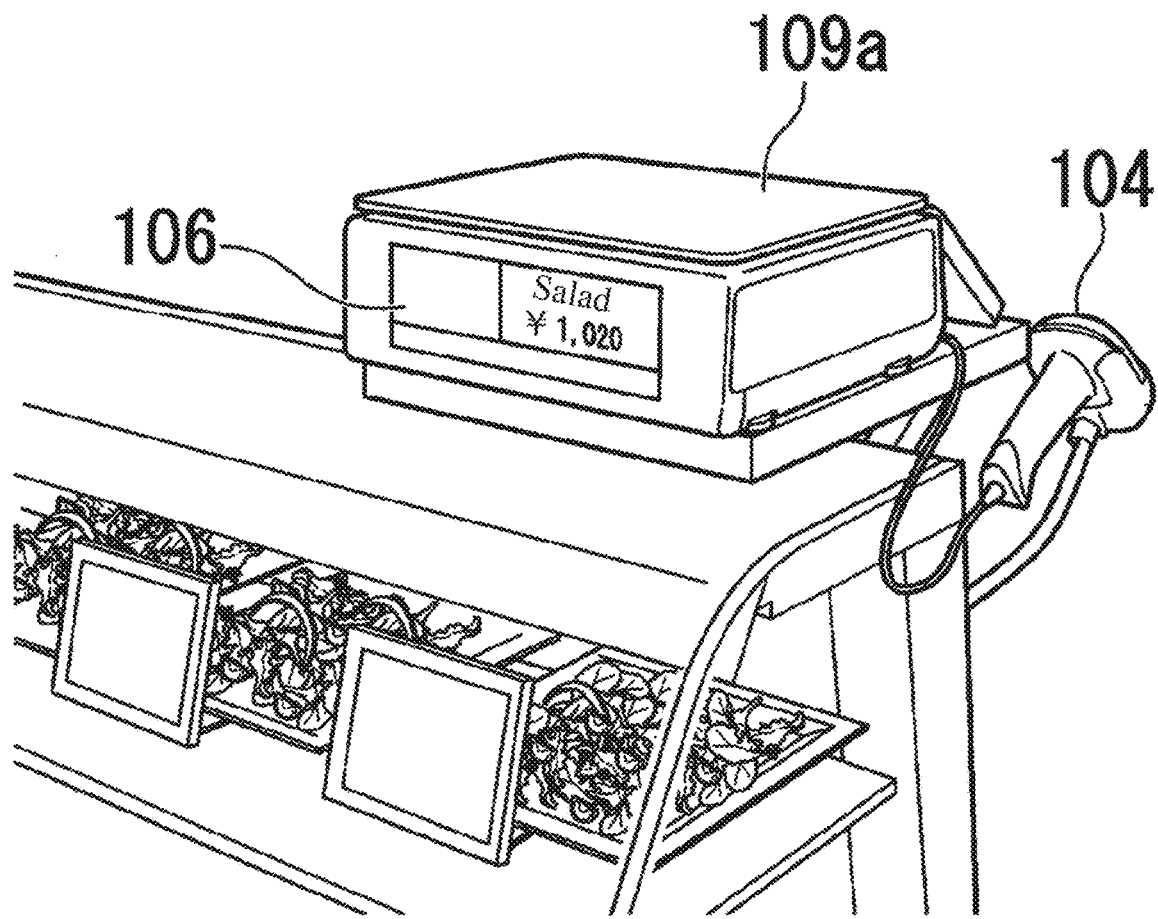
FIG. 4B is a perspective view illustrating an example of an appearance of the weighing and pricing device according to the first embodiment.

A configuration example of the weighing and pricing device 10 in the first embodiment is described with reference to FIG. 3, FIG. 4A, and FIG. 4B. FIG. 3 is a block diagram illustrating a hardware configuration example of the weighing and pricing device 10. FIG. 4A and FIG. 4B are perspective views illustrating an example of an appearance of the weighing and pricing device 10. FIG. 4A is a diagram viewing the weighing and pricing device 10 from an employee side, and FIG. 4B is a diagram viewing the weighing and pricing device 10 from a customer side.

As illustrated in FIG. 3, the weighing and pricing device 10 includes a CPU (Central Processing Unit) 101 (processor), a ROM 102, a RAM 103, a scanner unit 104 (scanner), an employee display 105, a customer display 106, a hard disk 107, a key operation unit 108, a weighing unit 109, a printing unit 110 (printer), an inter-device-oriented communication unit 111, and a near field communication unit 112 (transceiver). These are mutually connected via a bus 119.

The CPU 101 executes various processes for realizing functions as the weighing and pricing device 10 by executing a program.

The ROM 102 stores various information. For example, it stores the program executed by the CPU 101. Moreover, the ROM 102 stores information relating to display by the employee display 105 and the customer display 106 (screen information, message information, and the like). Moreover, the ROM 102 stores a device number (device identifier) for identifying its device. Moreover, the ROM 102 may store information relating to printing by the printing unit 110 (printing content, printing format information, and the like).

The RAM 103 is used as a work region for the CPU 101 to execute processing and computation.

The scanner unit 104 optically reads coded information. For example, as illustrated in FIG. 4A and FIG. 4B, the scanner unit 104 is disposed in a position that is difficult for the customer to see.

As illustrated in FIG. 4A, the employee display 105 is disposed facing the employee side. The employee display 105 is configured as a touch panel and receives an operation of an operator, such as a finger, touching a displayed operation screen.

As illustrated in FIG. 4B, the customer display 106 is disposed facing the customer side and performs display for the customer. Note that the customer display 106 may be configured as a touch panel so as to enable an operation by the customer.

As an auxiliary storage device of the CPU 101, the hard disk 107 stores various information necessary for the weighing and pricing device 10. The hard disk 107 may store, for example, a product file. The hard disk 107 may store a program for causing the CPU 101 to execute a registration process or the like. Moreover, the hard disk 107 may store various information generated due to the program being executed. Moreover, the hard disk 107 may store the information relating to display by the employee display 105 and the customer display 106 and the information relating to printing by the printing unit 110.

Note that another storage device such as an SSD (Solid-State Drive) may be provided instead of the hard disk 107.

As illustrated in FIG. 4A, the key operation unit 108 includes various operation keys (numeric key, cancel key, tare key, add key, product number key, execute key, and the like) for receiving various operations from the employee.

The weighing unit 109 measures a weight of a product and the like (a product and packaging wherein this product is placed) placed on a scale 109a and outputs data indicating a weight value to the CPU 101. Note that upon acquiring the weight value from the weighing unit 109, the CPU 101 subtracts a predetermined weight (tare weight) from the weight value to calculate the product placed on the scale 109a. Moreover, the CPU 101 temporarily stores the weight of the product calculated as above in the RAM 103 and causes displays this on the displays (the employee display 105 and/or the customer display 106).

The printing unit 110 prints characters (prints) on a recording medium and issues (outputs) from an issuing port (see FIG. 4A). For example, the printing unit 110 can issue a label to be affixed to a product.

The inter-device-oriented communication unit 111 is provided for a situation of communicating with another weighing and pricing device 10 via a predetermined communication network. Note that the communication network used by the inter-device-oriented communication unit 111 may be wired or wireless. Note that the inter-device-oriented communication unit 111 may be communicable with the management device 30.

The near field communication unit 112 communicates with the mobile terminal device 40 by a predetermined near field communication method. The near field communication method used by the near field communication unit 112 may be, for example, Bluetooth (registered trademark).

Figure 5:
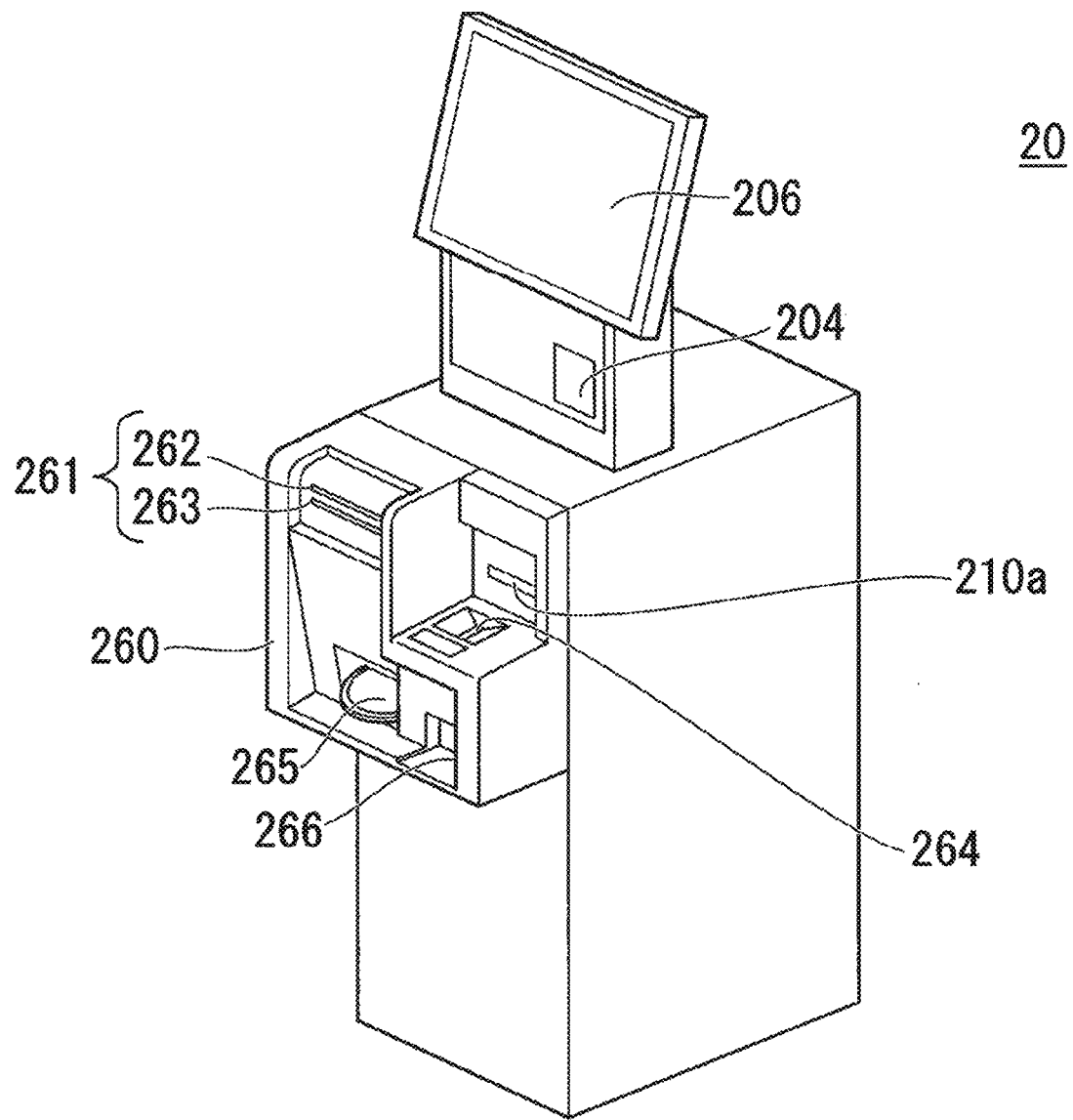
FIG. 5 is a diagram illustrating an example of an appearance of a settlement device according to the first embodiment.

FIG. 5 is a perspective view illustrating an appearance of the settlement device 20. The settlement device 20 in this diagram includes a scanner unit 204, a customer display 206, a change machine 260, and an issuing port 210a.

The scanner unit 204 reads code information. The code information that the scanner unit 204 can read may be a barcode (one-dimensional code) or two-dimensional code (for example, a QR code (registered trademark)).

In the first embodiment, the scanner unit 204 reads code information displayed on the mobile terminal device 40. As the code information displayed on the mobile terminal device 40, code information for settlement, code information that is disposed in a membership-card screen and indicates a member identifier or the like, code information including information serving as a coupon, and the like can be mentioned. Moreover, the settlement device 20 may be able to execute a product registration process according to, for example, an employee operation. In this situation, the scanner unit 204 may read code information serving as a product code.

As the scanner unit 204 in this diagram, an example is illustrated wherein the scanner unit 204 is provided in a fixed manner in a pedestal portion of the customer display 206. However, the scanner unit 204 may be, for example, made to be a handheld scanner and held in a pedestal provided on a lateral face of a housing.

The customer display 206 displays settlement-related information to the customer. The customer display 206 may be configured as a display device provided with a touch panel.

The change machine 260 is an automatic change machine that receives input of bills and coins by the customer to perform a depositing process and discharges change, a refund, or rejected bills and coins. The change machine 260 includes a bill management unit 261, a coin input port 264, a coin discharge port 265, and a rejection port 266. The coin input port 264, the coin discharge port 265, and the rejection port 266 are included in a coin management unit. The bill management unit 261 includes a bill input port 262 and a bill discharge port 263. The bill input port 262 is a port that intakes bills input by the customer. The bill discharge port 263 is a port that discharges bills and rejected bills. The bill input port 262 and the bill discharge port 263 are configured in two levels. For example, in the bill management unit 261, the upper level is the bill input port 262, and the lower level is the bill discharge port 263.

The coin input port 264 is a port that intakes coins input by the customer. The coin discharge port 265 is a port that discharges coins serving as change, coins that failed to be identified by a currency identification unit provided by the change machine 260, and coins identified as counterfeit coins by the currency identification unit. The rejection port 266 is a port that discharges coins when a cancellation operation is performed after depositing. The bill input port 262 and the coin input port 264 are a deposit port. The bill discharge port 263, the coin discharge port 265, and the rejection port 266 are a withdrawal port. The issuing port 210a outputs various receipts from a receipt discharge port.

The change machine 260 and the issuing port 210a face the bill input port 262, the bill discharge port 263, the coin input port 264, the coin discharge port 265, the rejection port 266, and the receipt discharge port toward the customer side and protrude from a customer-side lateral face of a counter base. This disposition reduces a risk of the customer hitting their toes against the counter base when standing near the change machine 260. For example, the change machine 260 and the issuing port 210a are housed in a single housing, and this housing protrudes from the customer-side lateral face of the counter base.

Figure 6:
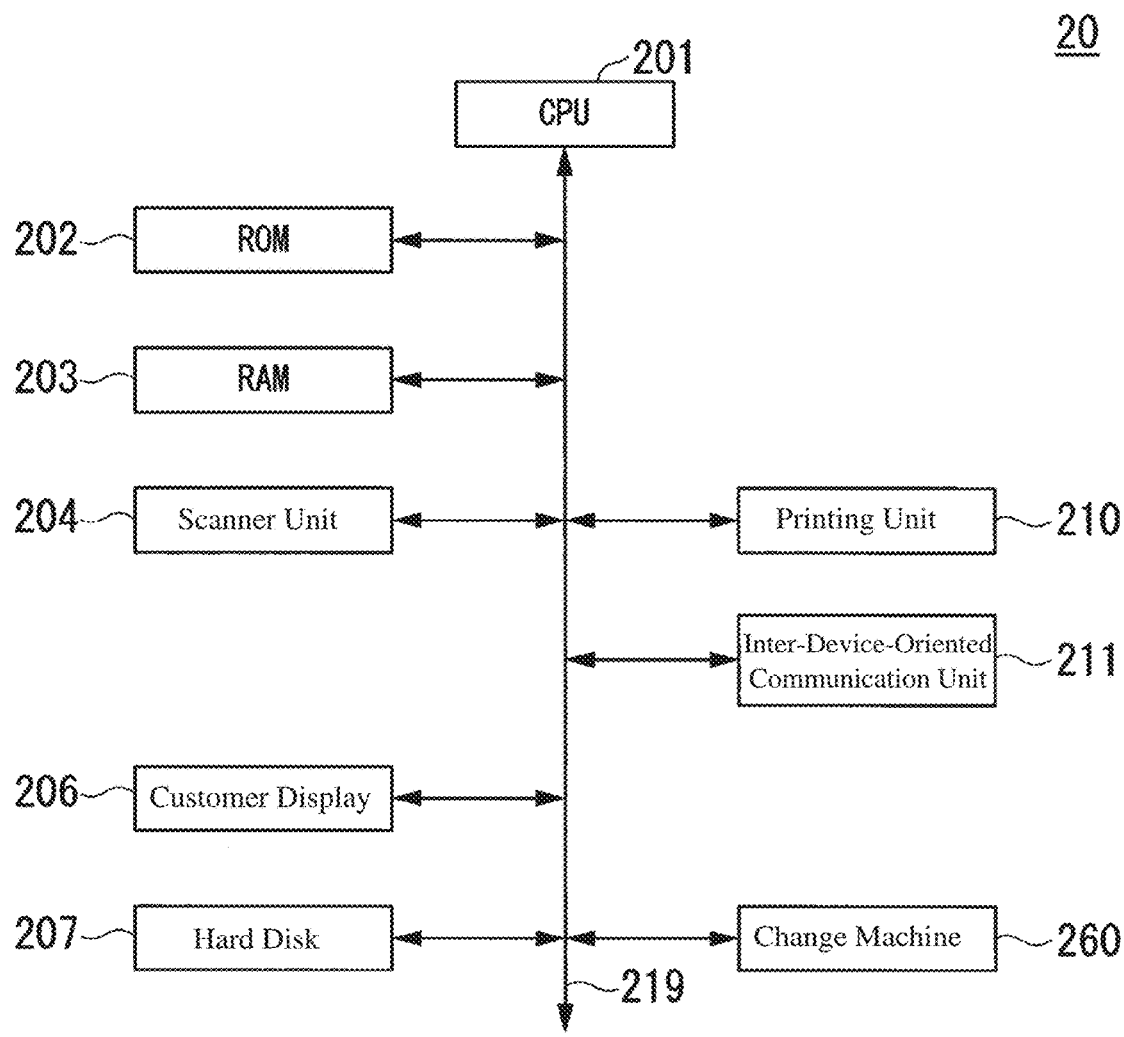
FIG. 6 is a diagram illustrating a configuration example of the settlement device according to the first embodiment.

FIG. 6 is a block diagram illustrating a configuration example of the settlement device 20. The settlement device 20 includes a CPU 201, a ROM 202, a RAM 203, the scanner unit 204, the customer display 206, a hard disk 207, a printing unit 210, an inter-device-oriented communication unit 211, and the change machine 260. These are mutually connected via a bus 219. The inter-device-oriented communication unit 211 may be used for communicating with an employee identification tag in a third embodiment described below and thus may be omitted in the first embodiment.

The CPU 201 executes various processes for realizing functions as the settlement device 20 by executing a program.

The ROM 202 stores various information. For example, the ROM 202 stores the program executed by the CPU 201. Moreover, the ROM 202 stores information relating to display by the customer display 206 (screen information, message information, and the like). Moreover, the ROM 202 stores a device number for identifying its device. Moreover, the ROM 202 may store information relating to printing by the printing unit 210 (printing content, printing format information, and the like). The scanner unit 204 optically reads coded information and stores the read information in the RAM 203.

The RAM 203 is used as a work region for the CPU 201 to execute processing and computation.

The scanner unit 204 optically reads coded information. The scanner unit 204 can read information such as a member number printed as a barcode or the like on a membership card.

The customer display 206 is configured as a touch panel, displays information for the customer, and receives an operation of the customer touching a screen.

As an auxiliary storage device of the CPU 201, the hard disk 207 stores various information necessary for the settlement device 20. The hard disk 207 may store a program for causing the CPU 201 to execute the settlement process or the like. Moreover, the hard disk 207 may store various information generated due to the program being executed. Moreover, the hard disk 207 may store the information relating to display by the customer display 206 and the information relating to printing by the printing unit 210.

The printing unit 210 prints a receipt or the like on paper and discharges the receipt from a discharge port.

The inter-device-oriented communication unit 211 communicates with, for example, another settlement device 20 or the management device 30.

Figure 7:
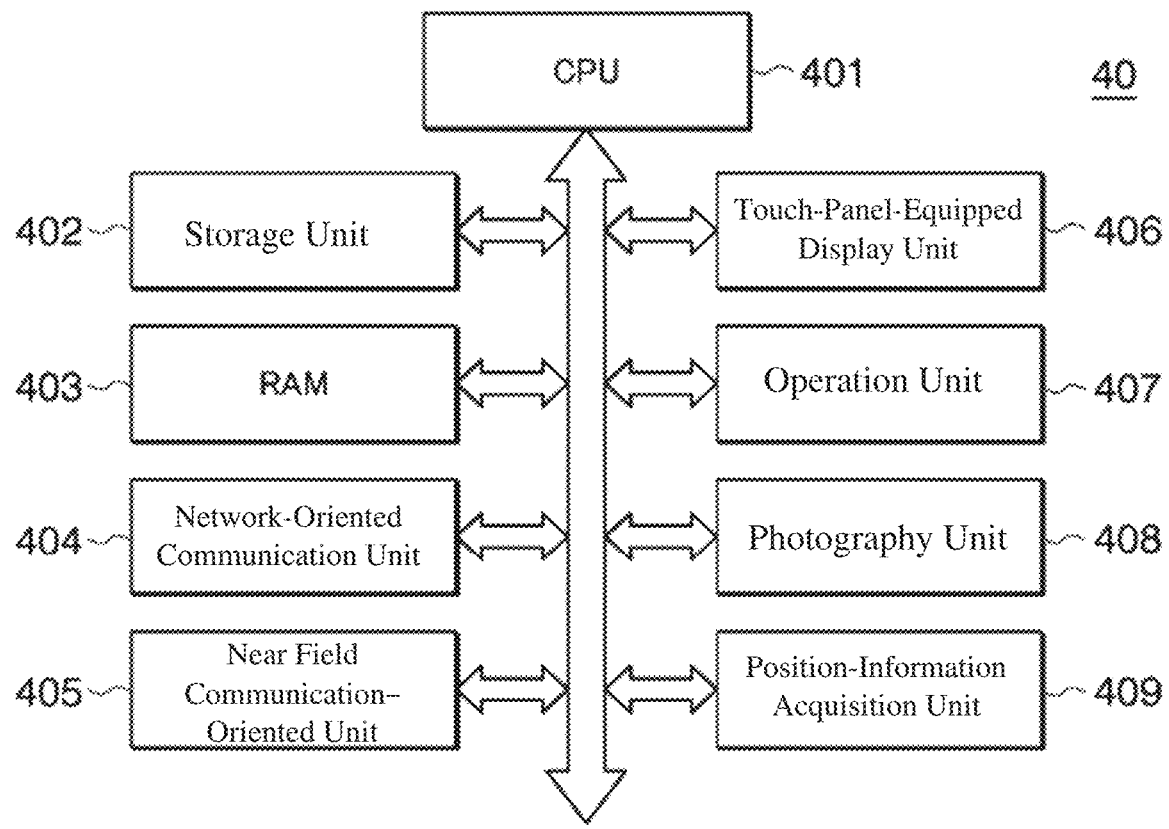
FIG. 7 is a diagram illustrating a configuration example of a mobile terminal device according to the first embodiment.

A configuration example of the mobile terminal device 40 is described with reference to FIG. 7. The mobile terminal device 40 in this diagram includes a CPU 401, a storage unit 402, a RAM 403, a network-oriented communication unit 404, a near field communication-oriented communication unit 405, a touch-panel-equipped display 406, an operation unit 407, a photography unit 408, and a position-information acquisition unit 409.

The CPU 401 realizes various processes in the mobile terminal device 40 by executing a program.

The storage unit 402 is an auxiliary storage device of the CPU 401 and stores various data in addition to the program executed by the CPU 401.

The RAM 403 is a main storage device of the CPU 401.

The network-oriented communication unit 404 executes communication with a network via a phone line or a wireless LAN.

The near field communication-oriented communication unit 405 performs near field communication according to, for example, the Bluetooth standard. That is, the near field communication-oriented communication unit 405 performs near field communication with the near field communication unit 112 in the weighing and pricing device 10. This enables communication between the mobile terminal device 40 and the weighing and pricing device 10.

The touch-panel-equipped display 406 is a display combined with a touch panel.

The operation unit 407 collectively refers to keys and the like, other than the touch-panel-equipped display 406, whereby operations are performed.

The photography unit 408 performs photography. The mobile terminal device 40 has a code-information scanning function that uses the photography unit 408. That is, in this code-information scanning function, when the mobile terminal device 40 recognizes that code information is included in a photographed image obtained by photography by the photography unit 408, the mobile terminal device 40 acquires the code information from the photographed image.

In the shopping application, the code-information scanning function using the photography unit 408 is used to read code information provided on a product and to read a connection information code displayed on the weighing and pricing device 10. Reading the code information provided on the product specifies the product to be registered from a product code included in the code information. Such specifying of the product to be registered may be realized by, for example, a generic object recognition process using a photographed image obtained by photographing the product using the photography unit 408. In this situation, as a result of the generic object recognition process, one product may be specified, or a plurality of candidates may be presented. When presenting a plurality of candidates, the product to be registered may be specified by the customer selecting one among the plurality of presented candidates.

The position-information acquisition unit 409 measures its own position and acquires position information indicating the measured position. The position-information acquisition unit 409 may be configured by, for example, being provided with a positioning device compatible with the GPS (Global Positioning System).

A configuration example of the transaction management server 50 is described with reference to FIG. 8. The transaction management server 50 in this diagram includes a CPU 501, a storage unit 502, a RAM 503, and a communication unit 504.

The CPU 501 realizes various processes in the transaction management server 50 by executing a program.

The storage unit 502 is an auxiliary storage device of the CPU 501 and stores various data in addition to the program executed by the CPU 501.

The RAM 503 is a main storage device of the CPU 501.

The communication unit 504 executes communication with the settlement device 20, the mobile terminal device 40, and the like.

Note that the transaction management server 50 may also include a display, an operation unit, and the like so a manager can perform an operation or the like.

The transaction management server 50 stores, for example, customer information such as that illustrated in FIG. 9A. The customer information illustrated in FIG. 9A includes customer identification information, a customer name, a customer registration date, cancellation information, a customer rank, a number of points, and the like. The customer identification information is identification information uniquely identifying a customer. The customer name is a name, nickname, or the like of the customer. The customer registration date is a time and date of customer registration. The cancellation information is information relating to cancellation of a registered product after registration. The customer rank is a rank according to a purchase history of the customer. Note that when generating customer information of a new customer, the customer identification information, the customer name, and the customer registration date are generated, but other information (such as the cancellation information) is not generated because this is before an actual transaction (product registration) is started.

The transaction management server 50 generates and stores the customer identification information at a time of, for example, customer registration (for example, when, in order to use a service provided by the transaction management server 50, the mobile terminal device 40 downloads or installs the shopping application from an external source (for example, a predetermined server providing apps at large or this transaction management server 50)). Moreover, at the time of customer registration for example, the transaction management server 50 acquires information input in a name field of a registration form (input form) using the mobile terminal device 40 and stores this as the customer name. Moreover, the transaction management server 50 acquires, for example, a current time and date at the time of customer registration and stores this as the customer registration date.

Note that the transaction management server 50 may, instead of or in addition to storing the customer information in its own storage unit, store a portion or an entirety of the customer information in another device (such as a file server that the transaction management server 50 can access).

Store information is acquired from the management device 30 of each store. That is, the transaction management server 50 stores the store information by, for example, receiving the store information directly from the management device 30 of each store or indirectly via another device.

The transaction management server 50 stores, for example, store information such as that illustrated in FIG. 9B. The store information illustrated in FIG. 9B includes store identification information, a store name (branch name), store specification information 1, and store specification information 2. The store identification information is identification information uniquely identifying a store. The store identification information illustrated in FIG. 9B is composed of a store (trade name) or company code and a branch code. The store name is a name of the store. The store name illustrated in FIG. 9B is composed of a store (trade name) or company and a branch name. Store specification information 1 is information of two-dimensional code (for example, a QR code (registered trademark)) for specifying a transacting store (store wherein the product is bought and sold). Store specification information 2 is position information (GPS information) of the store for specifying the transacting store. Note that in the example illustrated in FIG. 9B, the store identification information and store specification information 1 differ. However, the store identification information and store specification information 1 may be identical.

Note that the transaction management server 50 may acquire the store information and the like from an external source (such as a headquarters server (not illustrated) over all stores) and store such. Moreover, the transaction management server 50 may, instead of or in addition to storing the store information in its own storage unit, store a portion or an entirety of the store information in another device (such as a file server that the transaction management server 50 can access).

Product information is acquired from, for example, the management device 30 of each store. That is, the transaction management server 50 stores the product information by, for example, receiving the product information directly from the management device 30 of each store or indirectly via another device. Note that the transaction management server 50 may acquire the product information from an external source (such as a headquarters server (not illustrated) over all stores) and store such. Moreover, the transaction management server 50 may, instead of or in addition to storing the store information in its own storage unit, store a portion or an entirety of the store information in another device (such as a file server that the transaction management server 50 can access).

The basket information is information for managing individual transactions. The transaction management server 50 generates the basket information when a transaction starts. Moreover, the transaction management server 50 updates the basket information as the transaction progresses (each time a product is registered) (a product being stored in the basket information may be interpreted as this product being registered).

The transaction management server 50 stores, for example, basket information such as that illustrated in FIG. 9C.

The basket information illustrated in FIG. 9C includes basket identification information, a transaction starting time and date, a transaction ending time and date, the customer identification information, registered product information, deferred-product information, the cancellation information, and the like. The basket identification information is identification information uniquely identifying a basket (transaction). The basket identification information illustrated in FIG. 9C is composed of the store identification information, a date, and a serial number (for example, a serial number according to store and date). The transaction starting time and date is a starting time and date of the transaction. The transaction starting time and date illustrated in FIG. 9C is a generation time and date of this basket information. Note that the transaction starting time and date may be a registration time and date of a first product (time and date of storing registered product information (registered product 1) in FIG. 9C). Both the generation time and date of the basket information and the registration time and date of the first product may be stored, these being stored separately.

The transaction ending time and date is an ending time and date of the transaction. The transaction starting time and date illustrated in FIG. 9C is a settlement time and date. The customer identification information is customer identification information identifying the customer in this transaction. Note that when generating the basket information, the basket identification information, the transaction starting time and date, and the customer identification information are generated, but other information (such as the transaction ending time and date) is not generated because this is before an actual transaction (product registration) is started. Note that the settlement time and date may be a settlement starting time and date or a settlement ending time and date. Both the settlement starting time and date and the settlement ending time and date may be stored, these being stored separately.

Registered product information (total) is information updated each time a product is registered. Registered product information (total) includes an article count (product count), an estimated subtotal monetary amount (estimated subtotal monetary amount before price calculation according to Price Determination Logic), a subtotal monetary amount (subtotal monetary amount after price calculation according to Price Determination Logic), and the like. Registered product information (1) is registration information of the first product. Registered product information (2) is registration information of a second product. Note that the example illustrated in FIG. 9C omits illustration of registered product information (3) to registered product information (5). Registered product information (N; N being an integer) includes the product code, an article name (product name), a price, and the like.

Registered product information (N) may include a registration time and date of this Nth product. That is, the transaction management server 50 may store as the registered product information a registration time and date of this registered product. The registration time and date of each product may be used as a basis for determining whether to apply a special offer such as a time-based special offer (special offer according to Selling-Price Determination Logic E) and determining an effect following application.

Deferred-product information (total) is information updated each time a deferred product (described below) is registered. Deferred-product information (total) includes a number of deferred products (product count), a number of NON-FILE among the deferred products, a number of reading NG (requiring confirmation of unauthorized operation) among the deferred products, and the like.

NON-FILE refers to a barcode having been successfully scanned (a product code having been able to be read) in the store but the product code not being stored in the product information or to a product whose product code was successfully scanned in the store but whose product code is not stored in the product information.

Reading NG refers to scanning of a product code having failed (a product code having been unable to be read) in the store or to a product for which scanning of the product code in the store has failed. That is, reading NG is performing a time-out process when it can be determined that, for example, a product is being photographed for a certain amount of time by image recognition art but this does not lead to barcode recognition. Alternatively, reading NG is the product subjected to the time-out process. For example, reading NG is determined when a barcode cannot be correctly acquired (recognized) due to wrinkles or the like in packaging or due to faint or soiled barcode printing. Moreover, reading NG is also determined when an unauthorized operation of pretending to read a barcode and placing the product in the basket is detected. Note that the mobile terminal device 40 includes a sensor (for example, a gyro sensor, an acceleration sensor, or a distance sensor) and can detect that this mobile terminal device 40 is reading a barcode (specifically, a condition wherein this mobile terminal device 40 is tilted to read the barcode and an article (product) is present at a certain distance from this mobile terminal device 40). Moreover, when no barcode was able to be read in a predetermined amount of time (when barcode reading continued for a predetermined amount of time but no barcode was read), the time-out process renders this to be a deferred product (reading NG).

Deferred-product information (deferred product 1) is information of a first deferred product. Deferred-product information (deferred product 2) is information of a second deferred product. Deferred-product information (deferred product 3) is information of a third deferred product.

Deferred-product information (deferred product N; N being an integer) includes a deferred-product type (information indicating whether this deferred product is NON-FILE or reading NG) and image data (image data photographed at a time of reading NG). For example, when an Nth product is a NON-FILE deferred product, deferred-product information (deferred product N) includes the deferred-product type "1 (NON-FILE)" and image data. Moreover, when the Nth product is a reading NG deferred product, deferred-product information (deferred product N) includes the deferred-product type "2 (reading NG)" and image data.

Note that the transaction management server 50 may, instead of or in addition to storing the basket information in its own storage unit, store a portion or an entirety of the basket information in another device (such as a file server that the transaction management server 50 can access).

Functions of the shopping application installed on the mobile terminal device 40 are described with reference to FIG. 10A to FIG. 10C and FIG. 11A to FIG. 11D.

Figure 10A:
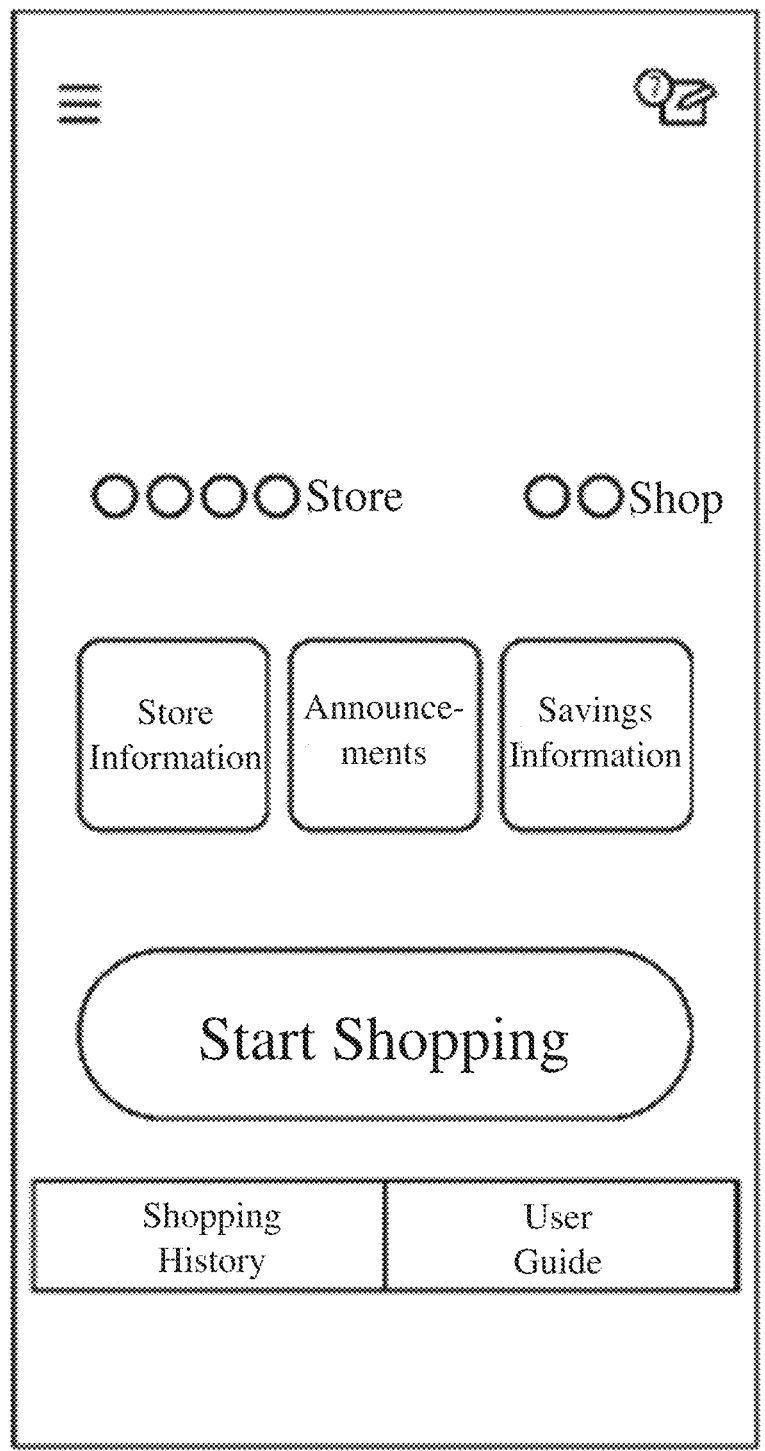
FIG. 10A is a diagram illustrating an example of one aspect of a start screen according to the first embodiment.

When the customer operates the mobile terminal device 40 and starts up the shopping application, the mobile terminal device 40 whereon the shopping application operates first displays, as illustrated in FIG. 10A, a start-up screen on the touch-panel-equipped display 406. In the start-up screen in this diagram, a "Store information" button, an "Announcements" button, and a "Savings information" button are disposed. Moreover, a shopping start button indicating the text "Start shopping" is disposed.

Figure 10B:
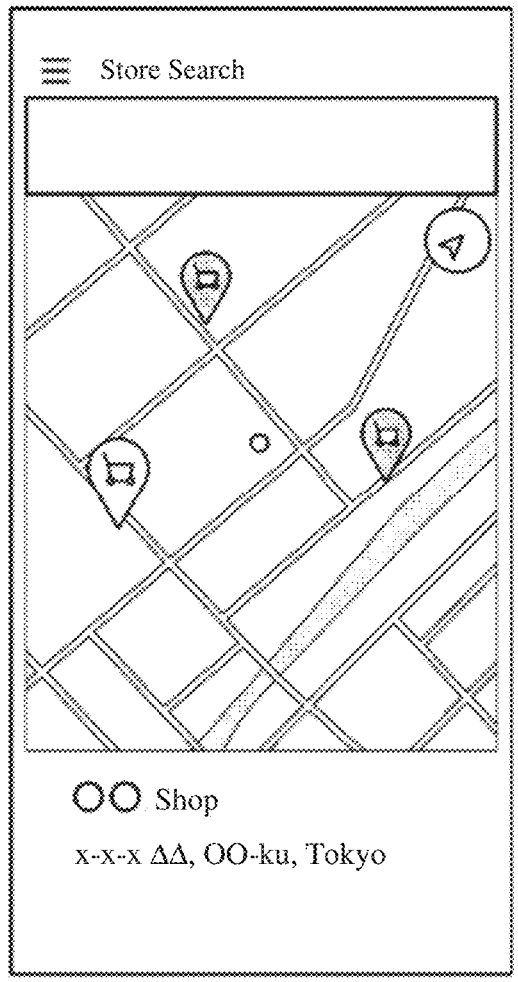
FIG. 10B is a diagram illustrating an example of one aspect of a nearby store guide screen according to the first embodiment.

For example, when the customer operates (taps) the "Store information" button, display of the touch-panel-equipped display 406 transitions to a nearby store guide screen as illustrated in FIG. 10B. The nearby store guide screen displays, on a map, stores wherein the shopping application can be used (usable stores) that are present within a certain range based on one's position acquired by the position-information acquisition unit 409. In this diagram, an example is illustrated wherein three marks indicating usable stores are disposed based on a current position of the mobile terminal device 40.

In displaying such a nearby store guide screen, the mobile terminal device 40 transmits its own position information and a usable-store search request to, for example, a store information server (illustration omitted; the transaction management server 50 or the like may also be used as the store information server) that manages information relating to usable stores (usable-store information). In response to receiving the usable-store search request, the store information server searches for usable stores positioned within a certain distance range based on the position information received together with the usable-store search request. The store information server transmits information of the searched usable stores to the mobile terminal device 40. The mobile terminal device 40 uses the received usable-store information to display the nearby store guide screen.

The shopping application may have, for example, a shopping-list function. The customer can perform an operation of registering a product they are thinking of buying in a shopping list.

When the shopping application has the shopping-list function in this manner, the mobile terminal device 40 is made to, for example, also include information of the product registered in the shopping list in the usable-store search request. The store information server includes a list of categories of products sold at the store in the usable-store information of each store. In response to receiving the usable-store search request, the store information server transmits the usable-store information to the mobile terminal device 40 upon including information indicating a presence or absence of the product registered in the shopping list for each unit of usable-store information that is searched on the basis of being within a certain range from the position of the mobile terminal device 40. In this situation, the mobile terminal device 40 may display the usable stores on the map so the presence or absence of the product registered in the shopping list can be visually confirmed. As a display aspect of the usable stores that enables the presence or absence of the product registered in the shopping list to be visually confirmed, for example, a coloring or size of the marks indicating the usable stores may be changed between usable stores having the product registered in the shopping list and usable stores not having such.

Figure 10C:
FIG. 10C is a diagram illustrating an example of one aspect of a store information screen according to the first embodiment.

Furthermore, in a state wherein the nearby store guide screen is displayed as in FIG. 10B, the customer performing an operation of selecting the mark of any store (for example, an operation of tapping the mark) causes, as illustrated in FIG. 10C, a store information screen indicating information of the selected store to be displayed.

As above, in the start-up screen of FIG. 10A, the "Announcements" button and the "Savings information" button are disposed. The "Announcements" button and the "Savings information" button are also disposed in the store information screen of FIG. 10C.

Figure 11A:
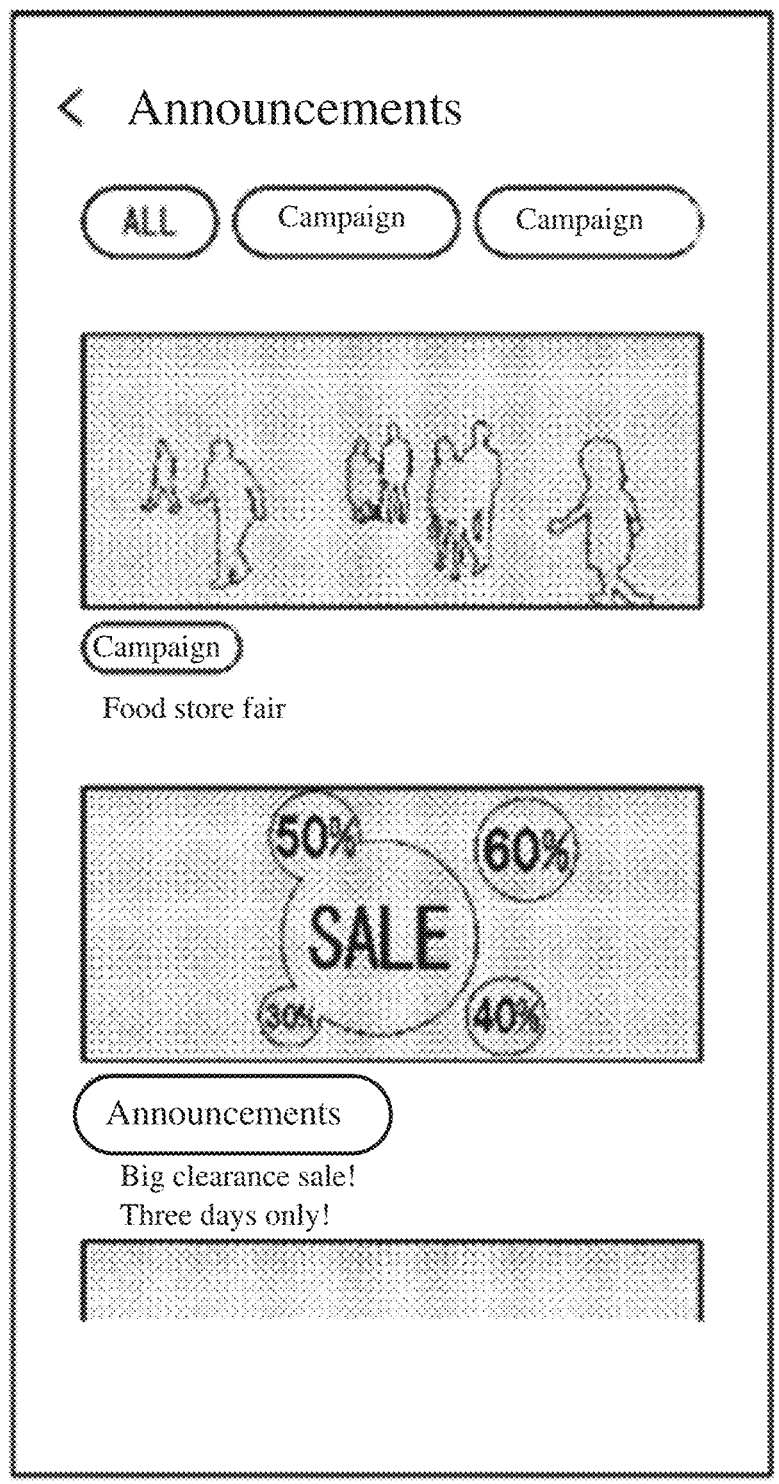
FIG. 11A is a diagram illustrating an example of one aspect of an advertisement screen, a code scanning screen, and a settlement guide screen according to the first embodiment.

When the customer operates the "Announcements" button in a state wherein the start-up screen or the store information screen is displayed, as illustrated in FIG. 11A, an advertisement screen providing information on events, sale notices, and the like prepared by the corresponding usable store as "Announcements" is displayed.

Figure 11B:
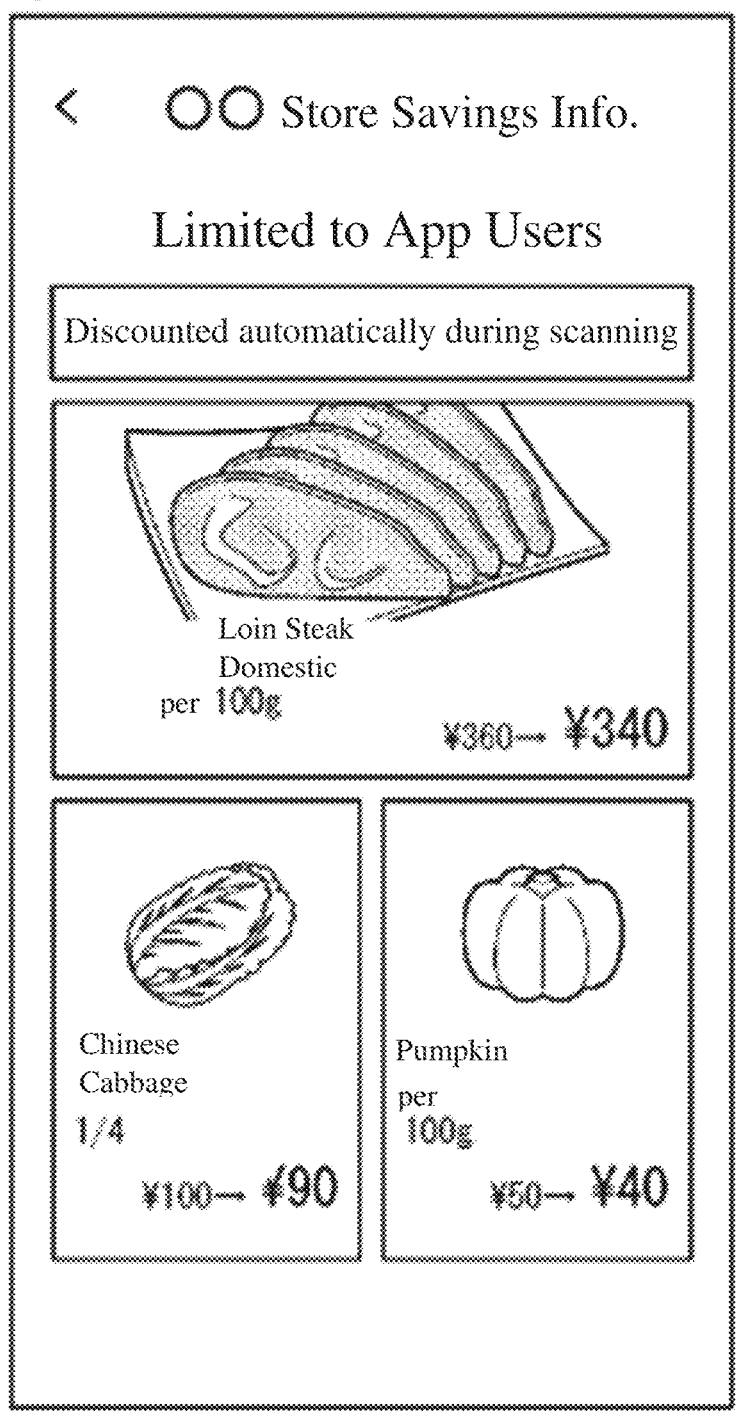
FIG. 11B is a diagram illustrating an example of one aspect of an advertisement screen, a code scanning screen, and a settlement guide screen according to the first embodiment.

Moreover, when the customer operates the "Savings information" button, as illustrated in FIG. 11B, an advertisement screen providing information on special offers such as discounts for the customer using the shopping application is displayed.

Display of these advertisement screens may be performed based on advertisement information included in the usable-store information transmitted from the store information server.

Figure 11C:
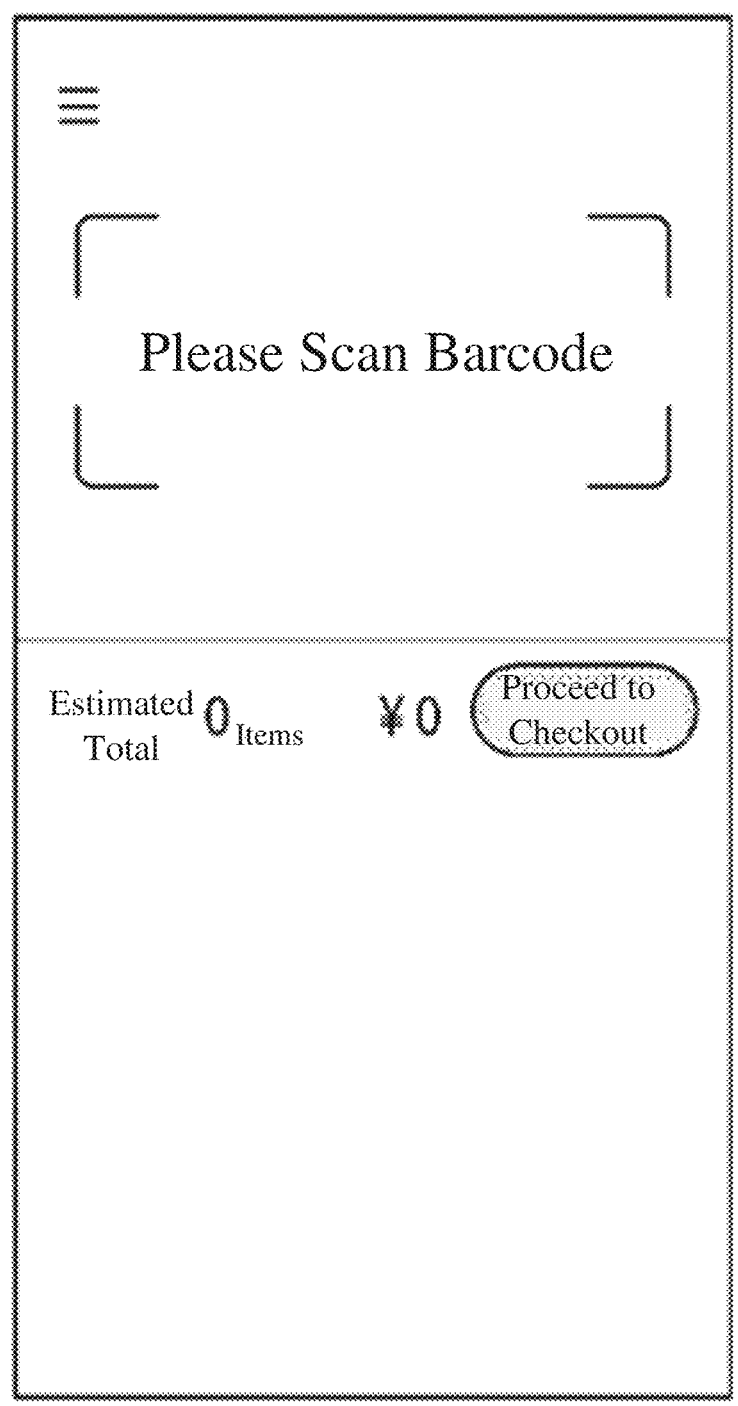
FIG. 11C is a diagram illustrating an example of one aspect of the code scanning screen according to the first embodiment.

Furthermore, when the shopping start button disposed in the start-up screen of FIG. 10A is operated, as illustrated in FIG. 11C, the touch-panel-equipped display 406 transitions to a code scanning screen. The customer can perform a product registration operation using the mobile terminal device 40 whereon the code scanning screen is displayed.

Here, instead of the shopping area wherein the weighing and pricing device 10 is disposed, an example of the product registration operation in the shopping area wherein a product shelf is disposed is described as a basic example of the product registration operation.

The customer, for example, removes a product they would like to purchase (product to be purchased) from the product shelf. The customer performs an operation of causing the photography unit 408 of the mobile terminal device 40 in a state wherein the code scanning screen is displayed to read code information of a code (which is a barcode but may also be two-dimensional code) provided on the removed product to be purchased.

The code information read in this manner is transmitted from the mobile terminal device 40 to the transaction management server 50 as product registration information for one product. The transaction management server 50 includes the received product registration information in basket information for one transaction (settlement information). Moreover, the product registration information based on the read code information may be stored in the mobile terminal device 40.

When the registration operation for all products to be purchased is finished, the customer performs a predetermined operation instructing product-registration completion (product registration completion operation) on the mobile terminal device 40. When the product registration completion operation is performed, the mobile terminal device 40 may notify product-registration completion to the transaction management server 50. Upon receiving the notice of product-registration completion, the transaction management server 50 can manage the basket information of the corresponding transaction as basket information for which product registration is completed.

When the product registration completion operation is performed, as illustrated in FIG. 11D, a settlement guide screen is displayed on the touch-panel-equipped display 406 of the mobile terminal device 40. The settlement guide screen in this diagram displays a message guiding the customer to head to the settlement device 20 for settlement and, as two-dimensional code for example, transaction code information indicating the transaction corresponding to the present product registration. The transaction code information includes a transaction identifier uniquely indicating the transaction. This transaction identifier may, for example, be issued by the transaction management server 50 and be notified to the mobile terminal device 40 in response to the mobile terminal device 40 transmitting product registration information for the first time in the corresponding transaction.

The customer heads to the settlement device 20 and causes the scanner unit 204 of the settlement device 20 to read the two-dimensional code displayed on the settlement guide screen. The settlement device 20 acquires the basket information corresponding to the transaction identifier indicated by the read two-dimensional code from the transaction management server 50. The settlement device 20 uses the acquired basket information to execute the settlement process according to a customer operation. Note that the settlement device 20 may include one or more card readers for a predetermined card for a situation of, for example, the customer performing settlement by using or combining card types such as a credit card, an electronic money card, and a point card.

According to one or more embodiments, a customer who has installed the shopping application on a mobile terminal device 40 they possess can perform product registration by operating their mobile terminal device 40. Moreover, settlement at the settlement device 20 is also performed by a customer operation. By product registration and settlement being performed by the customer in this manner, in one or more embodiments, there is no need for the employee to perform a product-registration operation, operate the settlement device, and the like.

Meanwhile, in the store, as illustrated in FIG. 1, there is the shopping area for selling by weight in person wherein the weighing and pricing device 10 is disposed. In such a shopping area for selling by weight, as described in relation to FIG. 1, the customer interacts with the employee operating the weighing and pricing device 10 and designates a product and a weight thereof, and the employee performs product pricing for the designated product weight using the weighing and pricing device 10.

In a shopping area that uses the weighing and pricing device 10 for in-person sales in this manner, an operation relating to product registration and a process in the sales system accompanying such differ from when the basic product registration operation described above is performed. This is described below.

Examples of processing procedures executed by the weighing and pricing device 10, the mobile terminal device 40, and the transaction management server 50 in relation to product registration in one transaction are described with reference to the flowchart in FIG. 12. Moreover, operations of an employee and a customer when the customer is shopping in a shopping area for selling by weight are also described with reference to this diagram. Note that in this diagram, to simplify description, an example is given of product registration for one transaction being completed by one or more product registration processes performed using one weighing and pricing device 10.

First, an example of the processing procedure executed by the weighing and pricing device 10 is described.

Step S101: The weighing and pricing device 10 determines whether a pricing operation for one product in one transaction is performed.

The customer wanting to purchase a product sold by weight tells the employee which product they would like to purchase and a weight thereof. The employee removes the product they are told the customer would like to purchase from the display case. The employee inputs a category of the product to be purchased to the weighing and pricing device 10 and, upon doing so, places the product on the scale (weighing unit 109). For example, the weighing and pricing device 10 may determine that the pricing operation for one product has started according to the category of the product to be purchased being input.

Moreover, in response to the pricing operation having started for the first product in one transaction, the weighing and pricing device 10 determines that product registration in one transaction has started and issues a transaction identifier to be associated with this transaction.

Step S102: In response to the pricing operation being performed, the weighing and pricing device 10 executes a pricing process. The pricing process is a product registration process executed by the weighing and pricing device 10 to register the product to be purchased.

As the pricing process, the weighing and pricing device 10 receives input of the product category by the employee and acquires the category of the product to be purchased. The weighing and pricing device 10 calculates a price of the product by using a weight unit price and a weight measured by the weighing unit 109 (for example, a weight measured when fluctuations stop and stability is achieved after the product is placed on the weighing unit 109). The weighing unit 109 displays the category of the product to be purchased, the measured weight, the price, and the like on, for example, the employee display 105 and the customer display 106.

The employee has the customer confirm the weight and the like and, upon obtaining customer approval, performs an operation of instructing pricing establishment of the product to be purchased.

Step S103: When pricing is established for one product to be purchased as above, the weighing and pricing device 10 displays a connection information code on the customer display 106. The connection information code may be displayed as, for example, two-dimensional code. The connection information code is control information for connecting the mobile terminal device 40 whereon the shopping application operates to the weighing and pricing device 10 by, for example, Bluetooth. The connection information code includes the transaction identifier issued for the present transaction.

Figure 13:
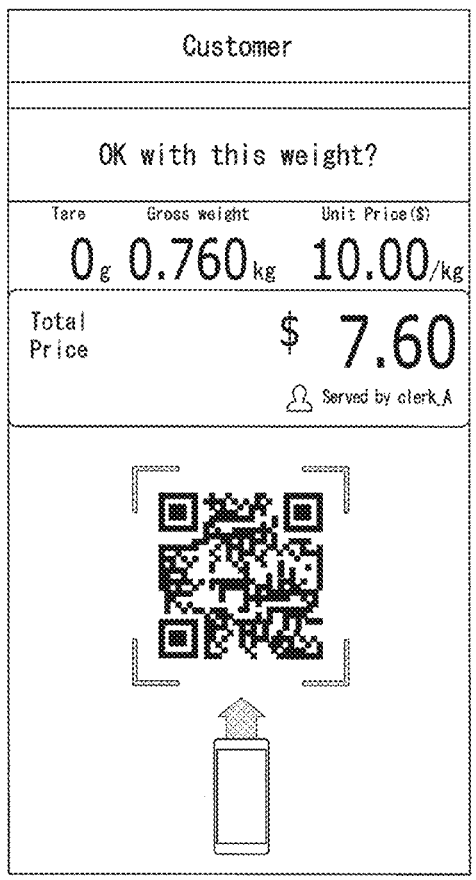
FIG. 13 is a diagram illustrating an example of a display aspect of a connection information code screen according to the first embodiment.

FIG. 13 illustrates an example of an aspect of a connection information code screen displayed on the customer display 106. This diagram illustrates an example of an aspect wherein the customer display 106 has a vertically long display area and the writing on the screen is in English.

In the connection information code screen in this diagram, the connection information code in two-dimensional code is displayed, and an image of a mobile terminal device is displayed together with an arrow indicating the two-dimensional code. This enables the customer to intuitively grasp that the two-dimensional code is to be read by the mobile terminal device 40.

Moreover, in the connection information code screen, pricing-related information concerning the product to be priced (a packaging weight (Tare), the measured weight (Gross weight), the weight unit price (Unit Price), the price (Total Price), and the like) is given. Moreover, a message prompting the customer to confirm whether registration may be performed using the measured weight ("OK with this weight?") is displayed.

Upon confirming a content of the pricing-related information displayed on the connection information code screen, the customer is made to perform an operation, using the mobile terminal device 40, of reading the connection information code in two-dimensional code displayed on the connection information code screen.

Note that a message, pop-up window, icon, or the like for notifying the employee that the connection information code is being displayed on the customer display 106 may be displayed on the employee display 105.

Note that the displaying of the connection information code at step S103 may be performed at the following timings. The connection information code may be displayed at a timing when a fluctuation amount of the weight value according to the weighing unit 109 for the product to be priced becomes no greater than a certain amount. Moreover, the connection information code may be displayed at a timing when the weight value according to the weighing unit 109 for the product to be priced stabilizes and the weight value for price calculation is established. Moreover, the connection information code may be displayed at a timing when the weight value for price calculation is established and the price is calculated. Moreover, the connection information code may be displayed in response to an operation. For example, the employee may perform an operation of displaying the connection information code at any timing, such as a timing of starting the transaction or a timing when the price of the product to be priced is established. The operation of displaying the connection information code in this situation may be, for example, an operation of touching a button instructing display of the connection information code disposed in a screen displayed on the employee display 105.

Moreover, a display timing of the price of the product to be priced and the connection information code on the customer display 106 when the connection information code is displayed in response to an employee operation may be as follows. For example, the weighing and pricing device 10 displays the price of the product on the customer display 106 at a timing when the price of the weighed product to be priced is established. Afterward, the weighing and pricing device 10 may, in response to an operation of displaying the connection information code being performed, additionally display the connection information code on the same screen, together with the price of the product to be priced. Alternatively, the weighing and pricing device 10 may be configured to not display the product price at the timing when the price of the product to be priced is established by weighing and to display the price of the product to be priced and the connection information code on the same screen in response to an operation of displaying the connection information code being performed after the price of the product to be priced is established.

Figure 12:
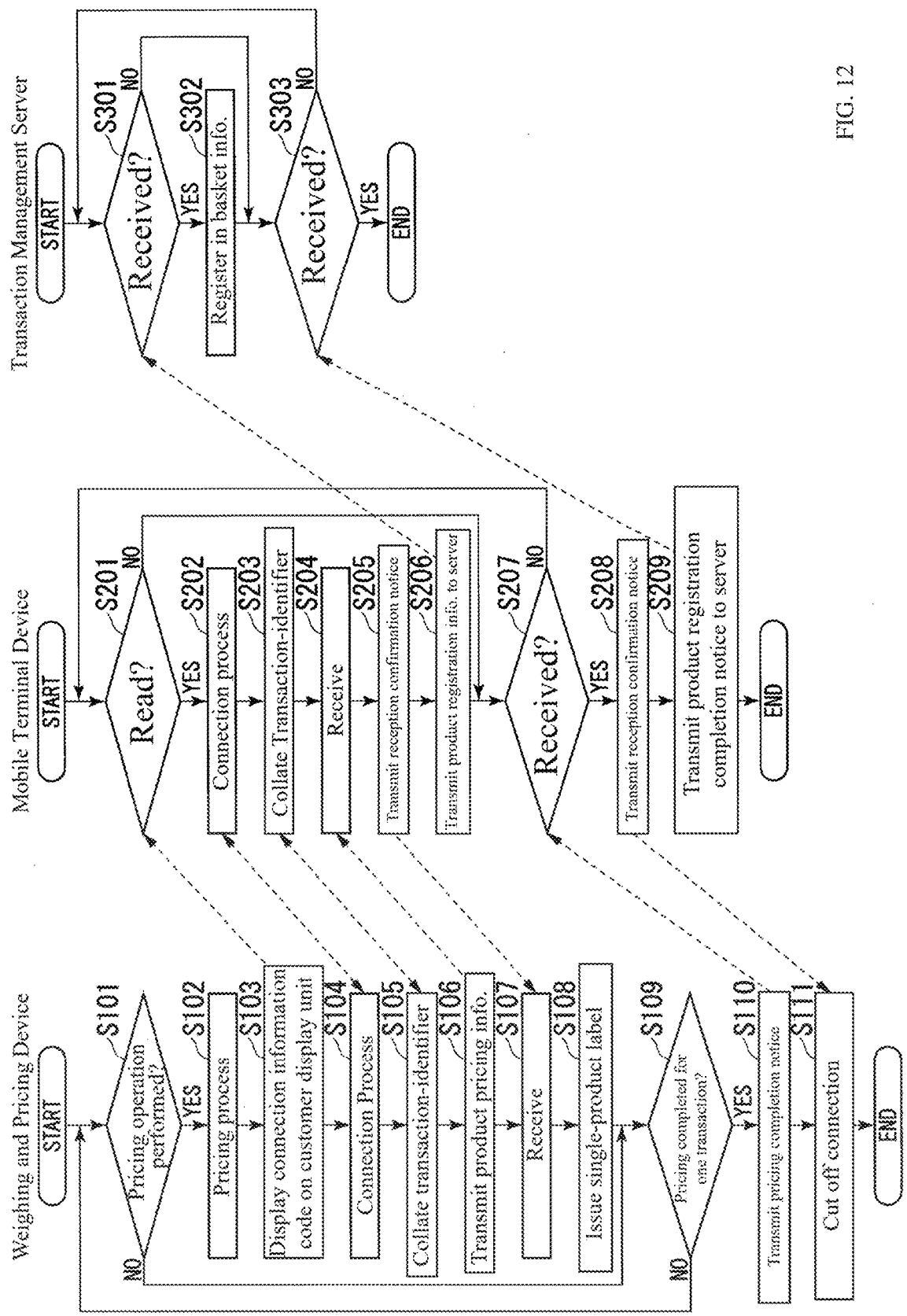
FIG. 12 is a flowchart illustrating an example of a processing procedure executed by the weighing and pricing device, the mobile terminal device, and the transaction management server according to the first embodiment in relation to product registration in one transaction.

The description returns to FIG. 12.

Step S104: The weighing and pricing device 10 executes a connection process of establishing a connection in response to a connection request from the mobile terminal device 40 that has read the connection information code.

Note that the weighing and pricing device 10 may stop displaying the connection information code on the customer display 106 in response to a connection being established by the connection process at step S104.

For example, the connection information code may be continuously displayed on the weighing and pricing device 10, or a plate or the like whereon the connection information code is presented may be continuously disposed near the weighing and pricing device 10. However, in this situation, there is a possibility of, for example, a customer not involved in the target transaction causing the mobile terminal device 40 to read the connection information code and needlessly connecting the weighing and pricing device 10 and the mobile terminal device 40. Therefore, the weighing and pricing device 10 controlling starting and ending display of the connection information code enables a needless connection between the weighing and pricing device 10 and the mobile terminal device 40 such as above to be avoided.

Step S105: The weighing and pricing device 10 in a state of being connected to the mobile terminal device 40 by the connection process at step S104 performs a transaction-identifier collation process. That is, the weighing and pricing device 10 determines whether the transaction identifier issued for the present transaction matches the transaction identifier notified from the mobile terminal device 40 whereto it is connected.

Step S106: When it is determined in the transaction-identifier collation process at step S105 that the transaction identifiers match, the weighing and pricing device 10 transmits product pricing information (one example of registration process information) reflecting the result of the pricing process for one product at step S102 to the mobile terminal device 40 whereto it is connected.

Step S107: When the product pricing information transmitted at step S106 was able to be received normally by the mobile terminal device 40, a reception confirmation notice is transmitted from the mobile terminal device 40 to the weighing and pricing device 10. The weighing and pricing device 10 receives the transmitted reception confirmation notice.

Step S108: In response to receiving the reception confirmation notice, the weighing and pricing device 10 issues a label for the product for which the pricing process was performed at step S102 (single-product label) by causing the printing unit 110 to print the single-product label.

Figure 14:
FIG. 14 is a diagram illustrating an example of one aspect of a single-product label according to the first embodiment.

FIG. 14 illustrates an example of one aspect of the single-product label. Information such as the product name, a processing date, an expiration date, the weight unit price, the weight, and the price is printed on such a single-product label. Moreover, information indicating, for example, a department handled by the shopping area for selling by weight may also be printed on the single-product label. Moreover, a code (in this diagram, a barcode) including at least a portion of the information printed as characters or the like as above may be printed on the single-product label. However, so this code is not confused with a label for the general customer, it is preferable to change an aspect—for example, in printing "Registered" or the like or in a label format. The employee affixes the single-product label issued in this manner on the product to be priced.

The description returns to FIG. 12.

Step S109: When it is determined that no pricing operation for one product was performed at step S101, or after the process of step S108 is executed, the weighing and pricing device 10 determines whether product pricing for one transaction is completed.

Upon confirming that pricing is completed for all products designated by the customer for one transaction, the employee performs an operation of declaring pricing completion for one transaction (pricing completion operation) on the weighing and pricing device 10. In response to the pricing completion operation being performed, the weighing and pricing device 10 determines that product pricing for one transaction is completed.

When it is determined that product pricing for one transaction is not completed, the processing returns to step S101.

Step S110: When it is determined that product pricing for one transaction is completed, the weighing and pricing device 10 transmits a pricing completion notice to the mobile terminal device 40 whereto it is connected.

Step S111: Upon receiving the pricing completion notice transmitted at step S110, the mobile terminal device 40 transmits a reception confirmation notice to the weighing and pricing device 10. This reception confirmation notice transmitted at step S111 notifies that the pricing completion notice was received normally. Upon receiving the reception confirmation notice, the weighing and pricing device 10 executes a process of cutting off the communication connection it has hitherto had with the mobile terminal device 40.

Next, an example of the processing procedure executed by the mobile terminal device 40 is described.

Step S201: In a state wherein the code scanning screen is displayed on the touch-panel-equipped display 406, the mobile terminal device 40 determines whether a code has been read.

Step S202: As above, when one product designated by the customer is priced by the weighing and pricing device 10 according to an employee operation and the pricing is established, the connection information code is displayed on the customer display 106 of the weighing and pricing device 10. Here, the customer operates the mobile terminal device 40 in the state wherein the code scanning screen is displayed to cause the mobile terminal device 40 to read the displayed connection information code. It is determined thereby that a code was read at step S201.

Because the code read in this situation is the connection information code, the mobile terminal device 40 and the weighing and pricing device 10 execute between them a process of the mobile terminal device 40 communicably connecting to the weighing and pricing device 10 whereto it is to be connected according to a connection procedure indicated by the connection information code.

Step S203: The mobile terminal device 40 connected to the weighing and pricing device 10 at step S202 executes the transaction-identifier collation process together with the weighing and pricing device 10 whereto it is connected. At this time, the mobile terminal device 40 transmits the transaction identifier included in the connection information code read at step S201 to the weighing and pricing device 10.

Step S204: As above, in the weighing and pricing device 10, when it is determined by the transaction-identifier collation process that the transaction identifiers match, the product pricing information is transmitted at step S106. The mobile terminal device 40 receives the transmitted product pricing information.

Step S205: The mobile terminal device 40 transmits the reception confirmation notice notifying that the product pricing information is received to the weighing and pricing device 10.

Step S206: Moreover, the mobile terminal device 40 transmits product registration information for one product reflecting a content of the product pricing information received at step S204 to the transaction management server 50. The product registration information transmitted in this manner includes a transaction identifier.

Step S207: The mobile terminal device 40 determines whether the pricing completion notice transmitted by the weighing and pricing device 10 at step S110 is received. When it is determined that no pricing completion notice is received, the processing returns to step S201.

Step S208: When it is determined at step S207 that the pricing completion notice was received, the mobile terminal device 40 transmits the reception confirmation notice to the weighing and pricing device 10 as a notice that the pricing completion notice was received.

Step S209: Moreover, the pricing completion notice being received means that product registration for one transaction in the shopping area for selling by weight is completed. Therefore, the mobile terminal device 40 transmits to the transaction management server 50 a product registration completion notice that is a notice that product registration for one transaction is completed.

Next, an example of the processing procedure executed by the transaction management server 50 is described.

Step S301: The transaction management server 50 determines whether the product registration information transmitted at step S206 by the mobile terminal device 40 for one transaction is received.

Step S302: When the product registration information is received at step S301, the transaction management server 50 registers (adds) the received product registration information to the basket information for the present transaction. This establishes registration of one product (product type) in one transaction. Note that when step S302 is executed for the first time for one transaction, the transaction management server 50 registers the received product registration information upon newly generating basket information, this registration being performed using this generated basket information. In newly generating basket information, the basket identification information stored in the basket information can be generated using the transaction identifier included in the product registration information transmitted at step S206.

Step S303: When it is determined that no product registration information is received at step S301, or after the process of step S302 is executed, the transaction management server 50 determines whether the product registration completion notice transmitted at step S209 by the mobile terminal device 40 is received. When it is determined that no product registration completion notice is received, the processing returns to step S301. When it is determined that the product registration completion notice is received, the process relating to generating basket information for one transaction illustrated in this diagram ends. In response to the process relating to generating basket information for one transaction ending, registration of all products for one transaction is established.

According to the processing in this diagram, the weighing and pricing device 10 is configured to issue a single-product label in response to receiving, from the mobile terminal device 40 whereto it is connected, a reception confirmation notice regarding the product pricing information. In other words, although not specifically illustrated in the processing in this diagram, the weighing and pricing device 10 does not issue a single-product label when no reception confirmation notice from the mobile terminal device 40 whereto it is connected is obtained, even if the product pricing information is transmitted from the weighing and pricing device 10. At this time, for example, error notification is performed. As such, the weighing and pricing device 10 only issues single-product labels for products for which product pricing information is received by the mobile terminal device 40.

In this situation, a single-product label being issued enables the employee and the customer to confirm that pricing information necessary to register a product sold by weight has been received normally by the mobile terminal device 40. That is, the employee and the customer can accurately determine whether the product registration process has been executed normally in the mobile terminal device 40.

Second Embodiment

Next, a second embodiment is described. The previous first embodiment gives an example of a situation wherein a customer wanting to purchase a product in a shopping area wherein a weighing and pricing device 10 is disposed uses a mobile terminal device 40 to receive product registration.

A store may be operated so as to be able to handle both customers who shop by using a mobile terminal device 40 to perform product registration and customers who shop without using a mobile terminal device 40.

In waiting on customers who shop without using a mobile terminal device 40, for shopping in a shopping area wherein a product shelf is disposed, a POS register operated by an employee is disposed in the store, and the customer brings to the POS register a product they selected and removed from the product shelf. It is sufficient for the employee operating the POS register to register and perform settlement for the product brought by the customer.

Alternatively, a registration device that performs product registration as operated by an employee may be disposed in the store. The customer brings the product they selected and removed from the product shelf to the registration device. The employee operating the registration device performs an operation of registering the product brought by the customer. Settlement information reflecting a result of a product registration process by the registration device is made to be acquired in a predetermined aspect by a settlement device 20. Specifically, the settlement information may be transmitted to the settlement device 20 directly from the registration device or via a host device.

Alternatively, a configuration may be such that by the registration device issuing a checkout ticket (registered trademark) and the customer causing the settlement device 20 to read code information printed on the checkout ticket, the settlement device 20 acquires settlement information associated with a transaction identifier indicated by the code information from the registration device, the host device, or the like. Alternatively, the settlement information may be included in the code information printed on the checkout ticket. It is sufficient for the customer to perform settlement by operating the settlement device 20 that has acquired the settlement information.

Alternatively, a full-self-checkout POS register may be disposed in the store. The customer may perform operations of registering and performing settlement for the product they brought from the product shelf at the full-self-checkout POS register.

In a sales system of the second embodiment, a shopping area for products sold by weight wherein a weighing and pricing device 10 is disposed is configured so customers who shop using a mobile terminal device 40 and customers who shop without using a mobile terminal device 40 are respectively waited on as follows.

Figure 15:
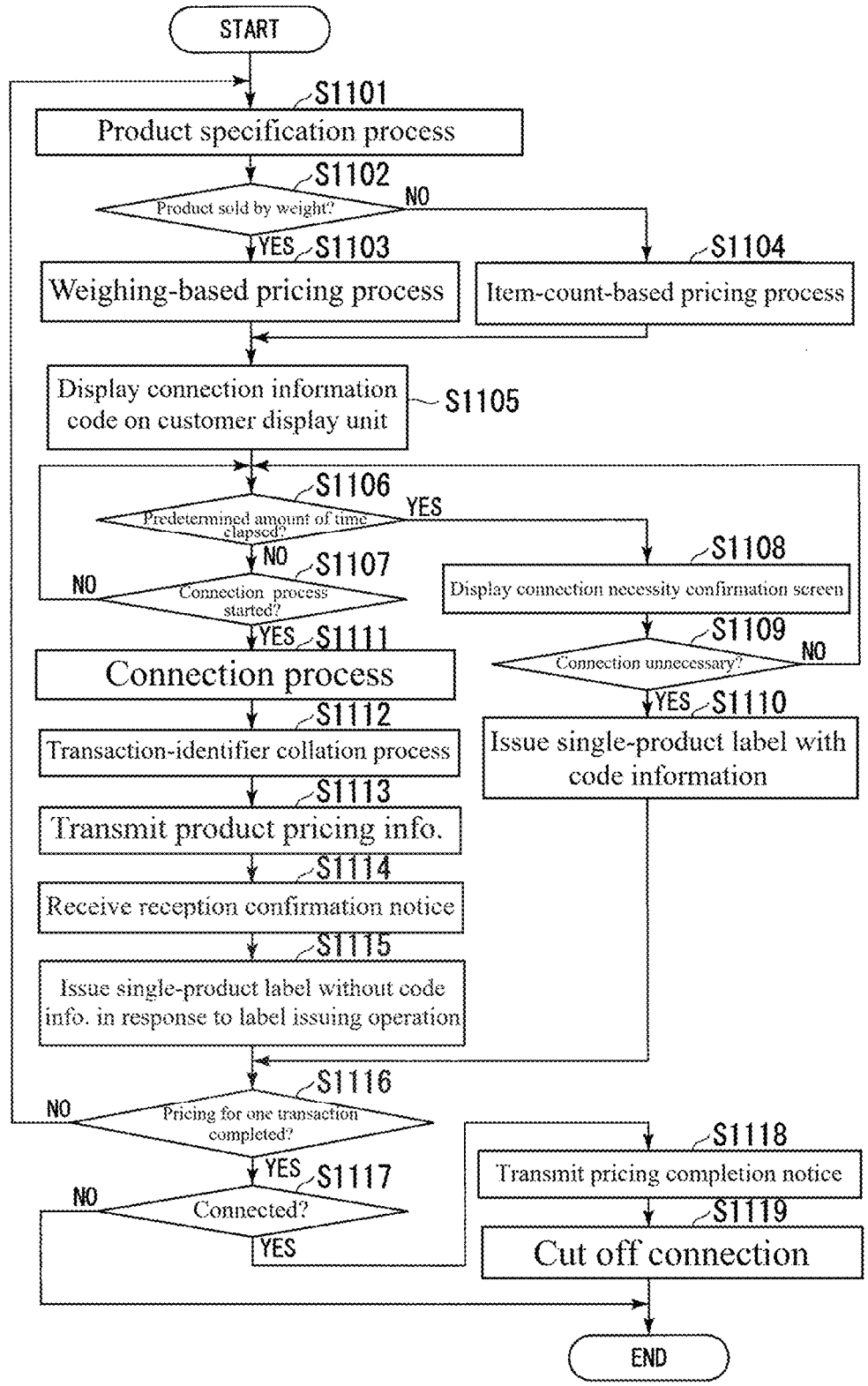
FIG. 15 is a flowchart illustrating an example of a processing procedure executed by a weighing and pricing device according to a second embodiment in performing pricing in one transaction.

The flowchart in FIG. 15 illustrates an example of a processing procedure executed by the weighing and pricing device 10 according to the second embodiment in performing pricing in one transaction.

Note that the following description gives an example wherein in the shopping area for products sold by weight, pricing is performed for specified fixed-price products in addition to products sold by weight.

Moreover, processes of the mobile terminal device 40 and a transaction management server 50 corresponding to the processes of the weighing and pricing device 10 in this diagram may be similar to FIG. 12.

Step S1101: The weighing and pricing device 10 first executes a product specification process. The product specification process is a process of specifying which type a product to be priced is among a product sold by weight and a fixed-price product. As the product specification process, it is sufficient for the weighing and pricing device 10 to, for example, determine, according to an input of a product category by an employee operation, whether a type indicated in a product master for the input product category is a product sold by weight or a fixed-price product.

Note that the operation of inputting the product category performed by the employee in the product specification process corresponds to designating a product to be registered. That is, the weighing and pricing device 10 designates a product to be registered in response to the operation for inputting the product category performed by the employee.

Note that the product specification process at step S1101 may include a process of acquiring product-related information of a name and image of the product to be priced. Moreover, the product specification process at step S1101 may include a process of price-related acquisition of a monetary amount per unit weight (weight unit price) of the product to be priced, an item count per unit weight for the product to be priced, or the like. Moreover, the product specification process at step S1101 may be performed in response to the employee operating a preset key displayed on an employee display 105 of the weighing and pricing device 10. Alternatively, the product specification process at step S1101 may be performed in response to the weighing and pricing device 10 receiving product information transmitted from a shelf label, which is disposed for each product displayed in a showcase and has a wireless function, in response to the employee or a customer performing an operation of touching the shelf label.

Step S1102: As a result of the product specification process at step S1101, the weighing and pricing device 10 determines whether the product to be priced is a product sold by weight or a fixed-price product.

Step S1103: When it is determined to be a product sold by weight at step S1102, the weighing and pricing device 10 executes a weighing-based pricing process. It is sufficient for the weighing-based pricing process to follow, for example, step S102 in FIG. 12.

Step S1104: When it is determined to be a fixed-price product at step S1102, the weighing and pricing device 10 executes an item-count-based pricing process. That is, in this situation, the employee inputs an item count of the fixed-price product to be registered to the weighing and pricing device 10. The employee may input the item count by, for example, a numeric operation. Alternatively, the employee inputting the item count may be an operation (work) of placing the product one at a time in order on a scale 109*a*. In this situation, as the product is placed one at a time on the scale 109*a*, the weighing and pricing device 10 counts a number of times a weight measured by a weighing unit 109 incrementally changes by a certain increase amount or greater as the item count of the product. Then, the weighing and pricing device 10 uses the input item count and the weight unit price set for the category of the product to be registered to calculate a price of the product.

The weighing and pricing device 10 displays the category, item count, price, and the like of the product to be purchased on, for example, the employee display 105 and a customer display 106. The employee has the customer confirm the item count and the like and, upon obtaining customer approval, performs an operation of instructing pricing establishment of the product to be purchased.

Step S1105: After the process of step S1103 or step S1104, the weighing and pricing device 10 displays a connection information code on the customer display 106 in response to pricing being established for one product to be purchased as above.

Step S1106: Pricing using the weighing and pricing device 10 is available for not only customers using a mobile terminal device 40 but also customers not using a mobile terminal device 40. In this situation, a customer using a mobile terminal device 40 performs an operation of using the mobile terminal device 40 to read the connection information code displayed on the customer display 106 at step S1105. Meanwhile, a customer not using a mobile terminal device 40 does not perform an operation of communicably connecting the mobile terminal device 40 to the weighing and pricing device 10 but orders the next product, waits to receive a product from the employee, or the like.

Therefore, the weighing and pricing device 10 determines whether a predetermined amount of time is elapsed from a point when display of the connection information code is started at step S1105. The predetermined amount of time here may be set in consideration of a standard amount of time required from the connection information code being displayed to the customer completing the operation of using the mobile terminal device 40 to read the connection information code.

Step S1107: While it is being determined at step S1106 that the predetermined amount of time is not elapsed, the weighing and pricing device 10 further determines whether a connection process is started. When, as above, the customer of the present transaction is a customer using a mobile terminal device 40, the customer performs the operation of causing the mobile terminal device 40 to read the connection information code displayed at step S1105. Then, upon reading the connection information code, the mobile terminal device 40 makes a connection request of the weighing and pricing device 10 (step S202 in FIG. 12) and starts the connection process for establishing a connection between the mobile terminal device 40 and the weighing and pricing device 10. When it starts the connection process in this manner in response to the connection request from the mobile terminal device 40, the weighing and pricing device 10 determines at step S1107 that the connection process is started.

When it is determined at step S1107 that the connection process is not started, the processing returns to step S1106. In this manner, the weighing and pricing device 10 determines whether the connection process is started within a predetermined amount of time in a state wherein the connection information code is displayed on the customer display 106 at step S1105.

Step S1108: When it is determined at step S1106 that the predetermined amount of time is elapsed, the weighing and pricing device 10 displays a connection necessity confirmation screen on the employee display 105.

In response to the predetermined amount of time elapsing from the connection information code being displayed, the weighing and pricing device 10 may, by supposing that the customer is a customer not using a mobile terminal device 40, issue a single-product label whereon code information is printed. However, there is a possibility of the predetermined amount of time elapsing due to, for example, a customer intending to use the mobile terminal device 40 forgetting to perform the operation of reading the connection information code using the mobile terminal device 40 due to, for example, being distracted by something else or the customer taking more time than expected to use the mobile terminal device 40.

Therefore, the weighing and pricing device 10 according to one or more embodiments does not immediately issue the label when the predetermined amount of time is elapsed from the connection information code being displayed on the customer display 106. Instead, it displays the connection necessity confirmation screen to seek employee confirmation on whether the customer is a customer not using a mobile terminal device 40.

Figure 16:
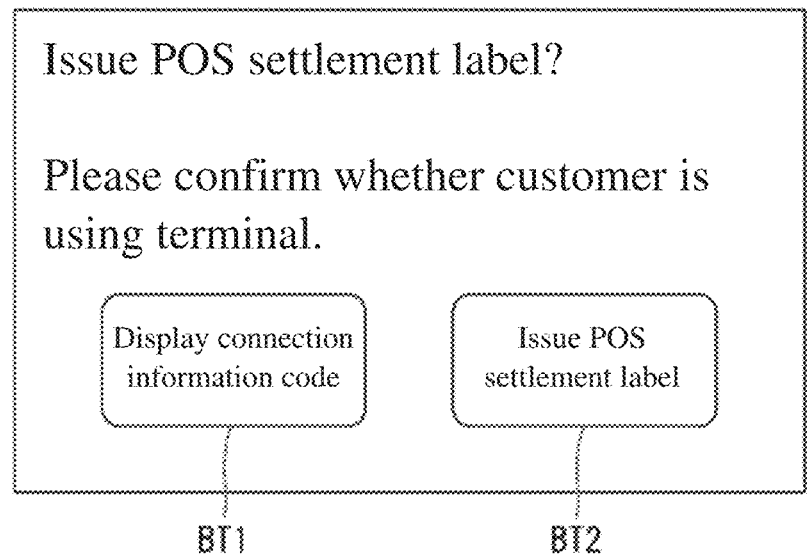
FIG. 16 is a diagram illustrating one example of a connection necessity confirmation screen according to the second embodiment.

FIG. 16 illustrates one example of the connection necessity confirmation screen. The connection necessity confirmation screen in this diagram may, for example, be in a pop-up window format and be displayed superimposed on a screen displayed on an employee-side display 26 until immediately before the label issuing operation is performed.

In the connection necessity confirmation screen in this diagram, a connection information code display button BT1 and a label issuing button BT2 are disposed. For example, the connection information code display button BT1 is a button operated when it is confirmed that the customer is a customer using a mobile terminal device 40 and the employee determines that a connection should be made to the mobile terminal device 40. The label issuing button BT2 is a button operated to issue the single-product label when the employee determines that they may proceed to issue the label because it is confirmed that the customer is not a customer using a mobile terminal device 40.

When the connection necessity confirmation screen is displayed, the employee confirms whether the customer is a customer using a mobile terminal device 40 by looking at the customer, asking the customer, or the like.

The description returns to FIG. 15.

Step S1109: In a state wherein the connection necessity confirmation screen is displayed at step S1108, the weighing and pricing device 10 determines whether a confirmation is obtained that connection is unnecessary.

When it is confirmed that the customer is a customer using a mobile terminal device 40, the employee operates the connection information code display button BT1. When the connection information code display button BT1 is operated, the weighing and pricing device 10 determines that confirmation is obtained that connection is necessary. In this situation, the processing returns to step S1106 upon the connection necessity confirmation screen being erased. This causes display of the connection information code on the customer display 106, which started at step S1105, to continue.

Note that when a configuration is such that the connection information code displayed on the customer display 106 is erased in response to the label issuing operation, the processing may return to step S1105 so the connection information code is redisplayed on the customer display 106.

Step S1110: When it is confirmed that the customer is not a customer using a mobile terminal device 40, the employee operates the label issuing button BT2 in the connection necessity confirmation screen. When the label issuing button BT2 is operated, the weighing and pricing device 10 determines that confirmation is obtained that connection is unnecessary.

In this situation, the weighing and pricing device 10 issues a single-product label reflecting a result of the pricing process for the product to be registered to the customer not using a mobile terminal device 40. The employee affixes the single-product label issued in this manner on the product to be priced.

As illustrated in FIG. 14, an aspect of the single-product label for the customer not using a mobile terminal device 40 is such that the result of the pricing process is printed in characters and the code information is printed. The code information of the single-product label for the customer not using a mobile terminal device 40 includes content that can be used when executing a product registration process by being read by a device that can perform the product registration process, such as a POS register operated by an employee, a registration device, or a full-self-checkout POS register.

Such code information may include, for example, a product code, a weight or an item count, a unit price (a weight unit price or a unit price per predetermined item count), a price, and the like. This enables a customer not using a mobile terminal device 40 to perform settlement by receiving registration of a product priced in a shopping area wherein a weighing and pricing device 10 is disposed (shopping area wherein pricing is performed).

Step S1111: The mobile terminal device 40 executes the connection process started at step S1107 and establishes a connection with the mobile terminal device 40.

Processes of steps S1112 to S1116 are similar to steps S105 to S109 in FIG. 12. However, at S1115, a single-product label is issued in response to a label issuing operation. The label issuing operation in this situation may be, for example, an operation of a predetermined key disposed in a key operation unit 108 or an operation of a predetermined key disposed in an operation screen displayed on the employee display 105. Moreover, no code information is printed on the issued single-product label. At this time, the weighing and pricing device 10 may, in response to receiving a reception confirmation notice from the mobile terminal device 40 at step S1114, display a screen whereon the label issuing operation is performed (for example, a pop-up window).

Furthermore, when issuing the single-product label at step S1115, an issuing confirmation screen for confirming issuing of the single-product label may be displayed on the employee display 105.

Figure 17:
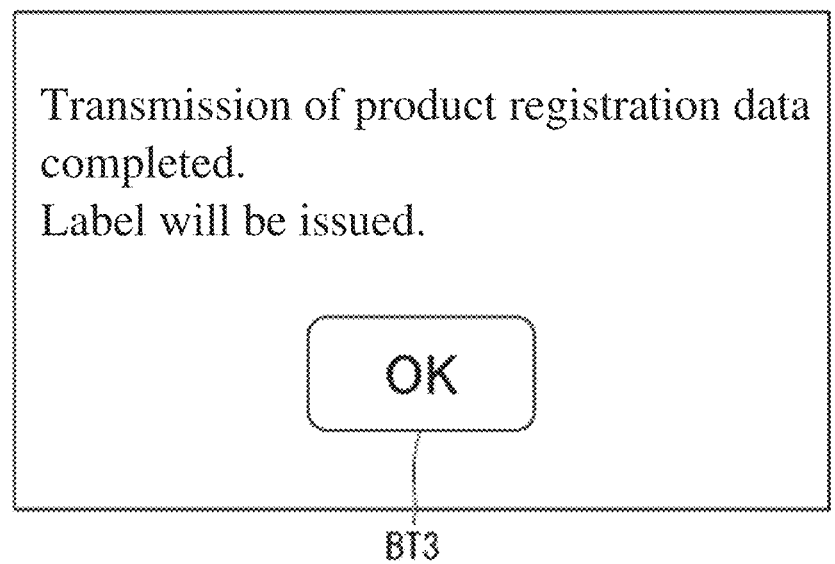
FIG. 17 is a diagram illustrating one example of an issuing confirmation screen according to the second embodiment.

FIG. 17 illustrates one example of the issuing confirmation screen. In the issuing confirmation screen in this diagram, a message is displayed notifying that the single-product label will be issued in response to transmission of product pricing information transmitted at step S1113 being completed, and a confirmation button BT3 is disposed.

The employee operates the confirmation button BT3 disposed in the displayed issuing confirmation screen to cause the weighing and pricing device 10 to issue the single-product label. The single-product label may also be issued upon receiving a reception completion notice of the product pricing information from the mobile terminal.

The description returns to FIG. 15.

Step S1117: When it is determined at step S1116 that product pricing for one transaction is completed, the weighing and pricing device 10 determines whether it is currently in a state of being connected to the mobile terminal device 40. When it determines that it is not in a state of being connected to the mobile terminal device 40, the weighing and pricing device 10 may skip a process of step S1119 and end the processing in this diagram.

Meanwhile, when it is determined at step S1117 that it is in a connected state, the weighing and pricing device 10 executes connected processes of step S1118 and S1119. The processes of steps S1118 and S1119 are similar to steps S110 and S111 in FIG. 12.

According to an example of the processing procedure such as above, in one or more embodiments, a customer shopping in a shopping area wherein pricing is performed can be waited on as follows. That is, for a customer not using a mobile terminal device 40, a single-product label whereon code information is printed is affixed on a priced product. This enables even a customer not using a mobile terminal device 40 to receive product registration at a POS register or the like. Meanwhile, for a customer using a mobile terminal device 40, because there is no need to perform product registration at a POS register or the like, a single-product label whereon no code information is printed is affixed on the priced product.

In this manner, in one or more embodiments, a single-product label whereon code information is printed is issued for a customer not using a mobile terminal device 40, and a single-product label whereon no code information is printed is issued for a customer using a mobile terminal device 40. This enables the priced product to be clearly distinguished between a product for a customer using a mobile terminal device 40 and a product for a customer not using such according to a presence or absence of code information on the single-product label. This enables an efficient transaction in selling a product priced by a weighing and pricing device 10 for both a customer using a mobile terminal device 40 and a customer not using such.

Moreover, in the processing of FIG. 15, the employee performs operations according to similar procedures for a customer using a mobile terminal device 40 and a customer not using such. Specifically, it is sufficient for the employee to perform a pricing operation—of causing the weighing and pricing device 10 to execute the pricing process of either step S1103 or step S1104—and then perform the operation of instructing issuing of a single-product label of step S1115 or step S1110. That is, regardless of whether the employee waits on a customer using a mobile terminal device 40 or a customer not using such, the operations the employee is to perform are a pricing operation and, afterward, an operation of instructing issuing of a single-product label; in this manner, the procedure is the same. As such, the employee is less likely to confuse operations in waiting on a customer using a mobile terminal device 40 and waiting on a customer not using such. This enables a more efficient transaction.

Note that in the description of FIG. 15, the label issuing operation for a single-product label whereon code information is printed is an operation of the label issuing button BT2 disposed in the connection necessity confirmation screen. However, this may be the same operation as, for example, the issuing of a single-product label whereon no code information is printed of step S1115.

Note that in the example of the processing procedure in FIG. 15, the connection information code is displayed at step S1105 after the weighing and pricing process at step S1103 or step S1104 is completed and pricing is established.

However, the connection information code may be displayed, for example, at a point prior to product registration information being registered in basket information (that is, product registration being established) in response to the product pricing information being transmitted at step S1113. As one example, the connection information code may be displayed at a timing of executing the product specification process at step S1102.

Moreover, in the example of the processing procedure in FIG. 15, the weighing and pricing device 10 and the mobile terminal device 40 are connected for each product of a registered aspect by displaying a connection information code for each product. However, the weighing and pricing device 10 and the mobile terminal device 40 may be connected once for a plurality of products to be registered in one transaction. As one example, for example, the weighing and pricing device 10 may display a connection information code for one transaction at a stage when an operation for completing pricing in one transaction is performed. In this situation, the weighing and pricing device 10 may transmit product pricing information of all products registered in this transaction to the mobile terminal device 40 whereto it is connected.

As a variation according to one or more embodiments, the processes of steps S1108 and S1109 may be omitted. That is, a configuration may be such that when the predetermined amount of time is elapsed from starting display of the connection information code at step S1106, the customer is deemed to be a customer not using a mobile terminal device 40 such that the connection necessity confirmation screen is not displayed and the processing proceeds to issue the single-product label whereon code information is printed. In this situation, the single-product label whereon code information is printed may be issued as triggered by the predetermined amount of time elapsing from starting display of the connection information code, even if no label issuing operation is performed. Moreover, like the first embodiment, in issuing the single-product label at step S1115 as well, the single-product label whereon no code information is printed may be issued as triggered by the reception confirmation notice being received at step S1114, even if no label issuing operation is performed.

As another variation according to one or more embodiments, for example, in addition to omitting the processes of steps S1108 and S1109, at step S1106, instead of determining whether the predetermined amount of time is elapsed, it may be determined whether a label issuing operation instructing issuing of a single-product label whereon code information is printed is performed.

In this situation, in a state wherein the connection information code is displayed at step S1105, the employee confirms whether the customer intends to use a mobile terminal device 40 by looking at the customer, asking the customer, or the like. Then, when it is confirmed that the customer does not intend to use a mobile terminal device 40, the label issuing operation is performed. This causes a single-product label whereon no code information is printed to be issued at step S1110.

Meanwhile, when it is confirmed that the customer intends to use a mobile terminal device 40, it is sufficient for the employee to wait for the customer to perform an operation of causing the mobile terminal device 40 to read the connection information code. Then, in response to the customer causing the mobile terminal device 40 to read the connection information code, the processes of step S1111 and subsequent steps may be executed.

An aspect of the connection necessity confirmation screen may be such that the connection information code display button BT1 is not disposed but the label issuing button BT2 is disposed. In this situation, the weighing and pricing device 10 displays the connection information code on the customer display 106 and displays the connection necessity confirmation screen on the employee display 105 at a predetermined timing after pricing is established for the product to be registered. In this situation, the customer, if they are using a mobile terminal device 40, uses the mobile terminal device 40 to read the displayed connection information code to connect communication between the mobile terminal device 40 and the weighing and pricing device 10. The weighing and pricing device 10 may erase the connection necessity confirmation screen and the connection information code in response to communication being connected. Meanwhile, when the customer is not using a mobile terminal device 40, the employee operates the label issuing button BT2 disposed in the connection necessity confirmation screen. In response to the label issuing button BT2 being operated, the weighing and pricing device 10 issues a single-product label reflecting a result of the pricing process for the product to be registered. In this situation, the weighing and pricing device 10 may erase the connection necessity confirmation screen and the connection information code in response to the label issuing button BT2 being issued.

Third Embodiment

Next, a third embodiment is described. A situation wherein, as in the processes illustrated in FIG. 15 above, a single-product label whereon code information is printed is issued for a customer not using a mobile terminal device 40 may be a situation such as follows.

That is, there is a situation wherein even though an operation corresponding to connection non-necessity is performed in the connection necessity confirmation screen displayed at step S1108, after a single-product label whereon code information is printed is issued, it is confirmed anew that the customer of the present transaction is a customer using a mobile terminal device 40.

For such a situation, it is sufficient for an employee to perform an operation of repricing the same product and, upon doing so, have the customer place the mobile terminal device 40 and a weighing and pricing device 10 in a communicably connected state so product registration is performed.

However, for a situation such as above, repricing causes the employee to repeat operation procedures for pricing twice for the same product, which may hinder efficient progression of the transaction. In particular, when a weighing operation of weighing the product is necessary, an operation of taring by numerical input, an operation of selecting a tare from tare preset keys, or the like is necessary. Normally, the product is weighed after performing a taring operation upon weighing a container (tray). As such, repricing also involves, for example, reweighing upon removing the product from the container, which wastes effort.

According to one or more embodiments is configured so even after a single-product label whereon code information is printed is issued, product registration for a customer using a mobile terminal device 40 can be performed without repricing.

Figure 18:
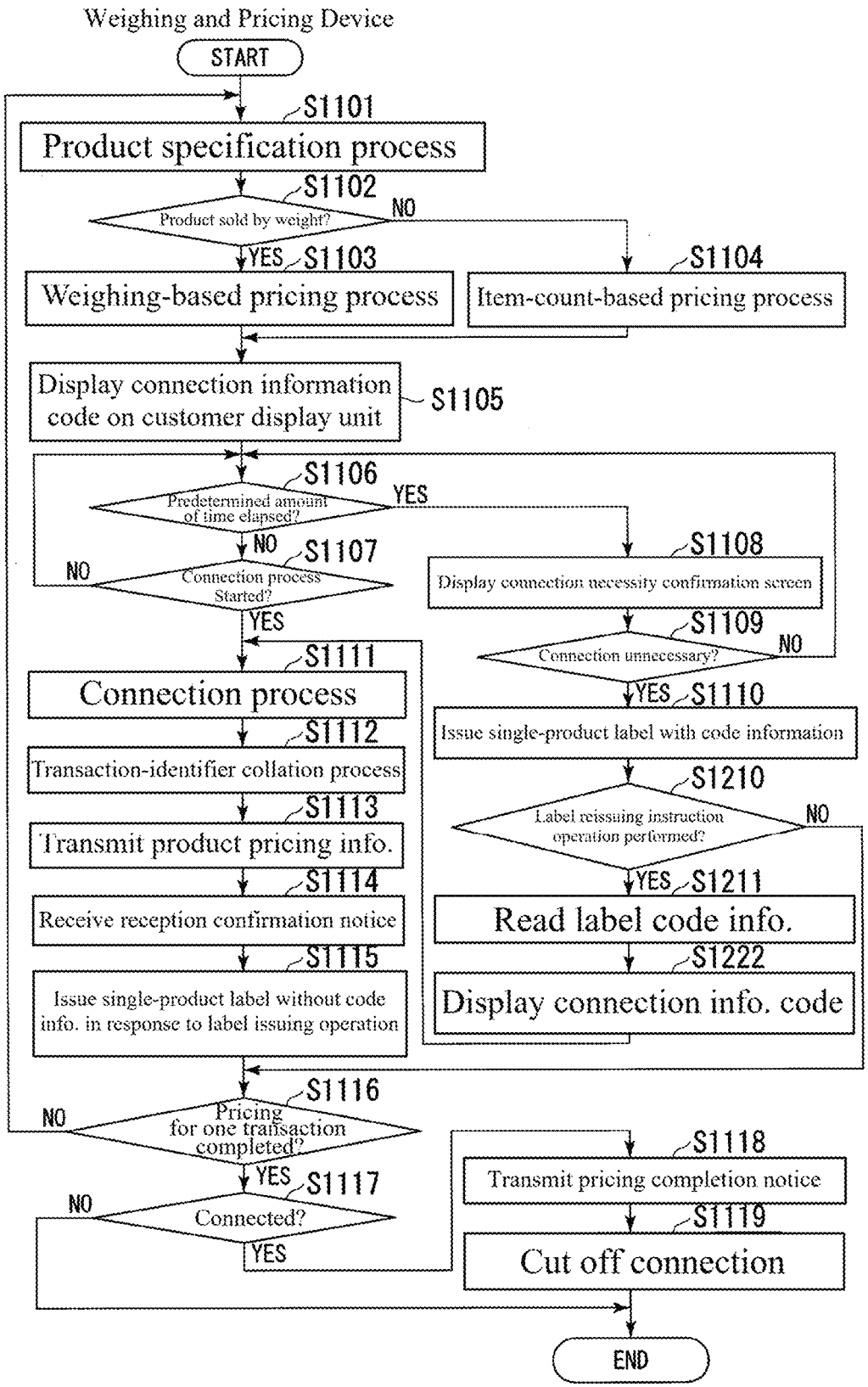
FIG. 18 is a flowchart illustrating an example of a processing procedure executed by a weighing and pricing device in a third embodiment in performing pricing in one transaction.

The flowchart in FIG. 18 illustrates an example of a processing procedure executed by the weighing and pricing device 10 according to one or more embodiments in performing pricing in one transaction. In this diagram, steps having processes similar to FIG. 15 are labeled with the same reference signs, and description thereof is omitted as appropriate.

Step S1210: The weighing and pricing device 10 executes the following process after the single-product label whereon code information is printed is issued at step S1110. That is, the weighing and pricing device 10 determines whether a label reissuing instruction operation is performed during a time until an operation of inputting a category of the next product to be priced is performed or during a time until a pricing completion operation is performed.

The employee is made to perform the label reissuing instruction operation when it is confirmed, after the single-product label is issued, that the customer is a customer using a mobile terminal device 40. The label reissuing instruction operation may be, for example, an operation of a button disposed in a predetermined position in an employee display 105. Alternatively, the label reissuing instruction operation may be performed, upon displaying a dialog window confirming the label reissuing instruction operation on the employee display 105 after the single-product label whereon code information is printed is issued, by operating a predetermined button disposed in the dialog window.

Step S1211: In response to the label reissuing instruction operation being performed, the weighing and pricing device 10 enters a state wherein code information can be input. Here, the employee performs an operation of causing a scanner unit 104 to read the code information of the single-product label issued at step S1110. The weighing and pricing device 10 acquires the code information read by the scanner unit 104. The single-product label whose code information is read is collected by the employee.

Note that the employee may perform an operation of inputting a number value corresponding to the code information (numeric entry) instead of the operation of reading the code information using the scanner unit 104.

Note that the weighing and pricing device 10 may, in response to the label reissuing instruction operation being performed, guide the employee to perform the operation of reading the code information of the issued single-product label. Such guidance may be performed by display on the employee display 105, audio output, or the like.

Figure 19:
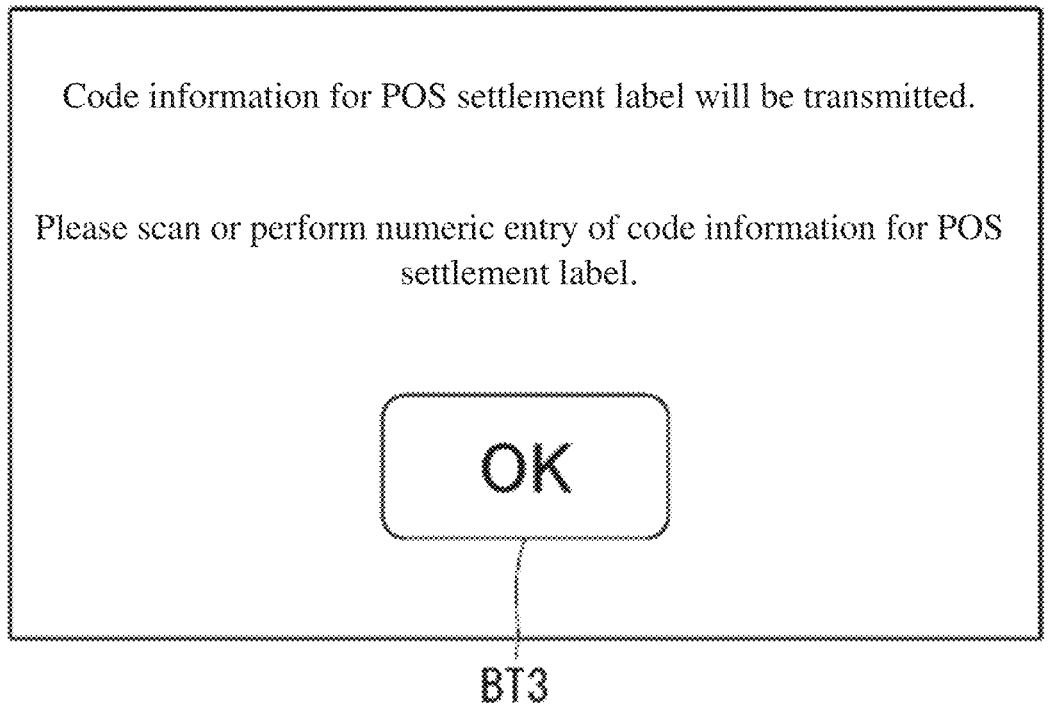
FIG. 19 is a diagram illustrating one example of a code information reading guide screen according to the third embodiment.

FIG. 19 illustrates one example of a code information reading guide screen displayed on the employee display 105 as guidance to perform an operation of inputting the code information of the single-product label.

In the code information reading guide screen in this diagram, a message guiding the employee to perform an operation of inputting the code information printed on the single-product label (reading using the scanner unit 104 or performing numeric entry) is displayed, and a confirmation button BT3 is disposed. The employee performs the operation of inputting the code information printed on the single-product label upon operating the confirmation button BT3.

The description returns to FIG. 18.

Step S1222: The weighing and pricing device 10 displays a connection information code on a customer display 106. The processing transitions to step S1111 after the process of step S1222.

The customer in this situation is made to perform an operation of using their mobile terminal device 40 to read the connection information code displayed at step S1222. This causes the mobile terminal device 40 to execute a connection process for communicably connecting to the weighing and pricing device 10. At this time, the weighing and pricing device 10 executes the processes of steps S1111 to S1115 and subsequent processes. That is, the product corresponding to the single-product label whereon code information is printed is registered in basket information in a transaction management server 50 by being transmitted again as product pricing information at step S1113. That is, it is treated as a product registered in a transaction using the mobile terminal device 40.

Note that when a transaction number is made to be included in the code information of the single-product label, the weighing and pricing device 10 may reissue a single-product label including the code information read at step S1211 and transmit product pricing information including the transaction number to the mobile terminal device 40.

Meanwhile, when, for example, information of a product number and a monetary amount is included in the code information of the single-product label but no transaction number is included, the weighing and pricing device 10 may reissue a single-product label upon calculating a weight from a weight unit price of this product (which may be, for example, acquired from a product master or input by the employee) and the monetary amount included in the code information read at step S1211.

Moreover, because settlement can be performed using, for example, the information of the product number and the monetary amount of the product, the weighing and pricing device 10 may transmit at least this information of the product number and monetary amount of the product to the mobile terminal device 40.

For example, label issuing records may be stored in a predetermined device in a sales system. In this situation, the weighing and pricing device 10 may, for example, search for a corresponding label issuing record from among the stored label issuing records by using predetermined information included in the code information read at step S1211 as a search key and transmit the searched-for label issuing record as the product pricing information.

Fourth Embodiment

Next, a fourth embodiment is described.

In the above first embodiment, the weighing and pricing device 10 issues a single-product label for one product each time pricing is established for one product in one transaction.

In contrast, a weighing and pricing device 10 according to the fourth embodiment issues, in response to pricing for one transaction being completed, an addition label whereon content indicating a total amount of monetary amounts of products priced in one transaction is printed.

Figure 20:
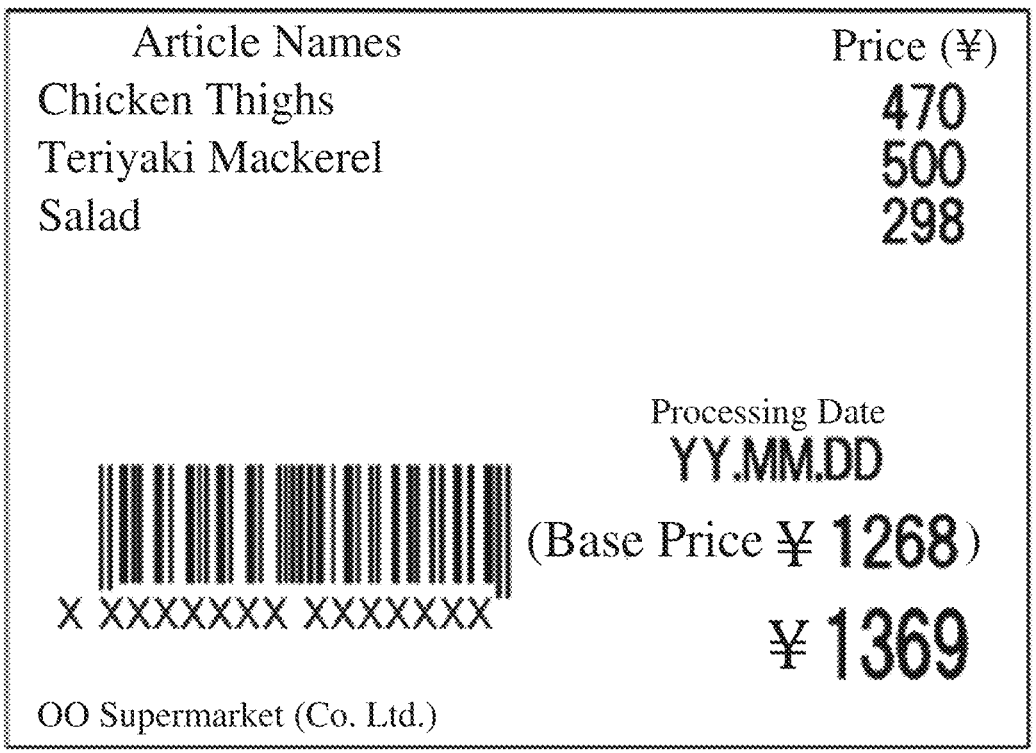
FIG. 20 is a diagram illustrating an example of one aspect of an addition label in a fourth embodiment.

FIG. 20 illustrates an example of one aspect of the addition label. In this diagram, names of three products whose pricing is established in one transaction, prices of each product, a total amount of the prices of each product, and the like are printed.

Moreover, code information (this diagram illustrating an example that is a barcode) is printed on the addition label in this diagram. Information printed as the barcode of the addition label may not be particularly limited as long as it is information that the weighing and pricing device 10 can acquire from a product pricing process in one transaction. As the simplest example, the code information of the addition label may, for example, indicate information of a department code handled by a shopping area wherein the weighing and pricing device 10 is disposed and of the total amount of the product prices.

Moreover, the code information of the addition label may include a transaction identifier and information of each product whose pricing is established in one transaction. Such code information of the addition label enables, in correcting a transaction history after a settlement process for a returned product or the like for example, the transaction history to be called up and corrected by causing a settlement device 20 or the like to read the code information of the addition label. Moreover, inspection of products sold by weight in one transaction is also enabled by causing the settlement device 20 or the like to read the code information of the addition label.

An example of a processing procedure of the weighing and pricing device 10 in the fourth embodiment is described based on FIG. 12.

In the processing procedure of the weighing and pricing device 10, first, step S108 in FIG. 12 may be omitted. Moreover, a step is added of issuing an addition label after it is determined at step S109 that product pricing for one transaction is completed.

Note that the weighing and pricing device 10 may issue a single-product label each time pricing is established for a product and issue an addition label in response to pricing for one transaction being completed.

In this manner, in issuing an addition label and single-product labels for each product whose pricing is established, when code information of the addition label includes a transaction identifier and information of each product whose pricing is established in one transaction, code-information printing may be omitted in the single-product labels.

Furthermore, the fourth embodiment may be configured as follows when applied to the second embodiment or the third embodiment.

For example, when this is based on the flowchart of FIG. 15 or FIG. 18, the processes of steps S1110 and S1115 are omitted. Moreover, a step is added of issuing an addition label after it is determined at step S1117 that product pricing for one transaction is completed.

In this situation, as the step of issuing an addition label, when a mobile terminal device 40 has hitherto not been connected to the weighing and pricing device 10, an addition label whereon code information is printed may be issued, and when these have hitherto not been connected, an addition label whereon no code information is printed may be issued.

Fifth Embodiment

Next, a fifth embodiment is described.

Figure 21:
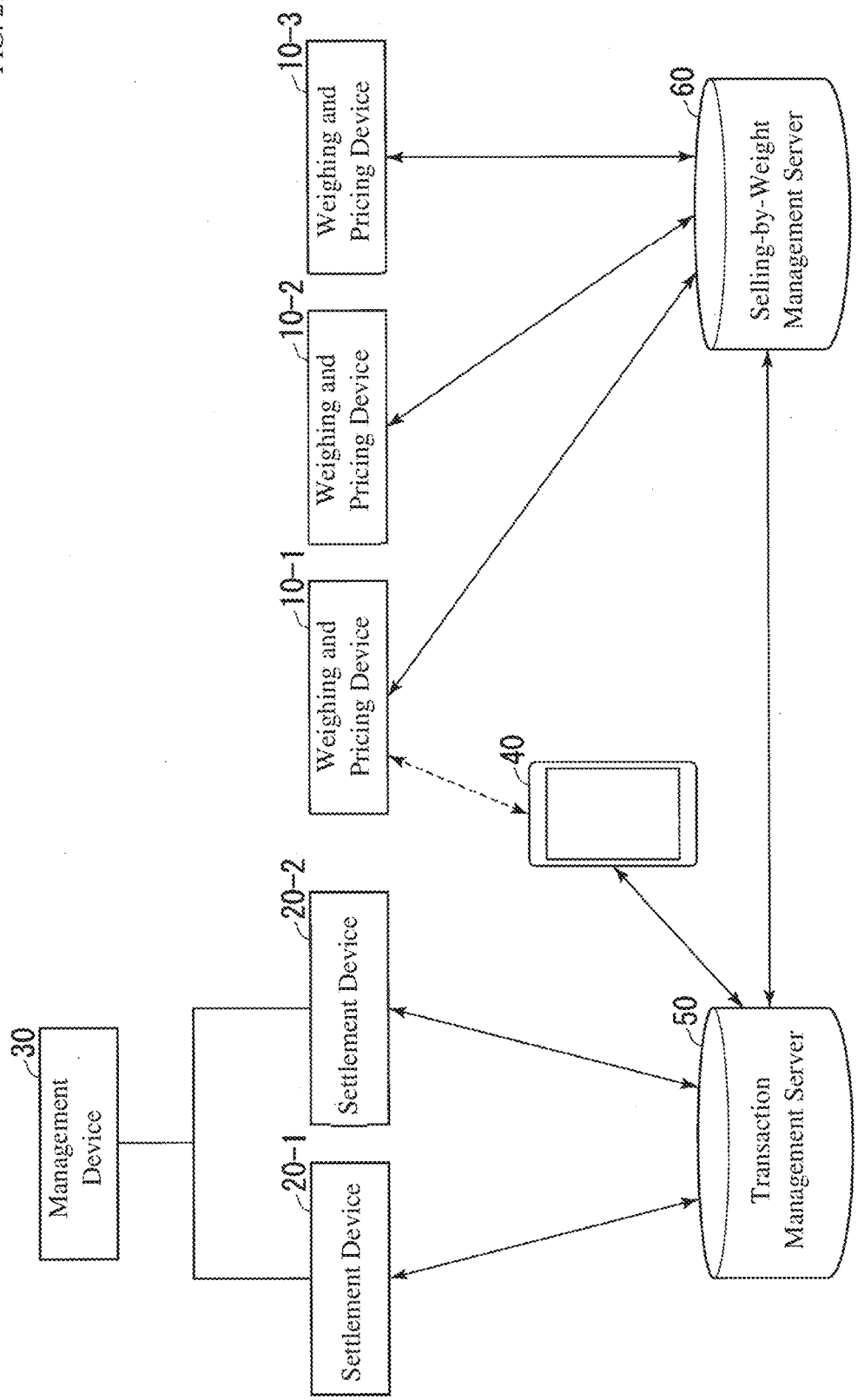
FIG. 21 is a diagram illustrating a configuration example of a sales system in a fifth embodiment.

FIG. 21 illustrates a configuration example of a sales system according to the fifth embodiment. In this diagram, portions identical to FIG. 1 are labeled with the same reference signs, and description thereof is omitted.

The sales system of this diagram further includes a selling-by-weight management server 60. The selling-by-weight management server 60 is communicably connected to each weighing and pricing device 10. Moreover, the selling-by-weight management server 60 is communicably connected to a transaction management server 50.

The selling-by-weight management server 60 manages product pricing information reflecting a result of a pricing process executed by the weighing and pricing device 10.

Figure 8:
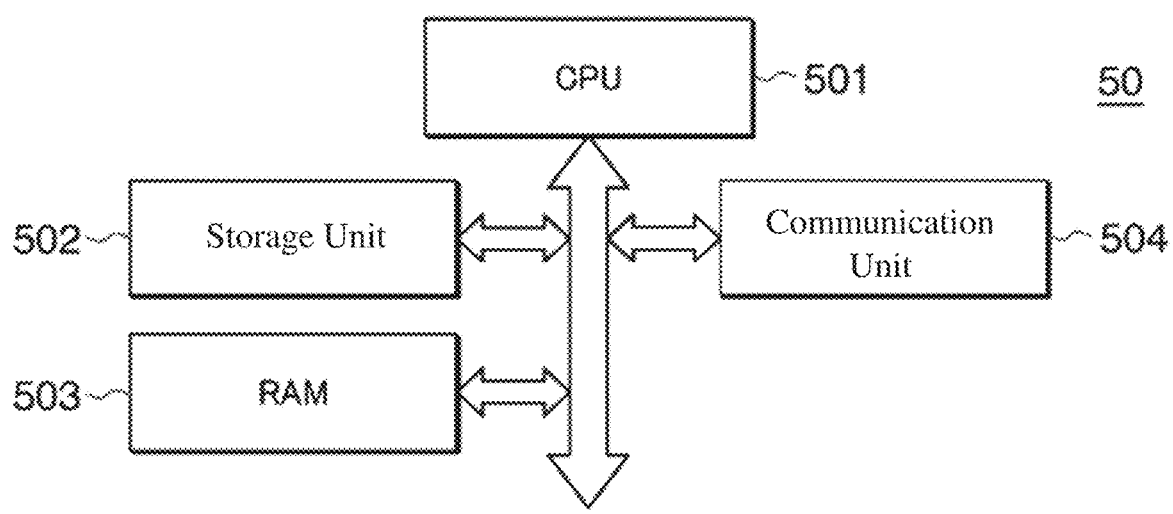
FIG. 8 is a diagram illustrating a configuration example of a transaction management server according to the first embodiment.

Although illustration is omitted for a configuration of the selling-by-weight management server 60, like the transaction management server 50 in FIG. 8, the configuration may include a CPU, a storage unit, a RAM, and a communication unit.

Figure 22:
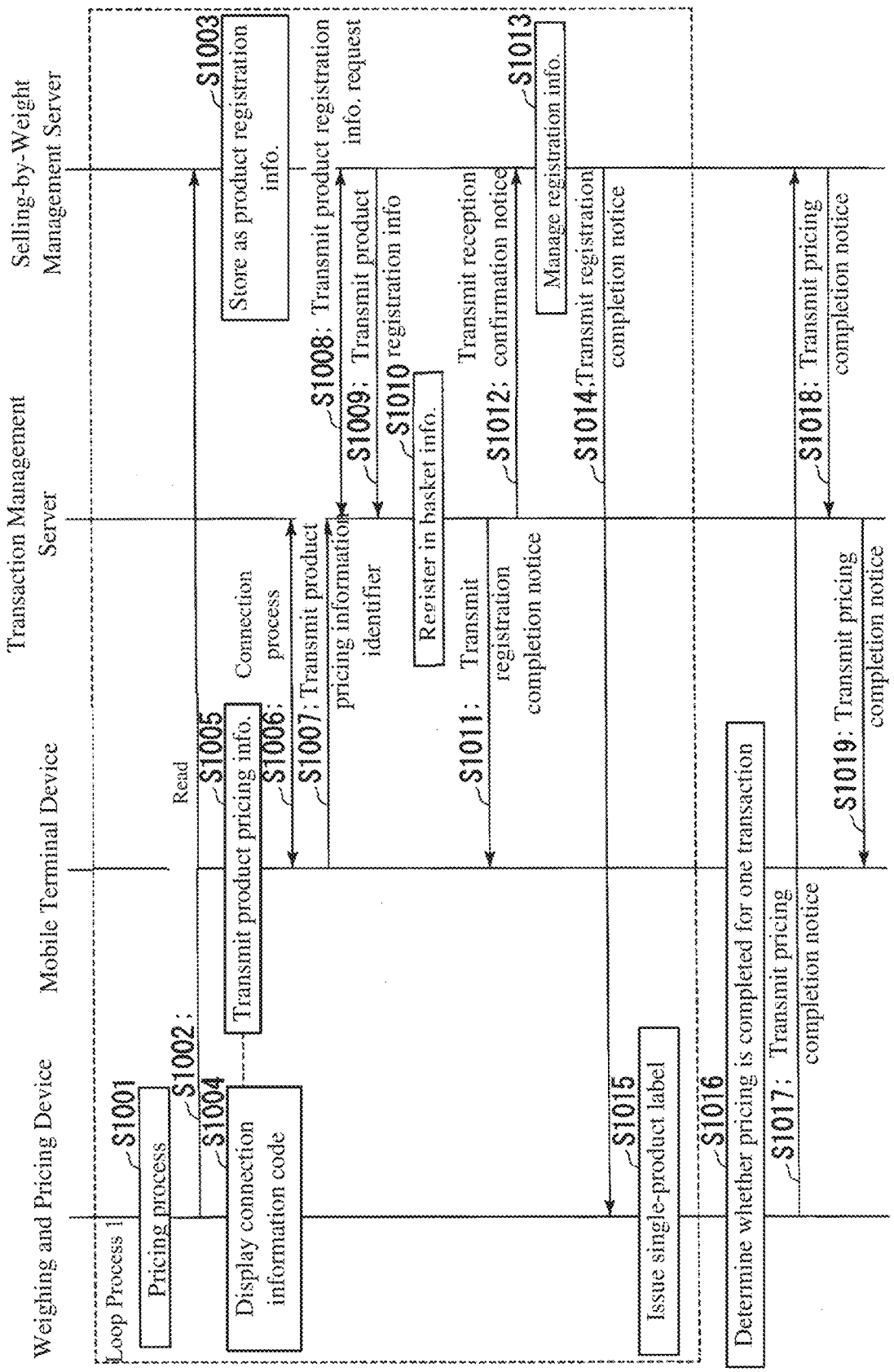
FIG. 22 is a sequence diagram illustrating an example of a processing procedure executed by a weighing and pricing device, a mobile terminal device, a transaction management server, and a selling-by-weight management server according to the fifth embodiment in relation to product registration in one transaction.

An example of a processing procedure executed in relation to product registration in one transaction by the weighing and pricing device 10, a mobile terminal device 40, the transaction management server 50, and the selling-by-weight management server 60 is described with reference to the sequence diagram in FIG. 22.

Step S1001: The weighing and pricing device 10 executes a pricing process for one product in response to a product pricing operation by an employee.

Step S1002: When pricing is established for the product at step S1001, the weighing and pricing device 10 transmits product pricing information indicating a result of the established product pricing process to the selling-by-weight management server 60. The transmitted product pricing information includes a product pricing information identifier uniquely identifying this product pricing information.

Step S1003: Upon receiving the product pricing information transmitted at step S1002, the selling-by-weight management server 60 stores product registration information reflecting a content of the received product pricing information. The stored product registration information is associated with the product pricing information identifier of the received product pricing information.

Step S1004: In response to the pricing process being executed at step S1001, the weighing and pricing device 10 displays a connection information code on a customer display 106 in conjunction with the transmission of the product pricing information at step S1002. The connection information code displayed here includes control information for the mobile terminal device 40 to communicably connect to the transaction management server 50. Moreover, the connection information code includes the product pricing information identifier uniquely identifying the product pricing information transmitted at step S1002.

Step S1005: The mobile terminal device 40 displays a code scanning screen and is in a state of being able to perform code reading. Therefore, a customer operates the mobile terminal device 40 to perform an operation of using the mobile terminal device 40 to read the connection information code displayed on the customer display 106.

Step S1006: The mobile terminal device 40 and the transaction management server 50 execute between them a connection process according to a connection procedure based on the control information included in the connection information code read at step S1005.

Step S1007: When a connection to the transaction management server 50 is established according to the connection process at step S1006, the mobile terminal device 40 transmits the product pricing information identifier included in the connection information read at step S1005 to the transaction management server 50.

Step S1008: Upon receiving the product pricing information identifier at step S1007, the transaction management server 50 transmits a product registration information request including the received product pricing information identifier to the selling-by-weight management server 60.

Step S1009: In response to receiving the product registration information request, the selling-by-weight management server 60 searches, from among the product registration information it stores, for product registration information associated with the product pricing information identifier as that included in the received product registration information request. The selling-by-weight management server 60 transmits the searched-for product registration information to the transaction management server 50.

Step S1010: The transaction management server 50 registers the received product registration information in basket information.

Step S1011: The product registration information being registered in the basket information in the transaction management server 50 at step S1010 completes product registration for the one product subjected to the pricing process by the weighing and pricing device 10 at step S1001. Therefore, the transaction management server 50 transmits a registration completion notice to the mobile terminal device 40.

Note that upon receiving the registration completion notice, the mobile terminal device 40 may perform, for example, display notifying the customer that product registration is completed for the one product subjected to the pricing process executed by the weighing and pricing device 10 in correspondence with the connection information code read this time.

Step S1012: Moreover, the transaction management server 50 transmits to the selling-by-weight management server 60 a reception confirmation notice indicating that the product registration information transmitted at step S1009 was received normally. The reception confirmation notice includes the product pricing information identifier identifying the corresponding product registration information.

Step S1013: In response to receiving the reception confirmation notice transmitted at step S1012, the selling-by-weight management server 60 manages, among the product registration information it stores, the product registration information indicated by the product pricing information identifier included in the reception confirmation notice so it is indicated that this product registration information has been transmitted.

Step S1014: After the process of step S1013, the selling-by-weight management server 60 transmits a registration completion notice to the weighing and pricing device 10 that transmitted the product pricing information at step S1002.

Step S1015: In response to receiving the registration completion notice transmitted at step S1014, the weighing and pricing device 10 issues a single-product label reflecting the result of the pricing process at step S1001.

The processes of steps S1001 to S1015 are referred to as "loop process 1" and are repeatedly executed each time the product pricing operation is performed on the weighing and pricing device 10 for one product in response to the customer designating a product sold by weight to be purchased in one transaction.

Step S1016: Upon confirming that pricing is completed for all products designated by the customer for one transaction, the employee performs an operation of declaring pricing completion for one transaction (pricing completion operation) on the weighing and pricing device 10. In response to the pricing completion operation being performed, the weighing and pricing device 10 determines that product pricing for one transaction is completed.

Step S1017: When it is determined that product pricing for one transaction is completed, the weighing and pricing device 10 transmits a pricing completion notice to the selling-by-weight management server 60. The pricing completion notice indicates that the pricing process is completed for all products in one transaction.

Step S1018: In response to receiving the pricing completion notice transmitted at step S1017, the selling-by-weight management server 60 transmits a pricing completion notice to the transaction management server 50 (or transfers the received pricing completion notice thereto).

Step S1019: In response to receiving the pricing completion notice transmitted at step S1018, the transaction management server 50 transmits a pricing completion notice to the mobile terminal device 40 (or transfers the received pricing completion notice thereto). Upon receiving the pricing completion notice, the mobile terminal device 40 may display, for example, the settlement guide screen in FIG. 11D. Moreover, in response to the mobile terminal device 40 receiving the pricing completion notice at this step S1019, for example, a process may be executed to cut off the connection between the mobile terminal device 40 and the transaction management server 50.

In the fifth embodiment, the weighing and pricing device 10 and the mobile terminal device 40 are not connected so as to be able to directly communicate. However, the weighing and pricing device 10 and the mobile terminal device 40 are respectively connected to the selling-by-weight management server 60 and the transaction management server 50, and the selling-by-weight management server 60 and the transaction management server 50 mutually communicate. This enables, according to the processing in this diagram, the weighing and pricing device 10 to issue a single-product label in response to receiving a notice from the selling-by-weight management server 60 that basket-information registration of product registration information corresponding to product pricing is completed (that is, the registration completion notice transmitted at step S1014). In this situation as well, the weighing and pricing device 10 does not issue a single-product label when, despite product pricing information being transmitted from the weighing and pricing device 10, the corresponding product registration information was not registered in the basket information in the transaction management server 50. This causes the weighing and pricing device 10 to only issue single-product labels of products to be priced whose corresponding product registration information is registered in the basket information.

In this situation, a single-product label being issued enables the employee and the customer to confirm that a product subjected to the pricing process was registered normally in the basket information. For example, a notification being issued on the mobile terminal device 40 in response to a registration completion notice being received (step S1011) also enables the customer to confirm that a product subjected to the pricing process was registered normally in the basket information.

Furthermore, the configurations of the second embodiment and the third embodiment can also be applied to the fifth embodiment. In this situation, it is sufficient for the weighing and pricing device 10 to execute processes similar to the flowchart in FIG. 15 or FIG. 18.

A variation of the fifth embodiment, the second embodiment may be applied so the weighing and pricing device 10, in response to pricing for one transaction being completed, issues an addition label whereon content indicating a total amount of monetary amounts of products priced in one transaction is printed is issued. Alternatively, the weighing and pricing device 10 may issue a single-product label each time pricing is established for a product and issue an addition label in response to pricing for one transaction being completed.

Sixth Embodiment

Next, a sixth embodiment is described. A sales system according to the sixth embodiment includes, as in FIG. 1, a weighing and pricing device 10, a mobile terminal device 40, and a transaction management server 50. In the sixth embodiment, the weighing and pricing device 10 is not connected to the mobile terminal device 40 so as to be able to communicate directly.

Figure 23:
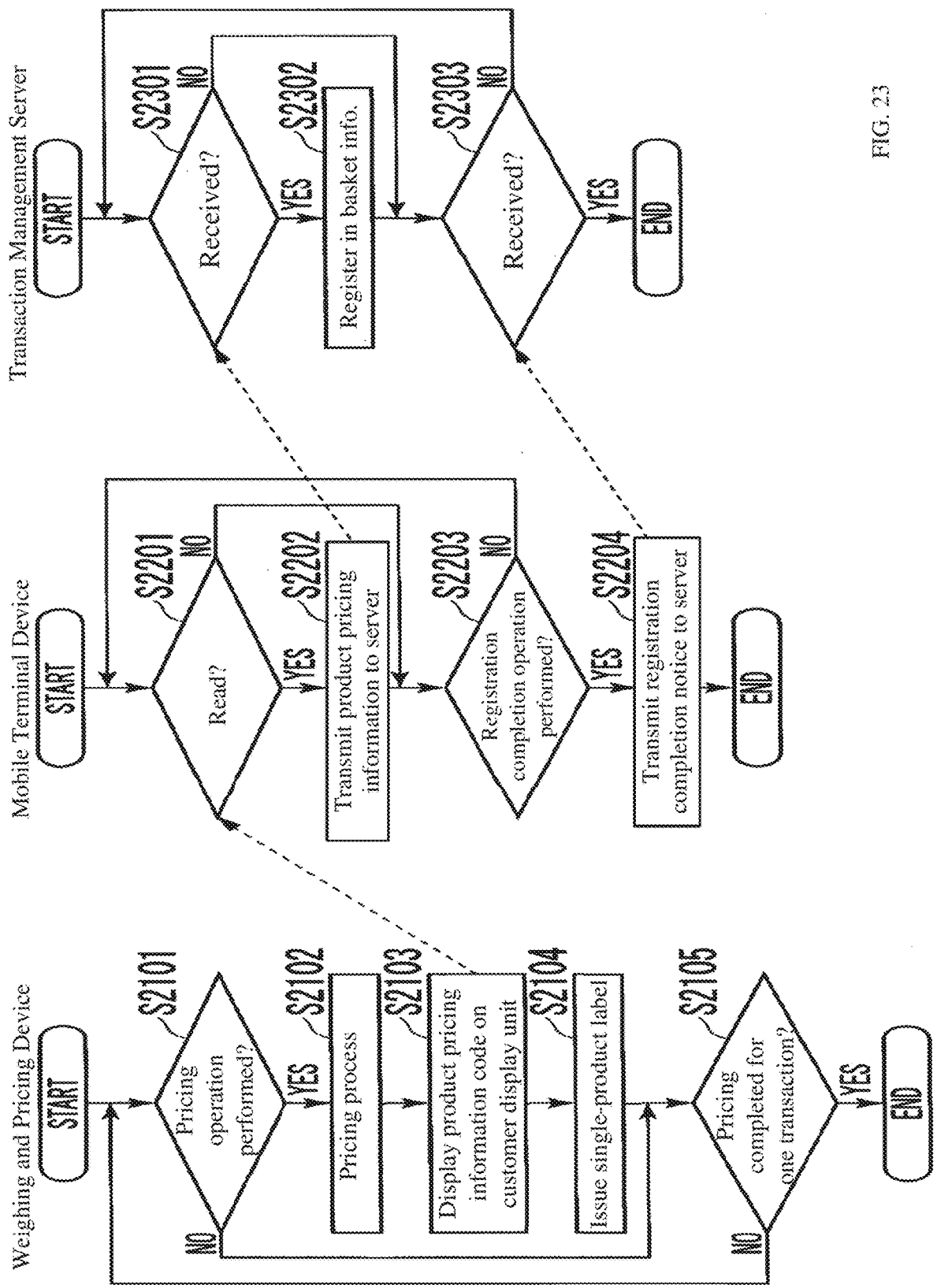
FIG. 23 is a flowchart illustrating an example of a processing procedure executed by a weighing and pricing device, a mobile terminal device, and a transaction management server in a sixth embodiment in relation to product registration in one transaction.

Examples of processing procedures executed by the weighing and pricing device 10, the mobile terminal device 40, and the transaction management server 50 in relation to product registration in one transaction are described with reference to the flowchart in FIG. 23.

First, an example of the processing procedure executed by the weighing and pricing device 10 is described.

Step S2101: The weighing and pricing device 10 determines whether a pricing operation for one product in one transaction is performed. In response to the pricing operation having started for the first product in one transaction, the weighing and pricing device 10 determines that product registration in one transaction has started and issues a transaction identifier to be associated with the present transaction.

Step S2102: In response to the product pricing operation being performed, the weighing and pricing device 10 executes a pricing process. An employee has a customer confirm a weight and the like and, upon obtaining approval, performs an operation of instructing pricing establishment of the product to be purchased.

Step S2103: When pricing is established for one product to be purchased, the weighing and pricing device 10 displays a product pricing information code on a customer display 106. The product pricing information code includes information indicating a result of the pricing process for the product to be purchased.

Step S2104: In response to pricing being established for another product to be purchased, the weighing and pricing device 10 issues a single-product label for the product to be purchased.

Step S2105: When it is determined that no pricing operation for one product was performed at step S2101, or after the process of step S2104 is executed, the weighing and pricing device 10 determines whether product pricing for one transaction is completed. In response to the employee performing a pricing completion operation, the weighing and pricing device 10 determines that product pricing for one transaction is completed.

When it is determined that product pricing for one transaction is not completed, the processing returns to step S2101.

Meanwhile, when it is determined that product pricing for one transaction is completed, the weighing and pricing device 10 ends processes for pricing in one transaction.

Next, an example of the processing procedure of the mobile terminal device 40 is described.

Step S2201: In a state wherein a code scanning screen is displayed on a touch-panel-equipped display 406, the mobile terminal device 40 determines whether the product pricing information code has been read.

Step S2202: When it is determined that the product pricing information code has been read, the mobile terminal device 40 transmits product pricing information acquired from the read product pricing information code to the transaction management server 50. Note that when transmission of the product pricing information to the transaction management server 50 ends normally, the mobile terminal device 40 may notify the customer as much by display or the like.

Step S2203: When the customer ends the operation of reading the product pricing information code for each product purchased in one transaction, a registration completion operation declaring completion of product registration for one transaction is performed. Here, when it is determined at step S2201 that code reading was not performed, or after the process of step S2202, the mobile terminal device 40 determines whether the registration completion operation is performed.

When the registration completion operation is not performed, the processing returns to step S2201.

Step S2204: When the registration completion operation is performed, the mobile terminal device 40 transmits to the transaction management server 50 a registration completion notice indicating that registration is completed for one transaction.

After transmitting the registration completion notice, the mobile terminal device 40 may display, for example, the settlement guide screen in FIG. 11(D).

Next, an example of the processing procedure of the transaction management server is described.

Step S2301: The transaction management server 50 determines whether the product pricing information transmitted from the mobile terminal device 40 by the process of step S2202 is received.

Step S2302: In response to the product pricing information being received, the transaction management server 50 registers the received product pricing information as product registration information for one product in basket information generated for the present one transaction.

Step S2303: When it is determined at step S2301 that no product pricing information is received, or after the process of step S2302, the transaction management server 50 determines whether the registration completion notice transmitted from the mobile terminal device 40 by the process of step S2204 is received.

When it is determined that no registration completion notice is received, the processing returns to step S2303. Meanwhile, if the registration completion notice is received, registration of the product registration information in the basket information for the one transaction up to this point is ended.

For example, in response to the registration completion operation being performed, the mobile terminal device 40 may display a code indicating product registration completion on the touch-panel-equipped display 406. In this situation, the employee performs an operation of using a scanner unit 104 of the weighing and pricing device 10 to read the registration completion code displayed on the customer's mobile terminal device 40. The weighing and pricing device 10 in this situation is made to issue a single-product label in response to reading the registration completion code.

<Variations>

Variations according to one or more embodiments are described below.

[First Variation]

In the processing illustrated in FIG. 12, the weighing and pricing device 10 may be unable to receive the reception confirmation notice at step S107 due to some reason.

As this situation wherein no reception confirmation notice can be received, for example, the following situations can be mentioned. One situation is the product pricing information to be transmitted by the weighing and pricing device 10 at step S106 not being transmitted normally. Another situation is the product pricing information being transmitted at step S106 but the mobile terminal device 40 being unable to receive the product pricing information normally. Another situation is the reception confirmation notice to be transmitted by the mobile terminal device 40 at step S205 being unable to be transmitted normally. Another situation is the product pricing information being transmitted at step S205 but the weighing and pricing device 10 being unable to receive the reception confirmation notice normally.

When no reception confirmation notice is received within a certain amount of time from executing the process of step S106 of transmitting the product pricing information and the processing times out, the weighing and pricing device 10 determines that a transmission/reception error of the product pricing information occurred. When it is determined that a transmission/reception error of the product pricing information occurred, the weighing and pricing device 10, for example, issues a notification on the employee display 105 that a transmission/reception error of the product pricing information occurred. Note that a notification may also be issued on the customer display 106 that a transmission/reception error of the product pricing information occurred.

To respond to a situation as above wherein a notification is issued that a transmission/reception error of the product pricing information occurred, for example, the employee may ask the customer to confirm whether the corresponding product is registered normally. By viewing, for example, what is displayed on the mobile terminal device 40, the customer confirms whether the transmission and reception of the product registration information between the mobile terminal device 40 and the transaction management server 50 corresponding to step S206 was performed normally (whether the corresponding basket information was registered normally in the transaction management server 50).

When it is able to be confirmed that the transmission and reception of the product registration information was performed normally, this is simply an error in the transmission and reception of the reception confirmation notice, meaning that product registration was performed normally, and nothing in particular needs to be done in response. Alternatively, for example, the customer may be made to perform an operation of retransmitting the reception confirmation notice from the mobile terminal device 40, and the weighing and pricing device 10 may process the reception of the reception confirmation notice as the transmission/reception error of the product pricing information being resolved.

Furthermore, to respond to the situation wherein the notification is issued that a transmission/reception error of the product pricing information occurred, the weighing and pricing device 10 may issue a label (reregistration label) whereon a pricing information code (which may be a barcode or two-dimensional code) reflecting the pricing information of the corresponding product is printed.

Note that in issuing the reregistration label, a dialog window confirming a necessity of issuing may be displayed for the employee on the employee display 105. In this situation, when confirmation is obtained that transmission and reception of the product registration information with the transaction management server 50 was performed normally, the employee performs an operation in the dialog window of declaring that issuing a reregistration label is unnecessary. Meanwhile, when confirmation is obtained that transmission and reception of the product registration information with the transaction management server 50 was not performed normally, the employee performs an operation in the dialog window of instructing issuing of the reregistration label.

When the reregistration label is issued, the employee hands the issued reregistration label to the customer. The customer causes the mobile terminal device 40 to read the pricing information code printed on the reregistration label they are handed. The mobile terminal device 40 transmits the product pricing information indicated by the read pricing information code as the product registration information to the transaction management server 50. This causes basket-information registration in the transaction management server 50 to be performed for the product corresponding to the transmission/reception error of the product pricing information.

[Second Variation]

In the above embodiments, a connection information code is displayed each time the pricing process is performed in product units in one transaction. In the second variation, a connection information code is displayed for one transaction.

In this situation, for example, a connection information code is displayed on the customer display 106 by the employee performing a predetermined operation on the weighing and pricing device 10 before the pricing operation for the first product sold by weight in one transaction. Alternatively, the connection information code may, for example, be included in a waiting screen displayed on the customer display 106 in a state of waiting for the first pricing operation in one transaction.

In this situation, the customer uses the mobile terminal device 40 to read the connection information code displayed on the customer display 106 at a stage before pricing is performed for the first product. The mobile terminal device 40 is placed in a state wherein a connection is established with the weighing and pricing device 10 according to connection conditions (connection procedure) indicated by the read connection information code.

When communication is established, the weighing and pricing device 10 executes a process of associating the mobile terminal device 40 with which it is communicating and the present transaction. As such, the weighing and pricing device 10, for example, acquires a terminal identifier from the mobile terminal device 40 with which it is communicating. The terminal identifier may be an identifier imparted individually to each unit of hardware, this being the mobile terminal device 40, as in, for example, a MAC address or an application identifier imparted to the shopping application installed on the mobile terminal device 40.

Furthermore, the weighing and pricing device 10 may, in response to communication being established and being connected to the mobile terminal device 40, display on the employee display 105 an employee designation screen wherein an operation is performed for associating an employee in charge of the pricing operation with the present transaction.

Figure 24:
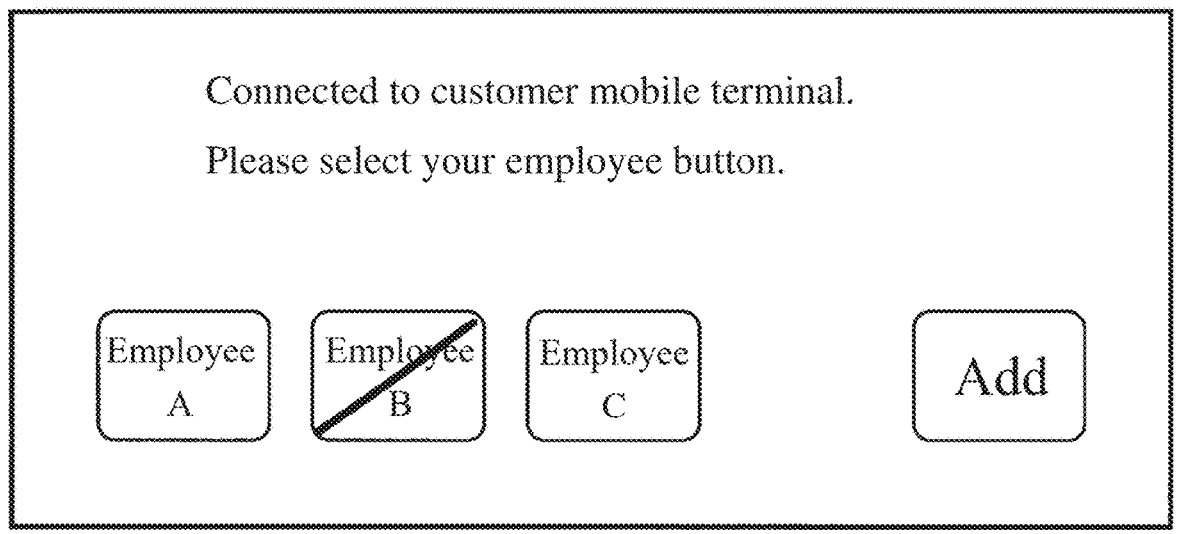
FIG. 24 is a diagram illustrating an example of a display aspect of an employee button in a second variation of one or more embodiments.

FIG. 24 illustrates an example of one aspect of the employee designation screen. In the employee designation screen in this diagram, employee buttons are disposed. Characters or the like indicating a corresponding employee are respectively displayed in the employee buttons such that the employee buttons indicate association with the employees. This diagram illustrates an example wherein three employee buttons are disposed and "Employee A", "Employee B", and "Employee C" are respectively indicated therein.

The employee buttons may indicate, for example, names and job titles of the employees. The employees corresponding to the displayed employee buttons are employees currently registered (logged in) as employees working the shopping area for products sold by weight. Note that an employee button of an employee who is currently waiting on another customer and performing the pricing operation on another weighing and pricing device 10 is indicated as being inoperable by, for example, a diagonal line being disposed thereon as illustrated in this diagram (as another option, the button may be grayed out or the like).

Moreover, an employee operates the employee button corresponding to themselves from among the displayed employee buttons.

Moreover, an "Add" button is disposed in the employee designation screen. A circumstance may arise wherein, for example, an employee needs to wait on a customer before logging in as an employee working the shopping area. In such a situation, the employee designation screen is in a state wherein no employee button corresponding to the employee who is not logged in is displayed. Here, the employee in this situation can, upon operating the "Add" button, log in on the spot by, for example, performing an operation of causing the weighing and pricing device 10 to read their employee identifier. In response to the log-in, an employee button for the corresponding employee is further displayed in the employee designation screen in addition to the employee buttons already being displayed.

The weighing and pricing device 10 associates the employee identifier of the employee indicated by the operated employee button and the terminal identifier acquired from the mobile terminal device 40 with which it is communicating. Moreover, the weighing and pricing device 10 manages the product pricing information of each product from the pricing operation performed in the corresponding transaction in association with the employee identifier. This enables a state wherein a transaction corresponding to the mobile terminal device 40 is uniquely specified.

Note that the employee identifier may be acquired by, for example, causing the scanner unit 104 of the weighing and pricing device 10 to read code information of the employee identifier provided on an employee card possessed by the employee instead of by an operation of the employee button. Moreover, the employee card may be, for example, of an IC (Integrated Circuit) card format storing the employee identifier, and the employee identifier may be acquired from the IC card by a card reader provided in the weighing and pricing device 10. Moreover, when an RFID (Radio-Frequency Identifier) card or the like as the employee card and the weighing and pricing device 10 are made to communicate according to predetermined near field communication in response to entering each other's communication ranges, the weighing and pricing device 10 may acquire the stored employee identifier from the employee card with which it can communicate. In this situation, when there is a plurality of employee cards with which communication is possible, for example, the employee identifier may be acquired from an employee card having the strongest reception strength (that is, the employee card of an employee present in a position closest to the weighing and pricing device 10).

Note that in associating the mobile identifier, the employee identifier, and the product pricing information, the transaction identifier (transaction number) may also be associated. Alternatively, the transaction identifier may be associated instead of the employee identifier. For example, when operations are such that management, such as above, associating an employee and a transaction is not performed, because no employee identifier is used, associating the transaction identifier instead of an employee identifier enables the mobile terminal device 40 and the transaction to be associated.

When, as above, the transaction identifier is associated, the weighing and pricing device 10 may display, instead of the employee buttons, a plurality of transaction selection buttons exhibiting predetermined marks, such as shapes, or predetermined colors and associate the mark or color provided for a transaction selection button operated by the employee from among the displayed transaction selection buttons with the transaction.

When, as in the second variation, a connection information code is displayed for one transaction, the weighing and pricing device 10 does not need to transmit product pricing information to the mobile terminal device 40 each time the pricing process is performed in product units. That is, the weighing and pricing device 10 may, for example, transmit product pricing information for all priced products to the mobile terminal device 40 at a stage when the pricing process is completed for all products in one transaction.

Moreover, when, as in the second variation, a connection information code is displayed for one transaction, by associating the transaction and the mobile terminal device 40 as above, one weighing and pricing device 10 can also be interrupted by a pricing operation for another transaction during a period between starting and completing a pricing operation for a certain transaction. That is, one weighing and pricing device 10 can perform pricing processes for a plurality of transactions in parallel.

As such, when, for example, a first customer is taking their time to select the next product to be priced or, due to some circumstance, needs to temporarily take an action other than interacting with the employee in this location, the employee can, upon storing a content of the transaction (product pricing information) thus far for the first customer, perform product pricing for the next customer.

Furthermore, in the above example, the weighing and pricing device 10 and the mobile terminal device 40 are connected at a stage prior to starting product pricing for one transaction. This is done by displaying, as an aspect of displaying a connection information code for one transaction, a connection information code on the customer display 106 at a stage prior to a pricing operation for the first product sold by weight in one transaction.

However, as the aspect of displaying a connection information code for one transaction, connection code information may be displayed at a stage when pricing for all products in one transaction is completed.

Figure 25:
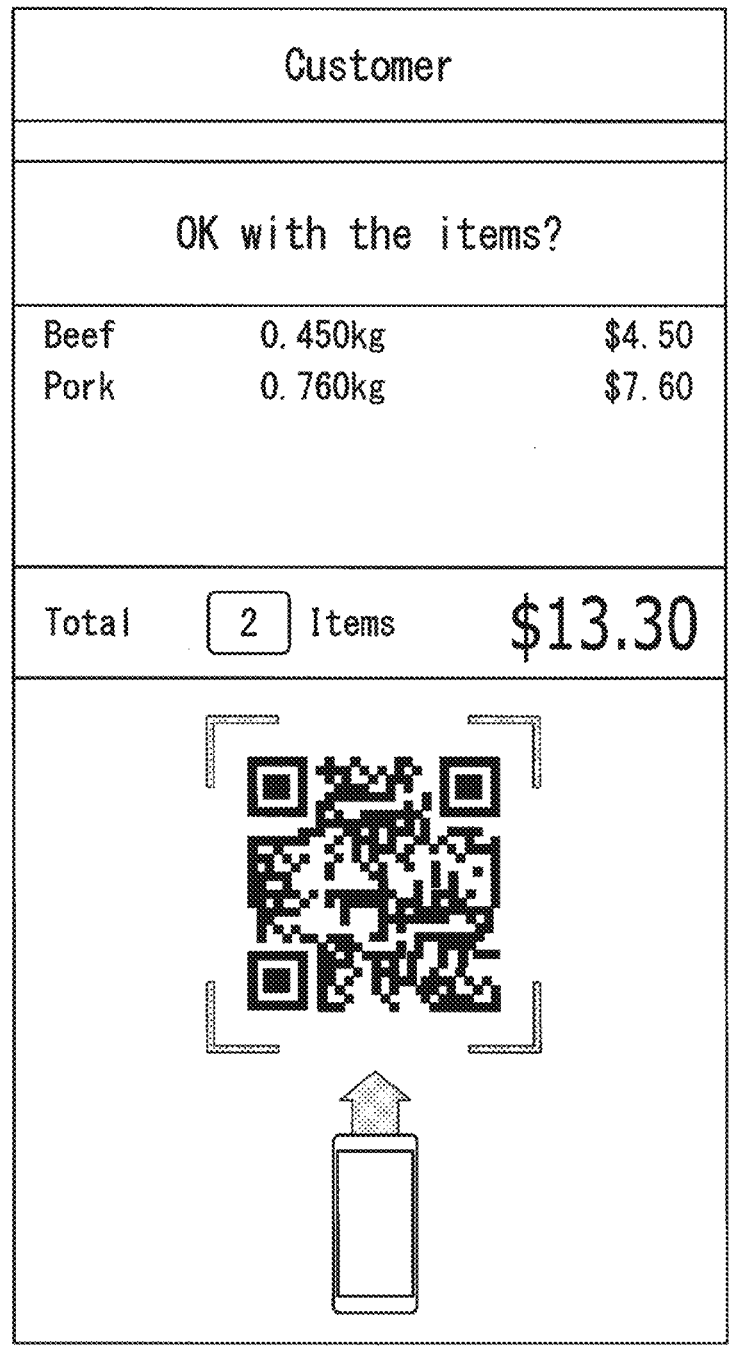
FIG. 25 is a diagram illustrating an example of a display aspect of the connection information code screen according to the second variation of one or more embodiments.

FIG. 25 illustrates an example of an aspect of a connection information code screen displayed on the customer display 106 at a stage when pricing for all products in one transaction is completed. This diagram illustrates an example of an aspect wherein the customer display 106 has a vertically long display area and the writing on the screen is in English.

In the connection information code screen in this diagram, as in FIG. 13, a connection information code in two-dimensional code is displayed, and an image of a mobile terminal device is displayed together with an arrow indicating the two-dimensional code.

Moreover, the connection information code screen in this diagram displays pricing-related information (such as a product name, a measured weight, and a price) for each product among one or more products subjected to the pricing process thus far in the corresponding transaction.

Note that in this situation as well, a message, pop-up window, icon, or the like for notifying the employee that a connection information code is being displayed on the customer display 106 may be displayed on the employee display 105.

[Third Variation]

"Product registration succession" may be enabled between the plurality of weighing and pricing devices 10. Product registration succession signifies an employee performing product registration in one transaction using a certain weighing and pricing device 10 and afterward moving to another weighing and pricing device 10 to perform product registration in the same transaction. In product registration succession, product registration information from product registration performed previously using a weighing and pricing device 10 is succeeded by the next weighing and pricing device 10 in the same transaction. The next weighing and pricing device 10 can add information on a product registered according to its own product registration process to the product registration information it succeeded.

For example, a customer may designate a product displayed in a position far away from a weighing and pricing device 10 currently being operated by an employee. By "product registration succession" being enabled, the employee can head to where the designated product is, remove the product, and continue product registration at another weighing and pricing device 10 disposed in a location closest thereto.

"Product registration succession" in the third variation is realized by one among the plurality of weighing and pricing devices 10 functioning as a parent and the parent weighing and pricing device 10 and a child weighing and pricing device 10 being communicably connected thereafter.

The child weighing and pricing device 10 associates product pricing information for each priced product with the employee identifier of the employee who performed the pricing operation (alternatively, a transaction identifier may be associated instead of the employee identifier, or both the employee identifier and the transaction identifier may be associated) and transmits this to the parent weighing and pricing device 10. For example, each time they start operating one weighing and pricing device 10, the employee logs in by causing the weighing and pricing device 10 to read the employee identifier recorded on their employee card or by performing a numeric operation or an operation using a predetermined button to cause the weighing and pricing device 10 to acquire their employee identifier. The employee causes the weighing and pricing device 10 to acquire their employee identifier each time they change weighing and pricing devices 10 used to perform the pricing operation in product registration succession.

Each time it receives product pricing information, the parent weighing and pricing device 10 stores integrated product pricing information integrating the received product pricing information according to the same employee identifier.

Then, when all product pricing in one transaction ends, the employee performs a pricing completion operation. In response to the pricing completion operation being performed, the weighing and pricing device 10 displays a connection information code on the customer display 106.

When the mobile terminal device 40 and the weighing and pricing device 10 are communicably connected in response to the customer using the mobile terminal device 40 to read the displayed connection information code, the mobile terminal device 40 transmits the employee identifier included in the connection information code to the weighing and pricing device 10. Upon receiving the employee identifier, the weighing and pricing device 10 transmits, from among the integrated product pricing information stored in the parent weighing and pricing device 10, integrated product pricing information associated with the received employee identifier to the mobile terminal device 40. The mobile terminal device 40 transmits the received integrated product pricing information as product registration information for all priced products to the transaction management server 50. The transaction management server 50 respectively registers the information of each product indicated in the received product registration information as basket information.

The transaction and the mobile terminal device 40 may be associated as in the second variation also when "product registration succession" is possible as in the third variation.

Note that a process corresponding to the function of the parent weighing and pricing device may be executed by, for example, a host management device or the transaction management server 50. Alternatively, a configuration may be such that each time the employee moves weighing and pricing devices 10 and logs in by inputting the employee identifier, the product pricing information of this transaction stored in the weighing and pricing device 10 the employee moved from is transmitted to the weighing and pricing device 10 the employee moved to and such that product pricing information obtained from the pricing process at the moving destination is integrated with the transmitted product pricing information.

Note that when product registration succession is enabled as above, the weighing and pricing device 10 may display a connection information code each time the product pricing process is completed. Moreover, when the employee moves weighing and pricing devices 10 whereon to perform the pricing operation for product registration succession, the connection between the weighing and pricing device 10 the employee moved from and the mobile terminal device 40 is cut off even though pricing for one transaction is not completed.

The following aspects are conceivable in cutting off the connection between the weighing and pricing device 10 the employee moved from and the mobile terminal device 40.

In one aspect, when an employee hitherto performing the pricing operation using a weighing and pricing device 10 they are to move from needs to perform the pricing operation in the same transaction upon moving to a weighing and pricing device 10 they are to move to, the employee is made to perform an operation of logging out of the weighing and pricing device 10 they are to move from. In response to entering a logged-out state according to the operation of logging out, the weighing and pricing device 10 the employee moved from cuts off its current connection to the mobile terminal device 40.

Alternatively, the weighing and pricing device 10 the employee is to move from may cut off its current connection to the mobile terminal device 40 in response to the employee causing the weighing and pricing device 10 they are to move to acquire their employee identifier in starting the pricing operation at the weighing and pricing device 10 they are to move to in product registration succession. In this situation, the employee may move to the weighing and pricing device 10 they are to move to without performing an operation of logging out of the weighing and pricing device 10 they are to move from.

In this situation, the weighing and pricing device 10 the employee is to move from cuts off its current connection to the mobile terminal device 40 in response to receiving, via communication with the weighing and pricing device 10 the employee is to move to, a notice from the weighing and pricing device 10 they are to move to that the same employee currently logged into the weighing and pricing device 10 they are to move from has logged in. Moreover, the weighing and pricing device 10 the employee is to move from also cuts off its current connection to the mobile terminal device 40 when another employee logs in at a timing prior to receiving, from the weighing and pricing device 10 the employee is to move to, the notice of the same employee logging in.

That is, in this situation, a configuration is favorable wherein the connection between the weighing and pricing device 10 the employee moves from and the mobile terminal device 40 is cut off at a predetermined timing prior to log-in being performed on the weighing and pricing device 10 the employee moves to.

Regardless of which of the above aspects is used to cut off the connection between the weighing and pricing device 10 the employee moves from and the mobile terminal device 40, until an operation declaring pricing completion for one transaction is performed, the parent weighing and pricing device 10 manages the employee identifier and the product pricing information in the same transaction in mutual association. This causes the product pricing information of the same transaction to be appropriately integrated regardless of which weighing and pricing device 10 the same employee uses to perform the pricing operation for one transaction.

Furthermore, for example, connection-related information associating an employee identifier of an operating entity who performs the pricing operation for one transaction (employee logged into the weighing and pricing device 10) and terminal identification information of the mobile terminal device 40 connected to the weighing and pricing device 10 that is logged into (for example, information such as a device ID of the mobile terminal device 40 used in the connection) may be stored in the weighing and pricing device 10. The connection-related information may be stored by the weighing and pricing device 10 that is logged into or the parent weighing and pricing device 10.

The connection-related information being stored in this manner enables, for example, automatically connecting a weighing and pricing device 10 and the mobile terminal device 40 in response to the employee moving to and logging into another weighing and pricing device 10 in product registration succession, even without using a connection information code.

That is, in response to the employee moving to and logging into another weighing and pricing device 10, the weighing and pricing device 10 that is logged into acquires the connection-related information including the same employee identifier as that acquired by the log-in. However, the weighing and pricing device 10 that is logged into may use the terminal identification information included in the acquired connection-related information to execute a process of connecting to the corresponding mobile terminal device 40.

[Fourth Variation]

Furthermore, a configuration may be such that, for example, the weighing and pricing device 10 includes a beacon terminal and the near field communication-oriented communication unit 405 also has a function as a beacon terminal.

In this situation, for example, the mobile terminal device 40 may, upon sensing a weighing and pricing device 10 by transmitting and receiving a beacon signal to and from the weighing and pricing device 10, display dialog requesting the customer to confirm a purchase of a product sold by weight, such as "Do you want to buy a product in the showcase?" and "If so, please scan the code displayed on the scale". When, in response to the displayed dialog, an operation declaring purchasing the product sold by weight, such as an operation of a "Yes" button, is performed, the mobile terminal device 40 displays the code scanning screen.

Note that although the description thus far gives as an example an aspect wherein the connection information code is displayed on the customer display 106 of the weighing and pricing device 10, a sticker or the like whereon the connection information code is printed may be affixed in a predetermined position facing the customer, and the customer may use the mobile terminal device 40 to read the connection information code printed on the sticker. When, in response to the connection information code being read, the weighing and pricing device 10 and the mobile terminal device 40 are communicably connected, a notification of the connection may be issued to the customer and the employee via, for example, display on the mobile terminal device 40 and the weighing and pricing device 10. Moreover, at this time, the weighing and pricing device 10 may output, via display or audio, a message to the customer such as "Welcome". Moreover, such a notification may also be issued on the employee display 105 of the weighing and pricing device 10, and in this situation, a configuration may be such that the employee can perform an operation so the notification is not issued to the employee.

Moreover, in the fourth variation as well, like the previous third variation, a configuration may be such that, by associating the transaction identifier for one transaction and the terminal identifier of the mobile terminal device 40, when the mobile terminal device 40 is connected to the weighing and pricing device 10, the weighing and pricing device 10 can specify the corresponding transaction to the mobile terminal device 40 it is currently connected to.

At this time, when, for example, a customer still in possession of the mobile terminal device 40 inadvertently leaves this location, the connection between the mobile terminal device 40 and the weighing and pricing device 10 performing the pricing process is interrupted. This requires a reconnecting operation to be performed by, for example, redisplaying the connection information code, which is bothersome. Therefore, the mobile terminal device 40 may, for example, output, via display or audio, a connection maintenance guide message to the customer to have them not interrupt the connection between the mobile terminal device 40 and the weighing and pricing device 10.

FIG. 26 illustrates an example of one aspect of outputting the connection maintenance guide message via display on the mobile terminal device 40. In the connection maintenance guide message screen in this diagram, a state is illustrated wherein a message indicating that the mobile terminal device 40 is currently in a state of being connected to the weighing and pricing device 10 and asking the customer to not leave the location they are currently standing in (that is, asking the customer to not move beyond a communication distance with the weighing and pricing device 10) is displayed.

However, there are also situations wherein, due to an urgent phone call or the like, the customer must leave this location. However, in this situation, because the customer has not yet received the product sold by weight, the mobile terminal device 40 may cancel (interrupt) processes for registering the product sold by weight and return to a product registration screen for normal shopping. In this situation, the weighing and pricing device 10 stores transaction information including product pricing information of a product priced before the customer left the shopping area in association with the terminal identifier of the mobile terminal device 40. This enables the weighing and pricing device 10 to, when the customer returns to the shopping area for selling by weight and communicably connects the mobile terminal device 40 to the weighing and pricing device 10, call up the transaction information associated with the same terminal identifier as the connected mobile terminal device 40. In this situation, the weighing and pricing device 10 can add product pricing information from the recommenced product pricing process to the called-up transaction information. That is, the product pricing information from before the customer left the shopping area and the product pricing information from after the customer returned to the shopping area may be integrally processed as information in the same transaction.

Moreover, a configuration may be such that when, as above, the customer needs to leave the location where they are being waited on by the employee, the customer can perform an operation requesting interruption of the process of registering products sold by weight (registration interruption operation) on the mobile terminal device 40. FIG. 26 illustrates an example wherein the registration interruption operation can be performed by operating a registration interruption button displayed as "Leave temporarily".

When the registration interruption button is operated, the mobile terminal device 40 transmits a registration interruption request to the weighing and pricing device 10. In response to receiving the registration interruption request, the weighing and pricing device 10 cuts off communication with the mobile terminal device 40 and stores the product pricing information thus far in the corresponding transaction in association with the terminal identifier of the mobile terminal device 40.

[Fifth Variation]

In the fifth variation of one or more embodiments, any product from among products whose basket information is registered can be selected and have its registration canceled by an operation on the mobile terminal device 40 whereon the shopping application operates if this is done at a stage prior to, for example, settlement being performed.

Moreover, when, as in the second variation, the weighing and pricing device 10 is configured to transmit the product pricing information for all priced products to the mobile terminal device 40 at a stage when the pricing process is completed for all products in one transaction, the mobile terminal device 40 cannot acquire product pricing information while the weighing and pricing device 10 has not completed the pricing process for all products in one transaction. That is, the customer in this situation cannot cancel products registered by the pricing process until the mobile terminal device 40 receives the product pricing information for all products and the corresponding basket information is registered in the transaction management server 50. Therefore, a configuration may be such that, for example, a product to be priced whose basket information is not yet registered can also be canceled by an operation on the mobile terminal device 40. However, in this situation, it is preferable, for example, for the transaction management server 50 to treat the canceled product as a deferred product and for the employee to perform a deletion operation at settlement.

[Sixth Variation]

In the above first embodiment, in a shopping area wherein pricing is performed, the customer designates to the employee a product to be purchased (designates a product category and a weight or item count) by orally communicating such to the employee. Then, product registration for one product is performed by the employee operating the weighing and pricing device 10 to price the product designated by the customer and the weighing and pricing device 10 transmitting the product pricing information to the transaction management server 50. In such a procedure of product registration, the customer themself does not perform an operation of using the mobile terminal device 40 to read code information of the product.

In the sales system of the sixth variation, even in a shopping area wherein pricing is performed, product registration is performed in response to the customer performing an operation of using the mobile terminal device 40 to read code information corresponding to the product to be purchased.

In this situation, even in a shopping area wherein pricing is performed, it is sufficient for the customer to perform operations on the mobile terminal device 40 using the same procedure as a shopping area wherein a product shelf is disposed. This makes the customer less likely to confuse operations on the mobile terminal device 40 in a shopping area wherein pricing is performed.

An example of the procedure of product registration in a shopping area wherein pricing is performed in the sixth variation is described below with reference to FIG. 27A to FIG. 27D, FIG. 28A to FIG. 28C, FIG. 29A to FIG. 29C, FIG. 30A, and FIG. 30B. The following description gives as an example a situation wherein one customer registers three categories of products in a shopping area wherein pricing is performed: apples, a fixed-price product; cherries, a product sold by weight; and asparagus, a fixed-price product.

In the sixth variation, product registration is divided into a first stage and a second stage. The first stage of product registration is product registration performed by the customer using the mobile terminal device 40 to read code information corresponding to a product. The second stage of product registration is product registration wherein basket information is registered in the transaction management server 50 in response to the employee operating the weighing and pricing device 10 to perform pricing for the product registered by the first stage of product registration.

For the sixth variation, in the shopping area wherein pricing is performed, for example, a shelf label is disposed facing the customer for each product displayed in a showcase. The shelf label may be disposed, for example, in the showcase so the customer can understand its correspondence to the corresponding product.

The shelf label indicates the category and unit price (weight unit price or item unit price) of the corresponding product and also indicates code information. The code information of the shelf label includes, for example, a product code indicating the category of the corresponding product.

Note that the shelf label of the sixth variation may be printed on a sheet of paper, resin, or the like, or a device such as an electronic shelf label may be used.

First, the first stage of product registration is performed as follows.

The customer views products displayed in the showcase and, upon deciding which product they will purchase (product to be purchased), performs an operation of using the mobile terminal device 40 to read the code information indicated on the shelf label corresponding to the product to be purchased they decided on.

Here, it is supposed that the customer is to purchase two apples as the first product to be purchased. In this situation, the customer performs an operation of using the mobile terminal device 40 to read the code information indicated on the shelf label for apples upon setting the mobile terminal device 40 whereon the shopping application operates to a product registration mode.

Figure 27A:
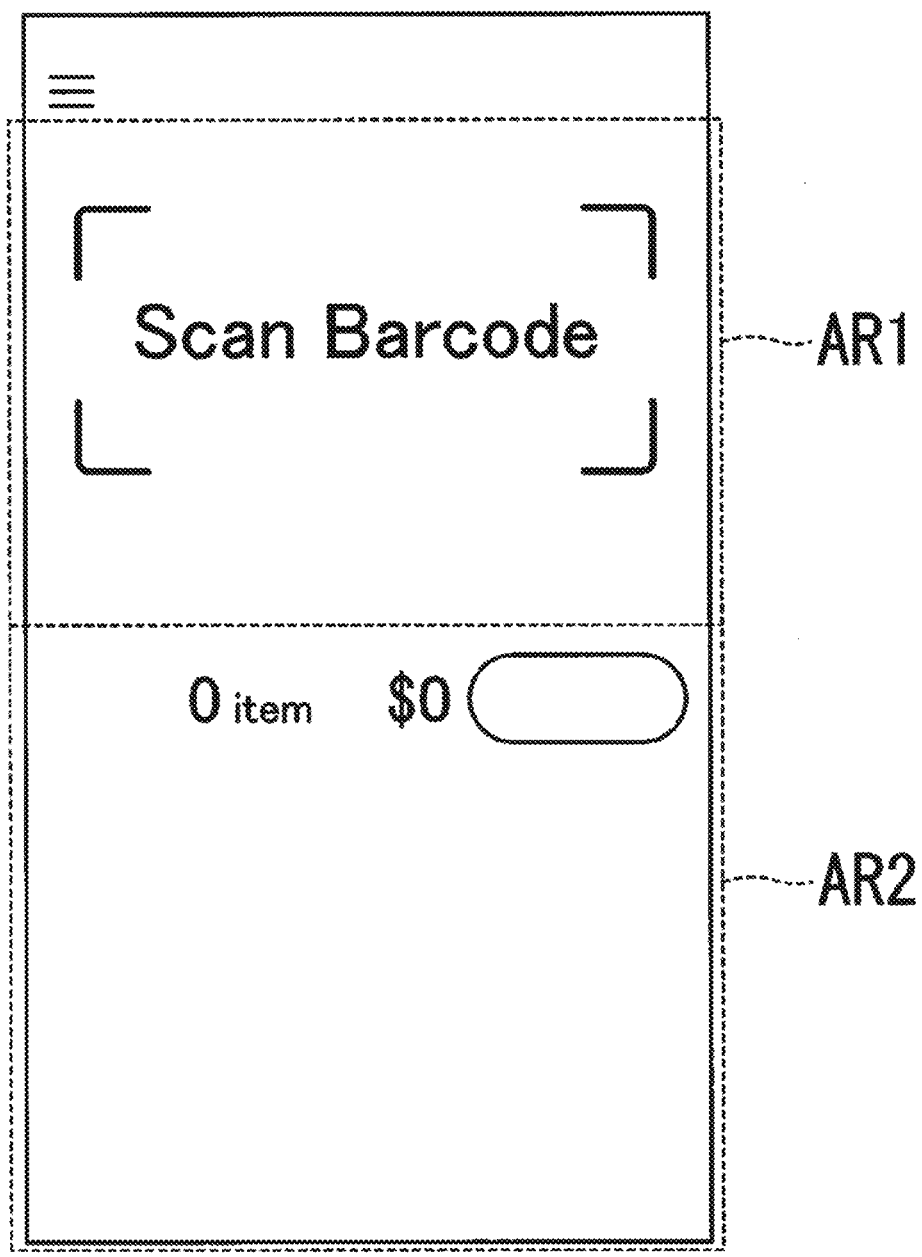
FIG. 27A is a diagram illustrating one example of a product registration screen used to describe an example of a procedure of product registration in a shopping area wherein pricing is performed in a sixth variation of one or more embodiments.

FIG. 27A illustrates one example of a product registration screen displayed on the touch-panel-equipped display 406 in response to the product registration mode being set. A scan image area AR1 and a registered product list area AR2 are disposed in the product registration screen.

The product registration mode set in this manner may be the same as a product registration mode set when reading a code provided on a product displayed on a product shelf. In this situation, an aspect of the product registration screen displayed on the touch-panel-equipped display 406 in response to the setting of the product registration mode may also be the same as a product registration screen displayed in the product registration mode set when reading a code provided on a product displayed on a product shelf.

Furthermore, the product registration screen in this diagram illustrates an example of a display content at a stage prior to product registration being performed for the apples. In this situation, the customer has yet to register a product upon entering the store, and the apples are the first product that will be registered in the present transaction. As such, the registered product list area AR2 in the product registration screen in this diagram is in a state wherein no list item of a registered product is yet disposed.

Figure 27B:
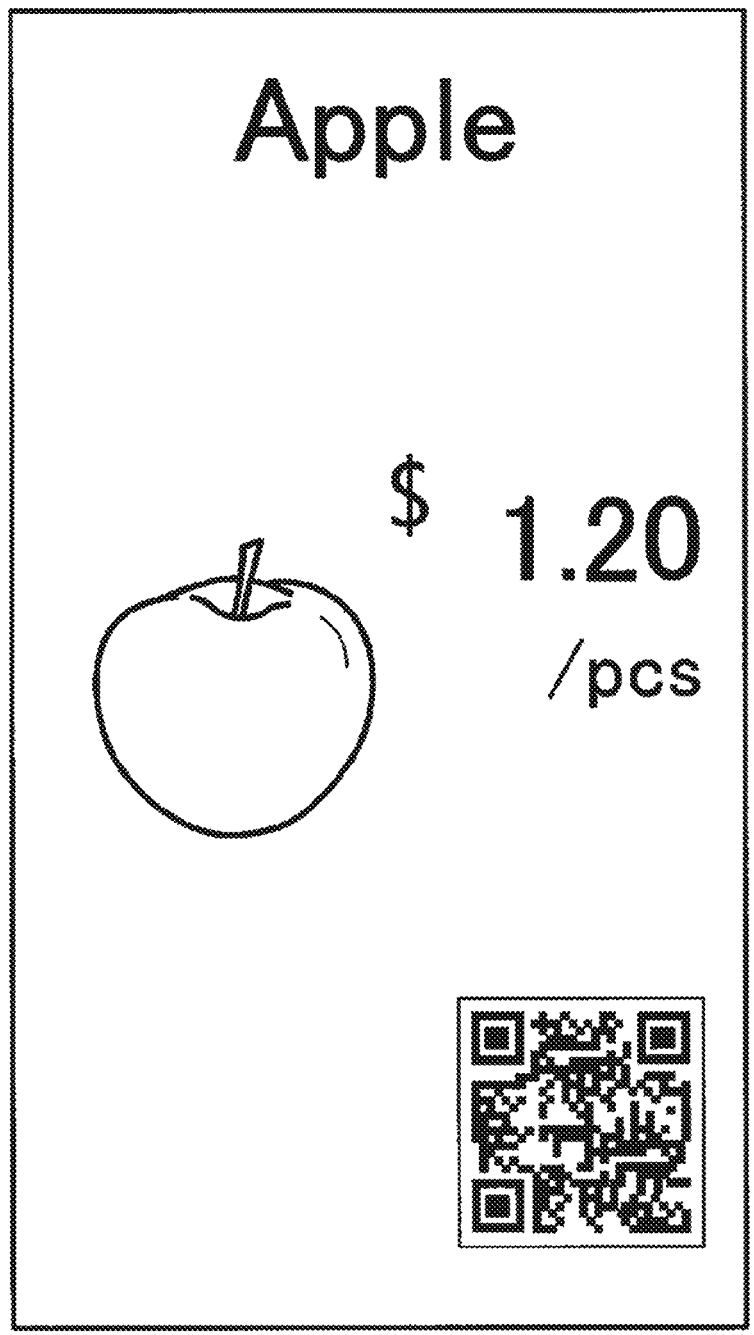
FIG. 27B is a diagram illustrating one example of a content of a shelf label used to describe an example of the procedure of product registration according to the shopping area wherein pricing is performed according to the sixth variation of one or more embodiments.

FIG. 27B illustrates an example of content indicated on the shelf label provided for the apples displayed in the showcase. The shelf label in this diagram indicates that the product category is apples (Apple) and that a unit price per item is 1.20 dollars. Because a unit price per item is established for the apples in this situation, they are a fixed-price product. Moreover, code information in a format of two-dimensional code is disposed in the shelf label in this diagram. Note that the code information in the shelf label may also be one-dimensional code (a barcode).

When the customer performs the operation of using the mobile terminal device 40 to read the code information, an image being photographed by a camera (photography unit 408) is displayed in the scan image area AR1 in the product registration screen in FIG. 27A. The customer performs the photography operation so the code information of the shelf label for the apples is within a frame indicated in the scan image area AR1. Upon detecting that the code information of the shelf label for the apples is within the frame in the scan image area AR1, the mobile terminal device 40 executes a process of reading the code information.

For example, the code information includes the following information: a product code, a product name, and the unit price per item (item unit price) for the apples. Then, based on the content of the read code information, the mobile terminal device 40 displays a quantity designation screen on the touch-panel-equipped display 406. In this situation, the mobile terminal device 40 determines, based on a quantity unit price included in the code information being an item unit price, that the corresponding product is a fixed-price product and displays a quantity designation screen in a format for fixed-price products.

Note that display of the quantity designation screen may be display of a screen transmitted from the transaction management server 50. In this situation, the mobile terminal device 40 transmits a quantity designation screen request including the read code information to the transaction management server 50. If the product indicated by the received code information is a fixed-price product, the transaction management server 50 generates a quantity designation screen in the format for fixed-price products and transmits the generated quantity designation screen to the mobile terminal device 40. Alternatively, if the product indicated by the received code information is a product sold by weight, the transaction management server 50 generates a quantity designation screen in a format for products sold by weight and transmits the generated quantity designation screen to the mobile terminal device 40.

The mobile terminal device 40 displays the received quantity designation screen on the touch-panel-equipped display 406.

Figure 27C:
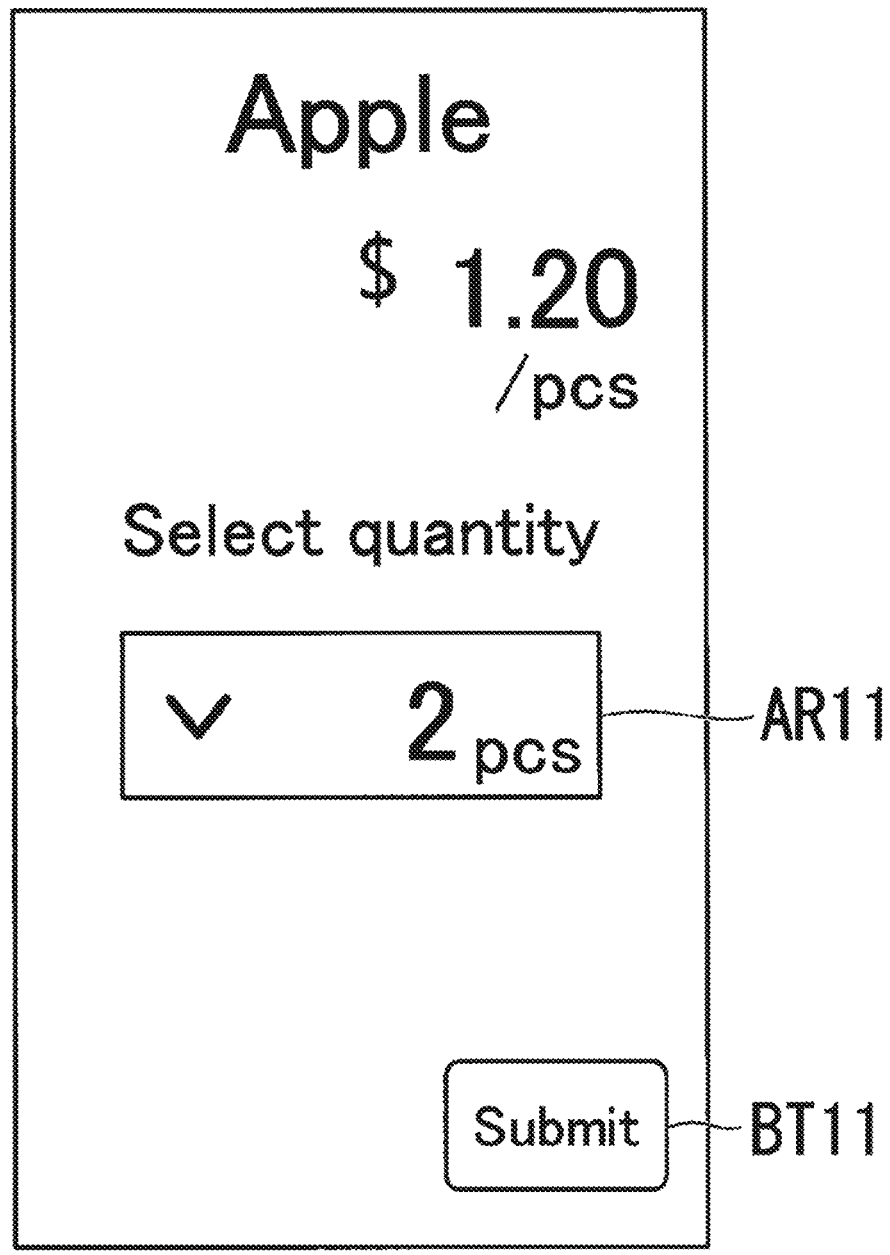
FIG. 27C is a diagram illustrating one example of a quantity designation screen used to describe an example of the procedure of product registration in the shopping area wherein pricing is performed according to the sixth variation of one or more embodiments.

FIG. 27C illustrates one example of the quantity designation screen displayed in response to reading the code information for the apples. The quantity designation screen in this diagram indicates that the product whose quantity is to be designated is apples (Apple) and that the item unit price per apple is 1.20 dollars. Moreover, a message guiding a user to designate (select) a quantity, a quantity designation area AR11, and a transmission button BT11 are disposed in the quantity designation screen in this diagram.

The customer can input an item count of the apples that are the product to be registered by operating the quantity designation area AR11. The customer performing, for example, an operation of touching the quantity designation area AR11 causes a pull-down menu of numerical values to be displayed, and the customer performs an operation of selecting any numerical value from among the numerical values presented in the displayed pull-down menu. Such operations cause the selected numerical value to be displayed in the quantity designation area AR11 as an input result of the item count for the apples.

Note that the operation of inputting the item count using the quantity designation area AR11 may be a numeric input operation using a software keyboard displayed superimposed on the quantity designation screen.

Upon inputting the item count, the customer operates the transmission button BT11. In response to the transmission button BT11 being operated, the mobile terminal device 40 transmits product registration information to the transaction management server 50. The product registration information includes information indicating a transaction identifier indicating the corresponding transaction, the product code, and the designated quantity (item count).

From receiving a notice from the transaction management server 50 that the product registration information is received, the mobile terminal device 40 determines that transmission of the product registration information is completed and again displays the product registration screen on the touch-panel-equipped display 406. This places the mobile terminal device 40 in a state of being able to read code information for the next round of product registration.

Figure 27D:
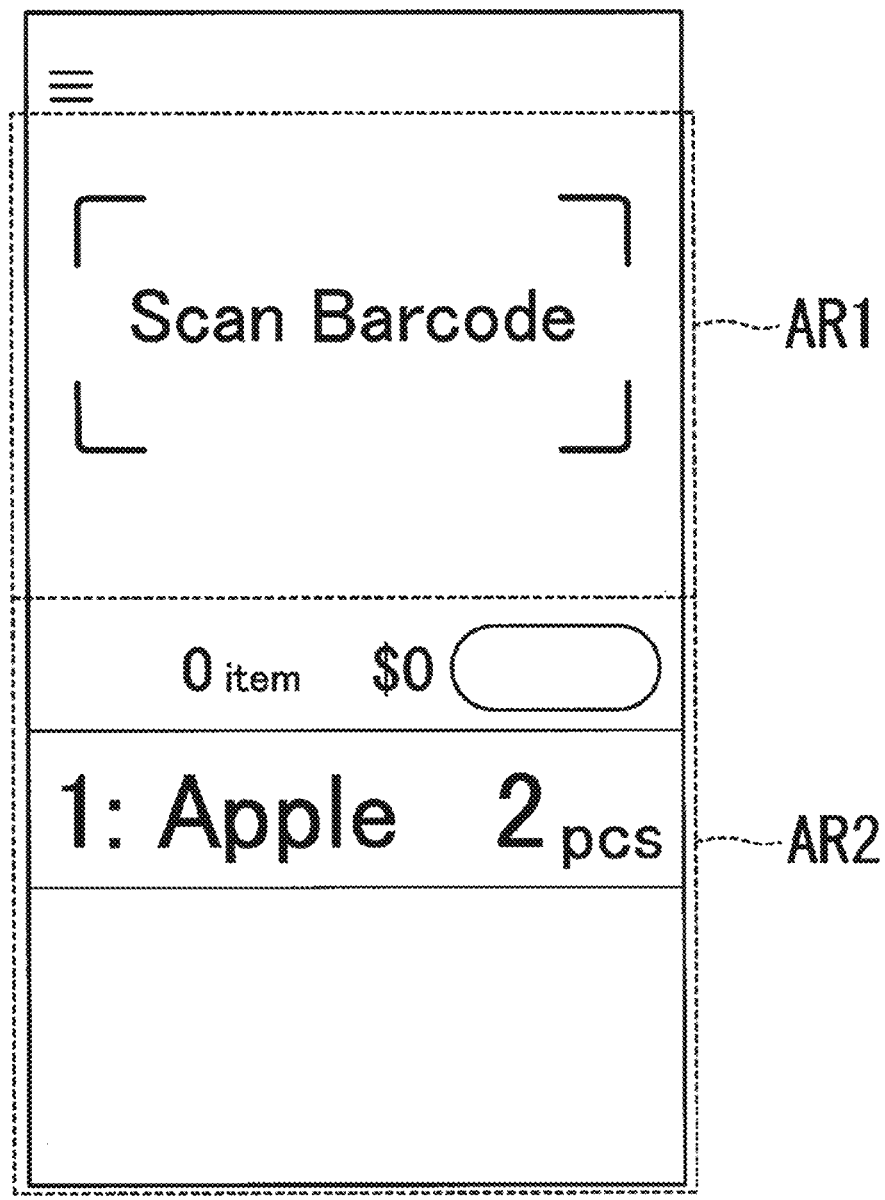
FIG. 27D is a diagram illustrating one example of the product registration screen used to describe an example of the procedure of product registration in the shopping area wherein pricing is performed according to the sixth variation of one or more embodiments.

FIG. 27D illustrates one example of the product registration screen displayed on the touch-panel-equipped display 406 in response to transmission of the product registration information for the apple product being completed. The product registration screen in this situation is changed to a state wherein a list item corresponding to the apple product is disposed in the registered product list area AR2. The list item corresponding to the apple product indicates that two apples are registered in the first round of product registration (first stage of product registration).

Upon ending product registration for the apples as above, the customer next decided to purchase cherries displayed in the showcase.

Figure 28A:
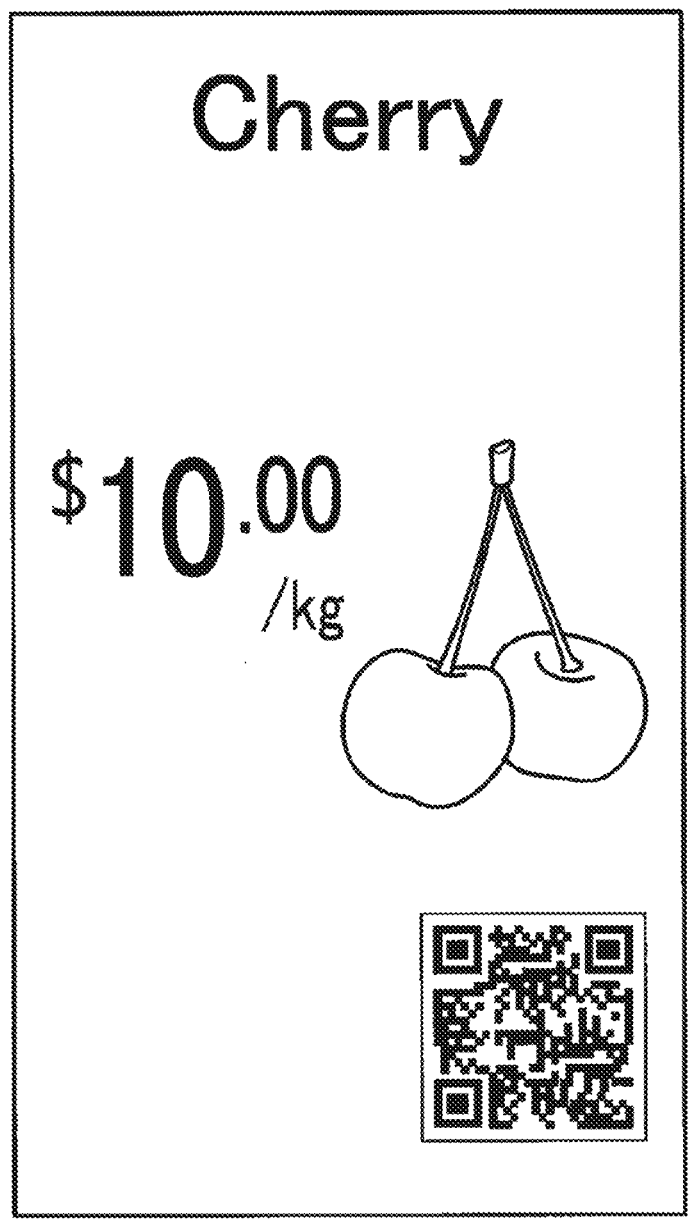
FIG. 28A is a diagram illustrating one example of a content of a shelf label used to describe an example of the procedure of product registration in the shopping area wherein pricing is performed according to the sixth variation of one or more embodiments.

FIG. 28A illustrates an example of content indicated on the shelf label provided for the cherries displayed in the showcase. The shelf label in this diagram indicates that the product category is cherries (Cherry), indicates that a unit price per Kg (weight unit price) is 10.00 dollars, and has code information of a content corresponding to the cherries disposed therein.

At this time, display on the touch-panel-equipped display 406 of the mobile terminal device 40 is in the state of FIG. 27D, and the mobile terminal device 40 is in a state of being able to read code information. Therefore, the customer performs an operation of using the mobile terminal device 40 to read the code information disposed in the shelf label for the cherries.

In response to reading the code information disposed in the shelf label for the cherries, the mobile terminal device 40 displays a quantity designation screen for the cherries on the touch-panel-equipped display 406.

Figure 28B:
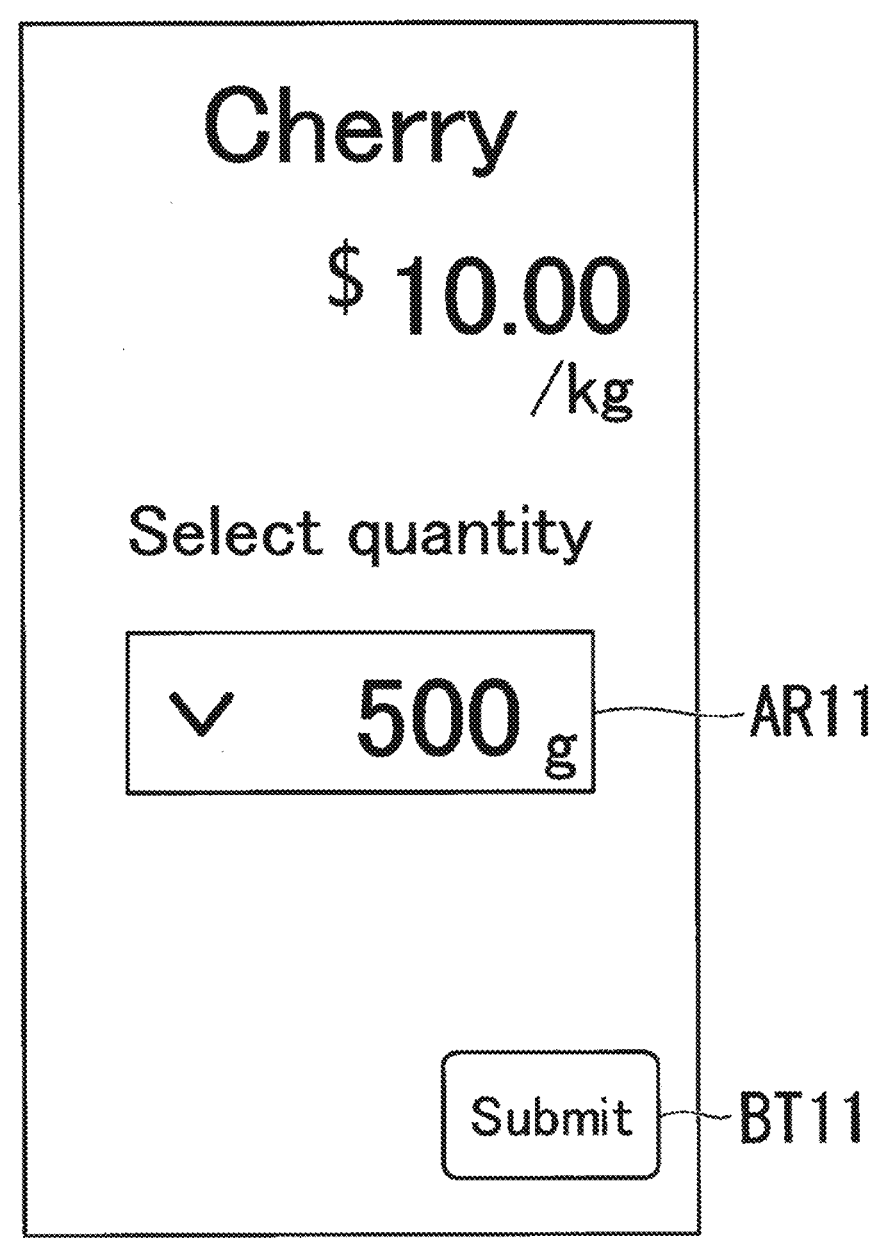

FIG. 28B illustrates one example of the quantity designation screen displayed in response to reading the code information for cherries. The quantity designation screen in this diagram indicates that the product whose quantity is to be designated is cherries and that the weight unit price per Kg is 10.00 dollars. Moreover, a message guiding the user to designate (select) a quantity, the quantity designation area AR11, and the transmission button BT11 are disposed in the quantity designation screen in this diagram.

In this situation, the cherries are a product sold by weight. As such, the customer performs weight input for the cherries by operating the quantity designation area AR11. It is favorable for an aspect of the operation for inputting the weight of the cherries to conform to the above operation for inputting the item count of the apples.

For example, the customer may perform, for example, an operation of touching the quantity designation area AR11 to display a pull-down menu of numerical values indicating weights incrementally and may perform an operation of selecting any numerical value from among the numerical values presented in the displayed pull-down menu. Alternatively, the operation of inputting the weight using the quantity designation area AR11 may be a numeric input operation using a software keyboard displayed superimposed on the quantity designation screen.

Upon inputting the weight, the customer operates the transmission button BT11. In response to the transmission button BT11 being operated, the mobile terminal device 40 transmits product registration information to the transaction management server 50. The product registration information includes information indicating a product code and the designated quantity (weight).

In response to transmission completion of the product registration information, the mobile terminal device 40 again displays the product registration screen on the touch-panel-equipped display 406.

Figure 28C:
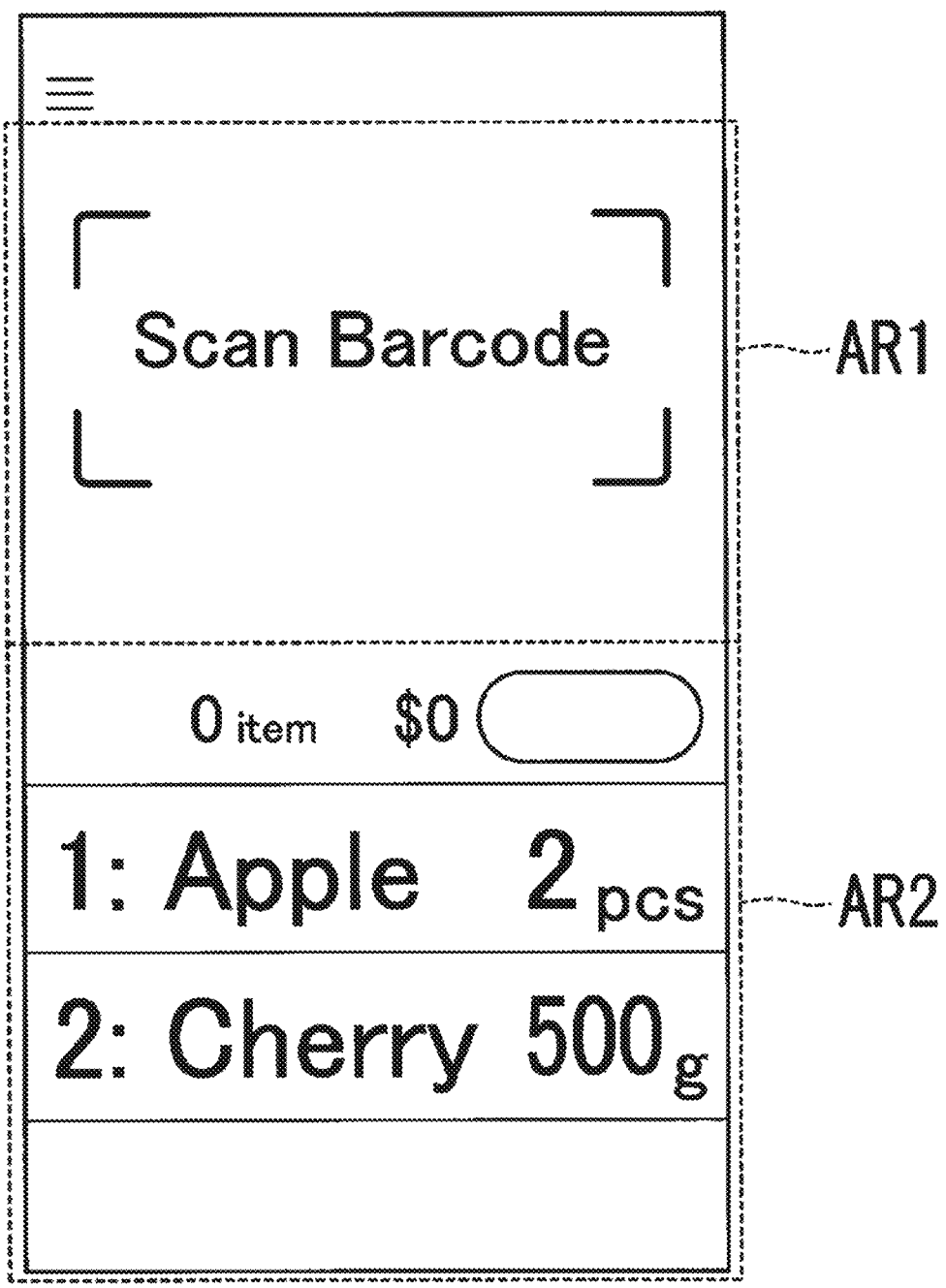
FIG. 28C is a diagram illustrating one example of the product registration screen used to describe an example of the procedure of product registration in the shopping area wherein pricing is performed according to the sixth variation of one or more embodiments.

FIG. 28C illustrates one example of the product registration screen displayed on the touch-panel-equipped display 406 in response to transmission of the product registration information for the cherry product being completed. The product registration screen in this situation is changed to a state wherein in addition to the list item corresponding to the apple product, a list item corresponding to the cherry product is further disposed in the registered product list area AR2. Display of such a list item indicates that 500 g of cherries are registered in the second round of product registration (first stage of product registration).

In this situation, the customer ending the first stage of product registration for the apples and the cherries ends the first stage of product registration for all products they would like to purchase in the shopping area wherein pricing is performed.

As above, each time the first stage of product registration is performed, the mobile terminal device 40 transmits the product registration information of the registered products to the transaction management server 50.

Each time it receives the product registration information, the transaction management server 50 collates the product codes indicated in the received product registration information with a product master. The product master according to the sixth variation includes information for each product indicating whether the product is sold at the shopping area wherein pricing is performed.

The transaction management server 50 in this situation recognizes, as a result of collating the product codes and the product master, that the corresponding product is sold in the shopping area wherein pricing is performed. Therefore, the transaction management server 50 transmits a pricing process request including the received product registration information to the weighing and pricing device 10.

At this time, in transmitting the pricing process request for the product registration information of the first product, the transaction management server 50 may transmit the pricing process request by, for example, selecting a weighing and pricing device 10 in a waiting state from among the plurality of weighing and pricing devices 10 disposed in the shopping area. Afterward, for pricing process requests for product registration information of second and subsequent products, the transaction management server 50 performs transmission to the same weighing and pricing device 10 the first product registration information was transmitted to.

Next, the second stage of product registration is performed as follows.

The weighing and pricing device 10 uses the product registration information included in the pricing process request received from the mobile terminal device 40 to display a pricing product selection screen on the employee display 105.

Figure 29A:
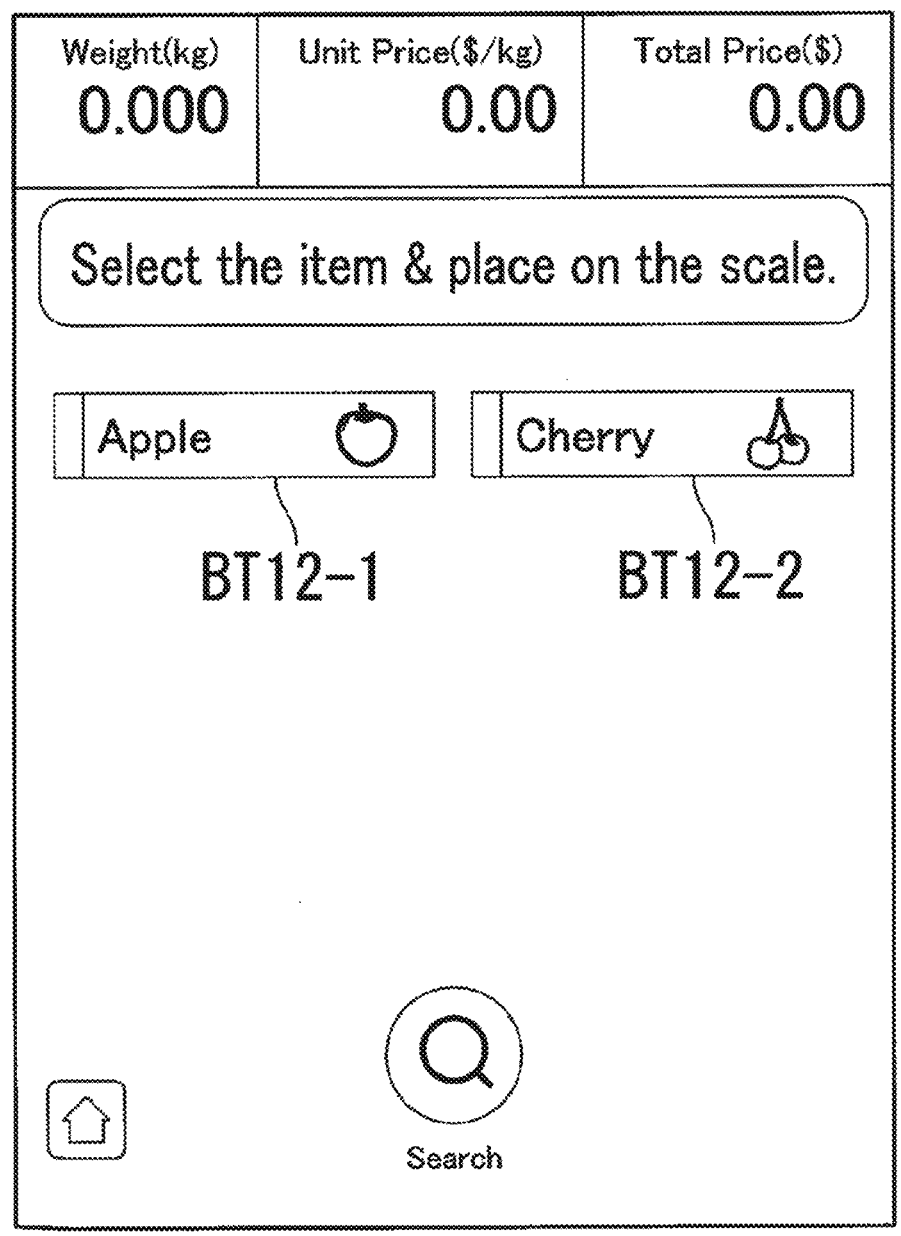
FIG. 29A is a diagram illustrating one example of a pricing product selection screen used to describe an example of the procedure of product registration in the shopping area wherein pricing is performed according to the sixth variation of one or more embodiments.

FIG. 29A illustrates an example of an aspect of the pricing product selection screen. The pricing product selection screen in this diagram corresponds to a state of a stage wherein the pricing process request for the apples and the pricing request for the cherries that follows are received in connection with the example described using FIG. 27A to FIG. 27D and FIG. 28A to FIG. 28C.

In the pricing product selection screen in this diagram, a pricing product button BT12-1 for the apples and a pricing product button BT12-2 for the cherries are disposed. Note that in the following description, the pricing product buttons BT12-1, BT12-2 are referred to as a pricing product button BT12 unless noted otherwise.

First, when the pricing process request for the apples is received first, a pricing product selection screen wherein only the pricing product button BT12-1 is disposed is displayed. Afterward, the pricing product button BT12-2 is further disposed in response to the pricing process request for the cherries being received.

The pricing product button BT12 is a button whereby an operation is performed of selecting a product to be subjected to the pricing process. When, as in the pricing product selection screen in this diagram, the pricing product buttons BT12-1, BT-12 are disposed, the employee may operate either among the pricing product buttons BT12-1, BT-12 first, regardless of an order wherein the pricing process requests are received.

Here, an example is given wherein the employee operates the product button BT12-1 for the apples first among the pricing product buttons BT12-1, BT-12. In response to the product button BT12-1 being operated, a product pricing screen for the apple product is displayed on the employee display 105.

Figure 29B:
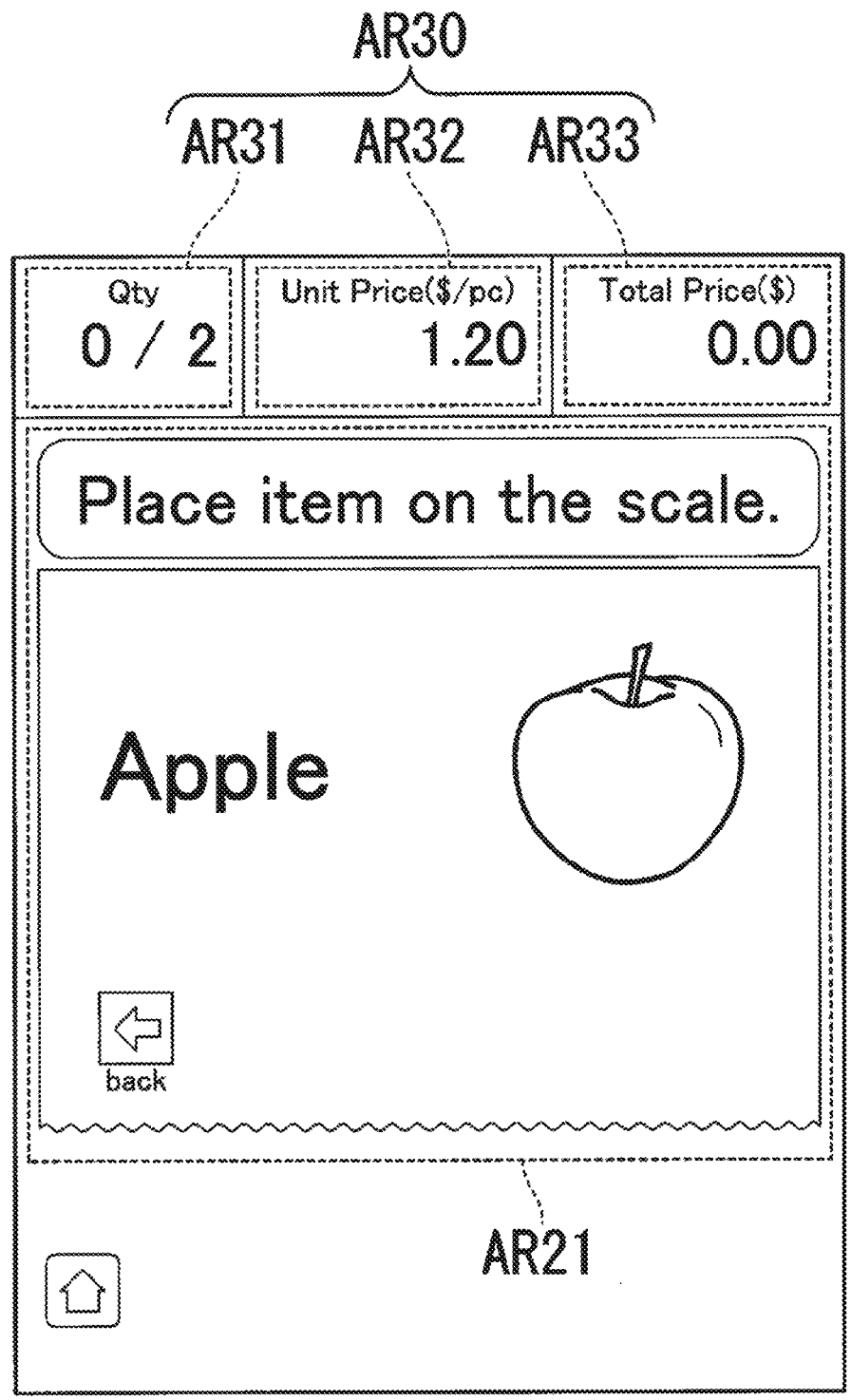
FIG. 29B is a diagram illustrating one example of a product pricing screen used to describe an example of the procedure of product registration in the shopping area wherein pricing is performed in the sixth variation of one or more embodiments.

FIG. 29B illustrates one example of the product pricing screen for the apple product. A guide area AR21 and a pricing information area AR30 are disposed in the product pricing screen. The pricing information area AR30 includes a quantity area AR31, a unit price area AR32, and a price area AR33.

The guide area AR21 is a region displaying content guiding the employee. The guide area AR21 in this diagram guides the employee that the current product to be priced is apples.

The pricing information area AR30 is a region indicating information relating to pricing of the corresponding product. In a pricing information area AR30 for a fixed-price product, as in the apples in this situation, the quantity area AR31, the unit price area AR32, and the price area AR33 are disposed.

The quantity area AR31 is a region indicating a product quantity input according to an employee operation for pricing. Because the apples are a fixed-price product, the quantity area AR31 in this diagram indicates a numerical value indicating an item count input according to an employee operation. Moreover, in the quantity area AR31, the quantity designated by the customer (purchase quantity) is displayed as a denominator, and the quantity input according to the employee operation is displayed as a numerator.

The unit price area AR32 is a region indicating the quantity unit price of the product to be priced.

The price area AR33 is a region indicating the price according to the current product quantity.

By viewing the display of the product pricing screen illustrated in FIG. 29B, the employee was able to confirm that apples need to be priced. Moreover, the employee can also grasp from the display in the quantity area AR31 that the number of apples to be purchased is two. Therefore, the employee removes two apples from the showcase and thereupon performs the operation of inputting the purchase count.

For example, as the operation of inputting the purchase count, for example, the employee places one apple at a time on the scale 109a of the weighing and pricing device 10. As a weight measured by the weighing unit 109 increases incrementally in response to one apple being placed thereon at a time, the weighing and pricing device 10 increases the item count of the product by 1 each time. The item count of the product counted in this manner is reflected as change in a value of the numerator in the quantity area AR31. Moreover, display in the price area AR33 also changes to be a price corresponding to the item count of the counted product.

Upon confirming that the item count of the product counted by the weighing and pricing device 10 has reached the purchase count due to two apples being placed on the scale 109a, the employee performs a predetermined operation for establishing pricing (pricing establishment operation).

Note that a configuration may be such that instead of placing one product at a time on the scale 109a as above, the purchase count can be input by a numeric operation.

In response to the pricing establishment operation being performed, the weighing and pricing device 10 transmits product pricing information reflecting the established result of the pricing process (which, in the sixth variation, is also product registration information) to the transaction management server 50. The transaction management server 50 registers the received product pricing information in basket information corresponding to the present transaction. The second stage of product registration for the apple product is performed in this manner.

Furthermore, in response to the second stage of product registration being performed as above, the weighing and pricing device 10 issues a single-product label for the apple product. Note that no code information needs to be printed on the single-product label when applying the sixth variation to the second embodiment or the third embodiment.

Figure 29C:
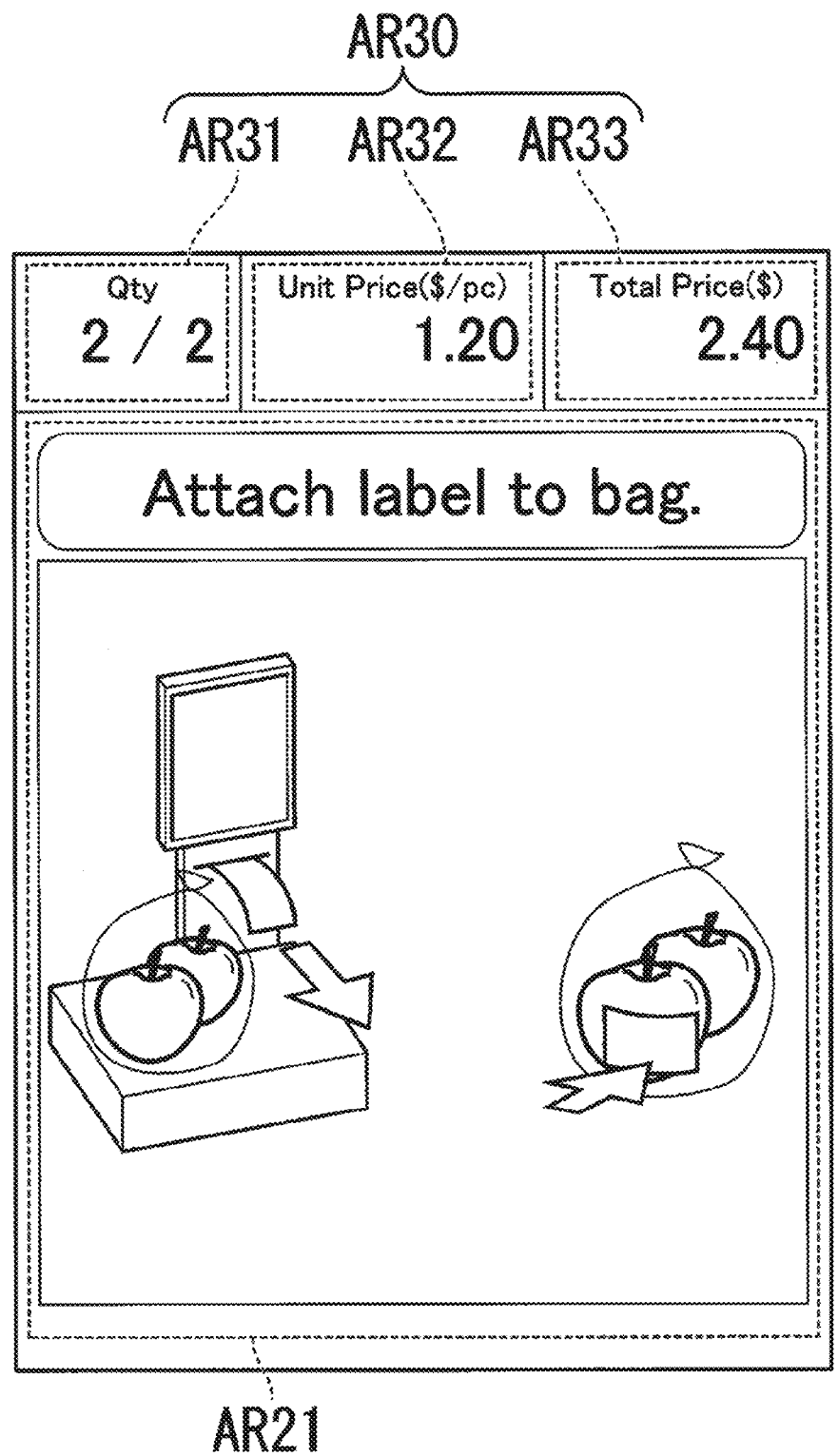
FIG. 29C is a diagram illustrating one example of a product pricing screen used to describe an example of the procedure of product registration in the shopping area wherein pricing is performed according to the sixth variation of one or more embodiments.

Furthermore, together with the issuing of the single-product label, display of the guide area AR21 in the product pricing screen changes as in FIG. 29C.

The guide area AR21 in the product pricing screen in FIG. 29C displays content guiding the employee to affix the issued single-product label on a container containing the product. The employee, for example, affixes the single-product label on the container upon placing the two apples in the container.

When they finish affixing the label, the employee uses the weighing and pricing device 10 to perform an operation of ending the pricing process for the first product category (product pricing ending operation).

In this situation, among the products corresponding to the product pricing information received in the corresponding transaction, the pricing process for the cherry product is not yet ended. In this situation, in response to the product pricing ending operation for the apples being performed, display on the employee display 105 of the weighing and pricing device 10 transitions to the pricing product selection screen illustrated in FIG. 30A.

Figure 30A:
FIG. 30A is a diagram illustrating one example of a pricing product selection screen used to describe an example of the procedure of product registration in the shopping area wherein pricing is performed according to the sixth variation of one or more embodiments.

In the pricing product selection screen in FIG. 30A, the pricing product button BT12-1 for the apples disposed in FIG. 29A is erased, and a state is entered into wherein only the pricing product button BT12-2 for the cherries is disposed. By viewing such a display, the employee can grasp that the pricing operation for the apple product is ended and that the pricing operation for the cherry product is not yet performed. In this situation, the employee operates the pricing product button BT12-2 to perform the pricing operation for the cherry product. In response to the pricing product button BT12-1 being operated, a product pricing screen for the cherry product is displayed on the employee display 105.

Figure 30B:
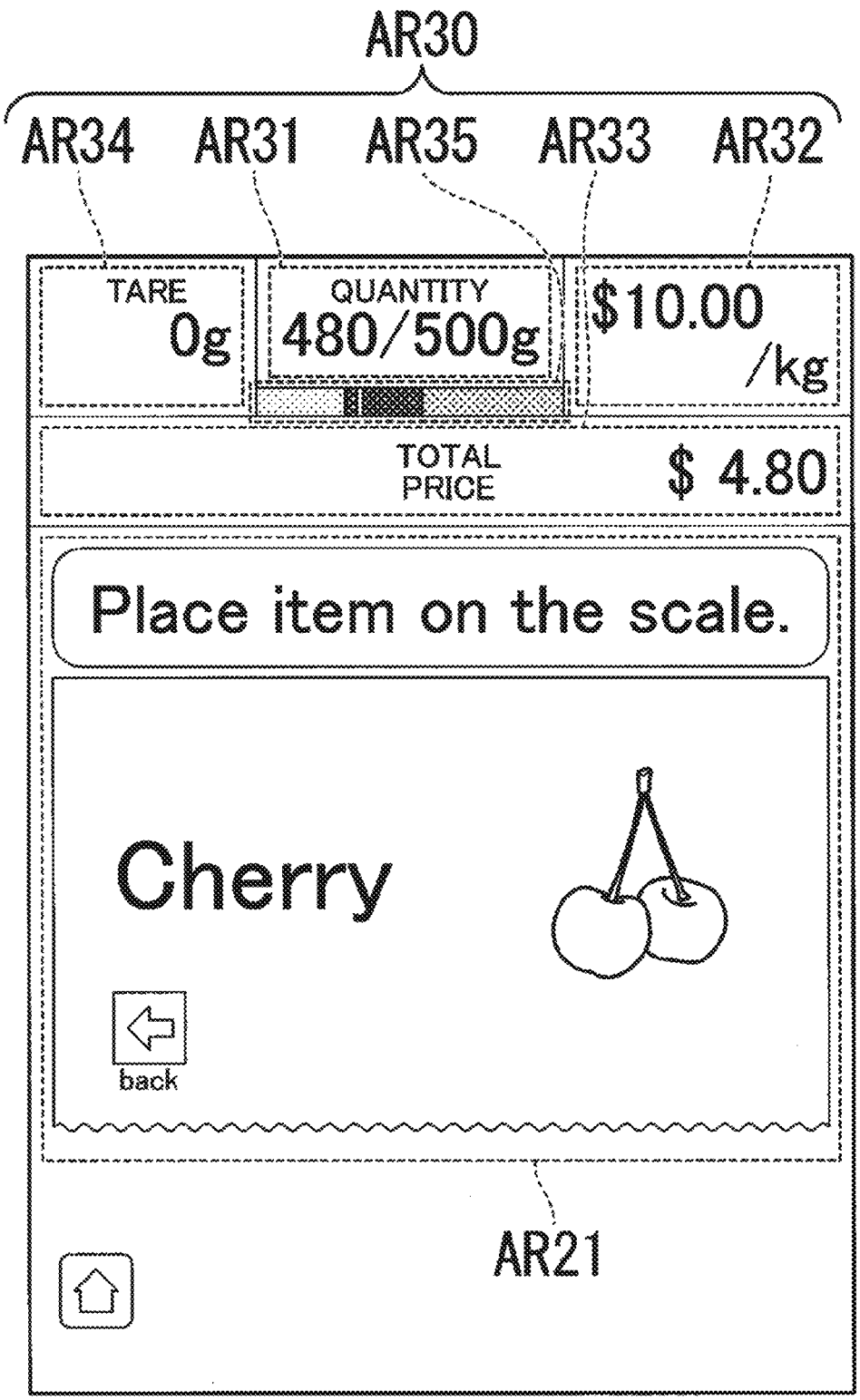
FIG. 30B is a diagram illustrating one example of a product pricing screen used to describe an example of the procedure of product registration in the shopping area wherein pricing is performed according to the sixth variation of one or more embodiments.

FIG. 30B illustrates one example of the product pricing screen for the cherry product. Portions identical to FIG. 29B are labeled with the same reference signs.

Whereas the apples were a fixed-price product, the cherries are a product sold by weight. As such, the pricing information area AR30 in the product pricing screen for the cherries that are a product sold by weight differs from FIG. 29B, which is for fixed-price products, as follows.

That is, in the pricing information area AR30 in this diagram, the weight measured for the product to be priced is indicated in the quantity area AR31. Moreover, in the quantity area AR31 for products sold by weight, the weight designated by the customer is displayed as a denominator, and the weight measured for the product is displayed as a numerator. Moreover, in the unit price area AR32, a price per unit weight (weight unit price) for the product to be priced is indicated.

Furthermore, in the pricing information area AR30 in this diagram, in addition to the quantity area AR31, unit price area AR32, and price area AR33 above, a tare area AR34 and a weighing gauge area AR35 are further disposed.

The tare area AR34 is a region indicating a tare weight.

The weighing gauge area AR35 is a region displaying the weight measured for the product (measured weight) in an aspect of a gauge. In the example in this diagram, for example, a graduation range of the weighing gauge area AR35 is divided into three ranges based on the weight designated by the customer (designated weight): an appropriate range, a range lighter than the appropriate range, and a range heavier than the appropriate range.

In a state wherein the product pricing screen illustrated in FIG. 30B is displayed, the employee removes the cherries from the showcase and places them on the scale 109a of the weighing and pricing device 10. The weighing and pricing device 10 measures a weight of the cherries placed thereon. The weighing and pricing device 10 reflects the measured weight as the numerator value in the quantity area AR31. Moreover, the weighing and pricing device 10 reflects the measured weight in the weighing gauge area AR35. Moreover, the price area AR33 displays a price according to the measured weight.

The employee views the numerator value in the quantity area AR31 and the weighing gauge area AR35 and adjusts the quantity of cherries placed on the scale 109a so the measured weight enters the appropriate range relative to the designated weight. When the measured weight enters the appropriate range, the employee, for example, has the customer confirm whether they approve of the price according to the current measured weight. Upon obtaining customer approval, the employee performs the pricing establishment operation.

In response to the pricing establishment operation being performed, the weighing and pricing device 10 transmits product pricing information reflecting the established result of the pricing process (which, in the sixth variation, is also product registration information) to the transaction management server 50. The transaction management server 50 registers the received product pricing information in the basket information corresponding to the present transaction. The second stage of product registration for the cherry product is performed in this manner.

In response to the second stage of product registration being performed as above, the weighing and pricing device 10 issues a single-product label for the cherry product.

Together with the issuing of the single-product label, although illustration is omitted, display of the guide area AR21 in the product pricing screen displays content guiding the employee to affix the issued single-product label on a container containing the product. The employee, for example, affixes the single-product label on the container upon placing the cherries placed on the scale 109a in the container. The employee hands to the corresponding customer the container of cherries whereon the label is affixed this time and the container of apples whereon the single-product label was affixed previously.

The employee performs the product pricing ending operation in response to affixing the single-product label from this time. In this situation, because no product remains to subject to the pricing process in the corresponding transaction, the weighing and pricing device 10 may, for example, transition to the waiting state.

In this manner, the sixth variation enables the customer to perform product registration involving an operation of using the mobile terminal device 40 to read code information for a product to be purchased by the customer as is done in a shopping area wherein a product shelf is disposed, even in a shopping area wherein pricing is performed.

Note that in, for example, product registration in a shopping area wherein pricing is performed, in response to ending registration of a product sold in the shopping area wherein pricing is performed, the mobile terminal device 40 may request the customer to perform an operation of declaring that operations of product registration in the shopping area wherein pricing is performed are ended (registration ending declaration operation) operation. In this situation, the mobile terminal device 40 may, in response to the registration ending declaration operation being performed, transmit the product pricing information of all products registered in the shopping area wherein pricing is performed to the transaction management server 50.

Note that the description according to FIG. 27A to FIG. 27D, FIG. 28A to FIG. 28C, FIG. 29A to FIG. 29C, FIG. 30A, and FIG. 30B above gives a configuration wherein the product pricing information (product registration information) transmitted by the mobile terminal device 40 is received by the weighing and pricing device 10 via the transaction management server 50. However, for example, the product pricing information may be transmitted directly from the mobile terminal device 40 to the weighing and pricing device 10 without going through the transaction management server 50.

[Seventh Variation]

The label issuing device in each of the above embodiments is not limited to a configuration as a weighing and pricing device 10. For example, it may be configured to include an automatic change machine, a drawer, and the like so as to have a function as a POS register that can also perform a settlement process for a registered product. The label issuing device of the seventh variation can execute, to completion, processes ranging from a product registration process involving product pricing to a settlement process corresponding to the product registration process. Alternatively, the label issuing device of each of the above embodiments may be configured as a pricing device that performs pricing by counting a product instead of weighing a product.

Summary of Embodiments (1) As described above, according to one or more embodiments, a weighing and pricing device (10) includes a registration means of executing a registration process of registering a product to be purchased (for example, a pricing process), a connection means for a mobile device (for example, a mobile terminal device 40) to communicably connect to the weighing and pricing device (weighing and pricing device 10), an input means of inputting identification information (for example, a terminal identifier) of the mobile device connected to the weighing and pricing device, and a storage means of storing information relating to the product registered by the registration means (for example, product pricing information) and the identification information input by the input means in association with each other.

According to one or more embodiments, the weighing and pricing device, includes:

a processor (e.g., CPU 101) that executes a registration process for a product to be purchased by a customer; a transceiver (e.g., near field communication unit 112) that: establishes a connection between a mobile device possessed by the customer and the weighing and pricing device; and upon establishing the connection, receives, from the mobile device, identification information that identifies the mobile device; and a storage (e.g., hard disk 107 or SSD) that stores information relating to the product and the identification information in association with each other. After the registration process is interrupted, the transceiver receives, from the mobile device, identification information. The processor specifies the product associated with the stored identification information that corresponds to the identification information received after the registration process. The processor recommences the registration process for the specified product.

According to the above configuration, it is possible to manage, on one hand, product pricing information reflecting a result of the pricing process (registration process) by the weighing and pricing device 10 in the same one transaction and, on the other, a mobile terminal device 40 of a customer in association with each other. That is, it is possible to manage, on one hand, a transaction that the weighing and pricing device 10 manages as product pricing information and, on the other, the mobile terminal device 40 in association with each other.

This enables a sales system that performs product registration using the mobile terminal device 40 possessed by the customer to efficiently perform product registration using a weighing and pricing device for in-person sales. For example, even if, for example, a pricing process in a certain transaction is interrupted, as long as the weighing and pricing device 10 can acquire the terminal identifier of the mobile terminal device 40 via communication, the weighing and pricing device 10 can recommence the pricing process by calling up the interrupted transaction.

(2) According to one or more embodiments, in the weighing and pricing device according to (1), the connection means displays, on a customer display (106), a code indicating control information for the other device to communicably connect to the weighing and pricing device.

According to the above configuration, it is possible to communicably connect the mobile terminal device 40 and the weighing and pricing device 10 by performing a simple operation of using the mobile terminal device 40 to read the code displayed on the customer display 106.

(3) According to one or more embodiments, in the weighing and pricing device according to (2), the connection means displays the code in response to the product to be purchased being registered.

According to the above configuration, the customer can perform an operation of using the mobile terminal device 40 to read the code in response to the product to be purchased by them being registered. This enables the customer to use the mobile terminal device 40 to reliably read a code associated with their product that has undergone the pricing process.

Note that "the product . . . being registered" in (3) may include pricing being established according to the pricing process of step S102, S1103, or the like; the product being specified according to the product specification process of step S1101; the connection necessity confirmation screen being displayed according to S1108; the pricing completion operation being performed according to the third variation; and the like.

(4) According to one or more embodiments, in the weighing and pricing device according to (2) or (3), the connection means stops displaying the code in response to communicably connecting to the other device.

According to the above configuration, display of the code can be stopped in response to connecting to the mobile terminal device 40 in response to the mobile terminal device 40 reading the code.

(5) According to one or more embodiments, the weighing and pricing device according to any one among (1) to (4), further includes a registration process information transmission means of transmitting registration process information (for example, product pricing information) reflecting a registration result of the product by the registration means to the other device connected to the weighing and pricing device and a print control means of printing predetermined information corresponding to the registration process information (for example, a single-product label) in response to a reception confirmation notice being received notifying that the other device received the registration process information transmitted by the registration process information transmission means.

The above configuration can ensure that no single-product label is issued unless the pricing process is performed for the product and the product pricing information reflecting the result of the pricing process is received normally by the mobile terminal device 40. Therefore, it is possible to accurately determine whether the process of product registration is executed normally for a product that is weighed and sold using a weighing and pricing device according to whether a single-product label is issued.

(6) According to one or more embodiments, in the weighing and pricing device according to (5), the print control means prints a product label (for example, a single-product label) corresponding to a unit of the product registered by the registration means as the predetermined information corresponding to the registration process information.

According to the above configuration, because a product label is issued for each product to be purchased subjected to the pricing process in one transaction, it can be accurately determined for each product to be purchased whether the process of product registration was executed normally.

(7) According to one or more embodiments, in the weighing and pricing device according to (5) or (6), the print control means prints, in response to registration being completed for a plurality of products in one transaction, information of a total monetary amount of the registered products (for example, an addition label) as the predetermined information corresponding to the registration process information.

According to the above configuration, because an addition label indicating the total monetary amount of the one or more products to be purchased subjected to the pricing process in one transaction is issued, it can be accurately and collectively determined for all products to be purchased in one transaction whether the process of product registration was executed normally.

(8) According to one or more embodiments, the weighing and pricing device according to any one among (1) to (7), further includes a connection necessity confirmation means of confirming, when the connection means is not connected to the other device before registration is established for at least one product, a necessity of connecting to the other device.

According to one or more embodiments, in the weighing and pricing device, when the connection is not established before the registration process for the product is completed, the processor causes a display of the weighing and pricing device to display a screen asking if the connection needs to be established.

In sales of products sold by weight, a weighing and pricing device is used that is for a sales format wherein an employee waits on a customer in person. In a shopping area that uses the weighing and pricing device in a sales system such as above, the procedure is for the employee to price a product designated by the customer and then register the product on the customer's mobile terminal device. This is different from a procedure wherein the customer removes a product from a product shelf or the like and causes the mobile terminal device to read a code to perform product registration. Moreover, even in a store that has introduced a sales system that performs product registration using the mobile terminal device possessed by the customer, operations may be such that transactions for customers not using a mobile terminal device can also be performed. For sales of products sold by weight in such a situation, it is preferable to perform the transaction efficiently, regardless of whether the customer uses a mobile terminal device.

In the shopping area for pricing according to one or more embodiments, the weighing and pricing device 10 can, in response to product registration, for example, issue a label whereon code information is printed for a customer not using a mobile terminal device 40 and issue a label whereon no code information is printed for a customer using a mobile terminal device 40. According to the above configuration, erroneously issuing a label whereon code information is printed even though the interaction is with a customer using a mobile terminal device 40 can be prevented.

(9) According to one or more embodiments, the weighing and pricing device according to (8), further includes a printing means of printing, when the connection necessity confirmation means determines that no connection to the mobile device is necessary, product registration use information used in product registration and an input means of inputting the product registration use information printed by the printing means, wherein the connection means performs, in response to the input means inputting the product registration use information, a process for the mobile device to communicably connect to the weighing and pricing device.

According to one or more embodiments, the weighing and pricing device further includes a scanner that reads code information used to register the product. The processor detects a user input that designates if the connection needs to be established, on the screen. upon detecting the input, the processor determines that the connection does not need to be established. The processor causes a printer to print a label indicating the code information to register the product. The scanner reads the code information. Upon reading the code information, the transceiver establishes the connection.

According to the above configuration, even if a label whereon code information is printed is erroneously issued in an interaction with a customer using a mobile terminal device 40, without redoing registration of the corresponding product. By reading the code information of the issued label, a label whereon no code information is printed can be reissued as product registration using a mobile terminal device 40.

(10) According to one or more embodiments, the weighing and pricing device according to (8) or (9), further includes an operating entity registration means of registering an operating entity to operate the weighing and pricing device in one transaction, wherein the connection means cuts off the connection between the weighing and pricing device and the mobile device at a predetermined timing before the operating entity is registered as an operating entity to operate another weighing and pricing device in the same one transaction.

According to the above configuration, the connection between the weighing and pricing device 10 and the mobile terminal device 40 can be appropriately cut off in response to a change in the weighing and pricing device 10 operated by the employee when product registration in product registration succession is performed.

(11) According to one or more embodiments, in the weighing and pricing device according to any one among (8) to (10), the connection means displays, on the customer display, the code indicating the control information for the mobile device to communicably connect to the weighing and pricing device in response to the connection necessity confirmation means determining that connection to the mobile device is necessary.

According to the above configuration, even when a customer intending to shop using a mobile terminal device 40 has not, due to some circumstance, performed the operation of using the mobile terminal device 40 to read the code information, in response to the confirmation being obtained that connection is necessary, a state is obtained wherein the code is displayed without being deleted.

(12) According to one or more embodiments, in a sales system that includes a weighing and pricing device and a mobile terminal device, the weighing and pricing device includes a registration means of executing a registration process of registering a product to be purchased, a connection means for the mobile terminal to communicably connect to the weighing and pricing device, an input means of inputting identification information of the mobile terminal connected to the weighing and pricing device, and a storage means of storing information relating to the product registered by the registration means and the identification information input by the input means in association with each other. The mobile terminal includes an identification information output means of outputting the identification information to the weighing and pricing device connected by the connection means.

(13) According to one or more embodiments, a product registration processing method in a weighing and pricing device, provided with a registration step of executing a registration process of registering a product to be purchased, a connection step for an mobile device to communicably connect to the weighing and pricing device, an input step of inputting identification information of the mobile device connected to the weighing and pricing device, and a storage step of storing information relating to the product registered by the registration step and the identification information input by the input step in association with each other.

(14) According to one or more embodiments, a product registration processing method may be applied to a sales system including a weighing and pricing device and a mobile terminal. The method includes a registration step of executing a registration process of registering a product to be purchased, a connection step for the mobile terminal to communicably connect to the weighing and pricing device, an input step of inputting identification information of the mobile terminal connected to the weighing and pricing device, and a storage step of storing information relating to the product registered by the registration step and the identification information input by the input step in association with each other, and the mobile terminal includes an identification information output step of outputting the identification information to the weighing and pricing device connected by the connection step.

(15) According to one or more embodiments, a program causes a computer serving as a weighing and pricing device to function as a registration means of executing a registration process of registering a product to be purchased, a connection means for an mobile device to communicably connect to the weighing and pricing device, an input means of inputting identification information of the mobile device connected to the weighing and pricing device, and a storage means of storing information relating to the product registered by the registration means and the identification information input by the input means in association with each other.

(16) According to one or more embodiments, a storage medium (non-transitory computer-readable medium (CRM) stores a program for causing a computer to function as a weighing and pricing device. The program causes the computer to execute a registration means of executing a registration process of registering a product to be purchased, a connection means for a mobile device to communicably connect to the weighing and pricing device, an input means of inputting identification information of the mobile device connected to the weighing and pricing device, and a storage means of storing information relating to the product registered by the registration means and the identification information input by the input means in association with each other.

Note that processes as the above weighing and pricing device 10, mobile terminal device 40, transaction management server 50, selling-by-weight management server 60, and the like may be performed by recording, on a computer-readable recording medium, a program for realizing functions as the above weighing and pricing device 10, mobile terminal device 40, transaction management server 50, selling-by-weight management server 60, and the like and causing a computer system to read and execute the program recorded on this recording medium. Here, "causing a computer system to read and execute the program recorded on . . . recording medium" includes installing the program in the computer system. The "computer system" referred to here includes an OS and hardware such as peripherals. Moreover, the "computer system" may include a plurality of computer devices connected via a network, which includes communication lines such as the internet, a WAN, a LAN, and a dedicated line. Moreover, "computer-readable recording medium" refers to a storage device such as a flexible disk, a magneto-optical disc, a ROM, a CD-ROM, or another portable medium or a hard disk built into the computer system. In this manner, the recording medium storing the program may be a non-transitory recording medium such as a CD-ROM. Moreover, the recording medium includes recording media provided internally or externally that can be accessed from a distribution server for distributing this program. Code of the program stored in the recording medium of the distribution server may differ from code of a program in a format that the terminal device can execute. That is, the program stored in the distribution server may be in any format as long as the program can be downloaded from the distribution server and installed in an executable form on the terminal device. Note that a configuration may be such that the program is divided into a plurality of programs, each program is downloaded at different timings, and these are afterward combined in the terminal device. Moreover, different distribution servers may distribute each divided program. Moreover, the "computer-readable recording medium" also includes components that retain the program for a certain amount of time, such as a volatile memory (RAM) inside a server, when the program is transmitted via a network, or a computer system that is a client. Moreover, the above program may be for realizing a portion of the above functions. Moreover, the above program may be one that can realize the above functions by being combined with a program already recorded on the computer system—a so-called difference file (difference program).

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

10 (10-1, 10-2, 10-3) weighing and pricing device, 20 (20-1, 20-2) settlement device, 30 management device, 40 mobile terminal device, 50 transaction management server, 60 selling-by-weight management server

What is claimed is:

1. A weighing and pricing device, comprising:
an employee display;
a processor that executes a registration process for a product to be purchased by a customer and calculates a price of the product;
a transceiver that:
    establishes a connection between a mobile device possessed by the customer and the weighing and pricing device; and
    upon establishing the connection,
        transmits, to the mobile device, registration process information indicating a registration result indicating that the product has been registered, and
        receives, from the mobile device, identification information that identifies the mobile device, and a reception confirmation notice indicating that the registration process information has been received by the mobile device;
a storage that stores information relating to the product and the identification information in association with each other; and
a customer display that displays a connection control code that, when read by the mobile device, causes the mobile device to control the establishing the connection between the mobile device and the weighing and pricing device, wherein
the processor, in response to the established connection between the mobile device and the weighing and pricing device, further:
    displays, on the employee display, a label issuing button after calculating the price of the registered product,
    in a case that the label issuing button is operated on the employee display, causes a printer to print a first product label corresponding to a unit of the registered product, the first product label including code information configured to be read by a device that executes the registration process and enables the device to execute the registration process, and
    in a case that the label issuing button is not operated on the employee display after a predetermined time of the label issuing button being displayed, upon receiving the reception confirmation notice from the mobile device, causes the customer display that is displaying the connection control code to stop displaying the connection control code and further causes the printer to print a second product label without the code information.

2. The weighing and pricing device according to claim 1, wherein the processor further:
determines whether a predetermined time has elapsed, without the mobile device starting a connection process, after the customer display displays the code,
upon determining that the predetermined time has elapsed, displays, on the employee display, the label issuing button after calculating the price of the product,
upon determining that the mobile device starts the connection process before the predetermined time has elapsed, upon receiving the reception confirmation notice from the mobile device, causes the customer display to stop displaying the code and causes the printer to print the product label without the code information.

* * * * *